Nov. 22, 1960 A. M. MARKS 2,961,486
THREE-DIMENSIONAL DISPLAY SYSTEM
Original Filed March 5, 1951 22 Sheets-Sheet 1
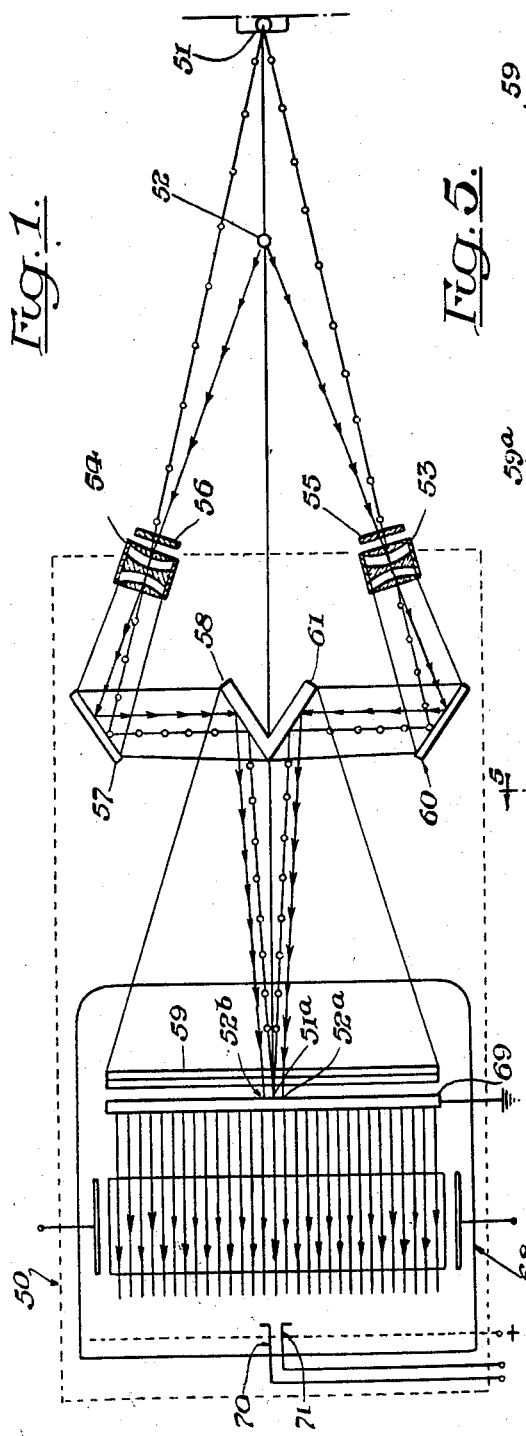
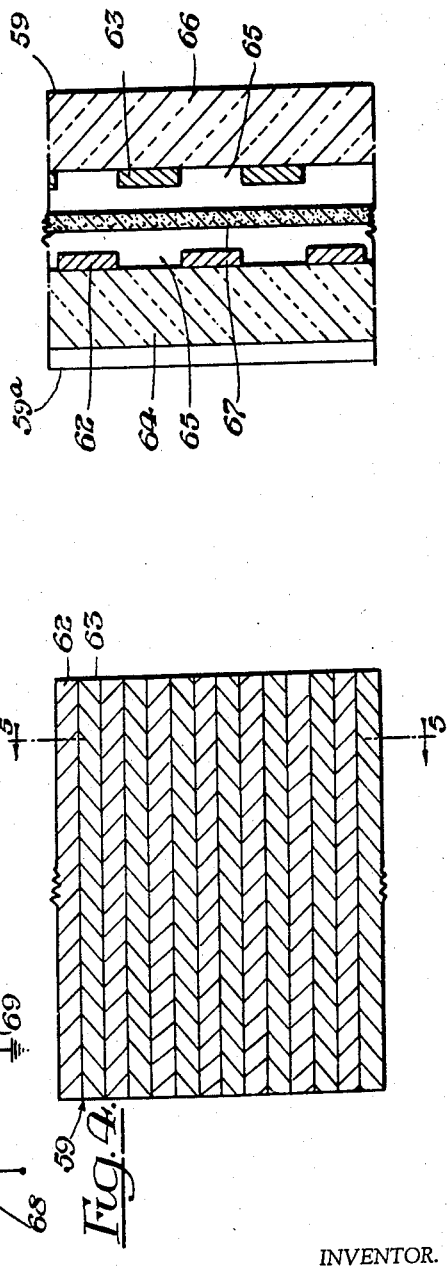
INVENTOR.
ALVIN M. MARKS
BY
ATTORNEY

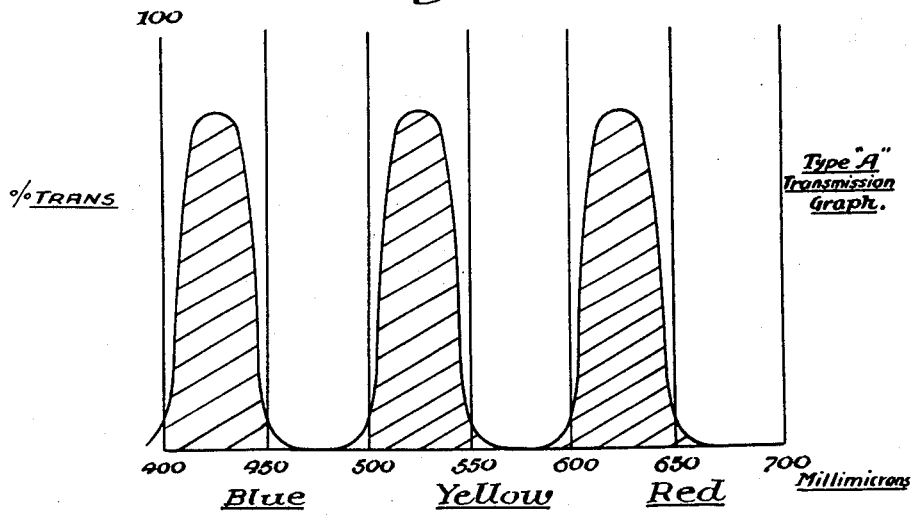
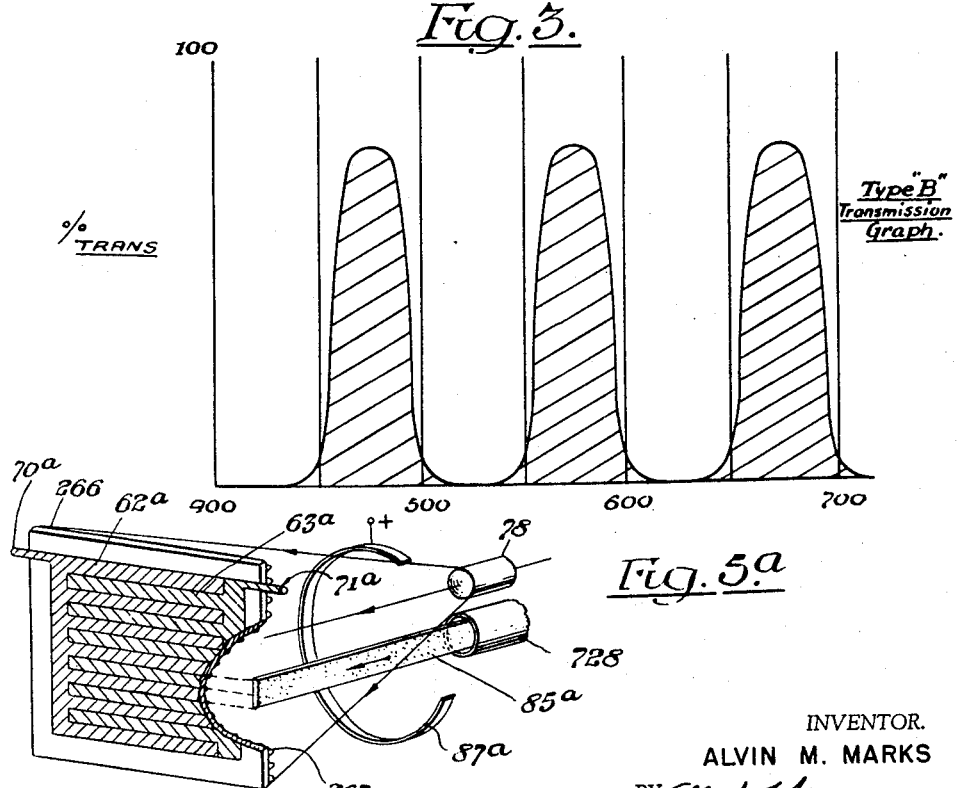

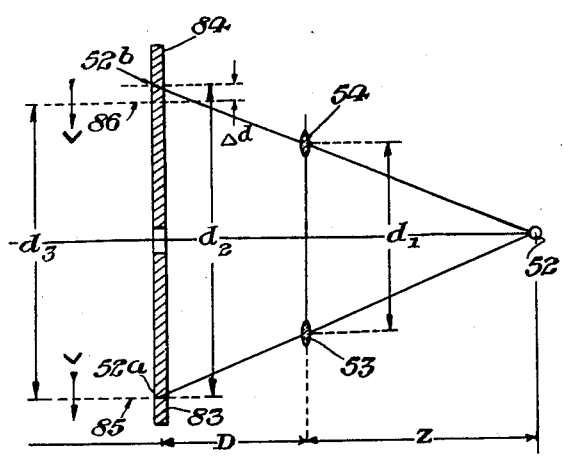
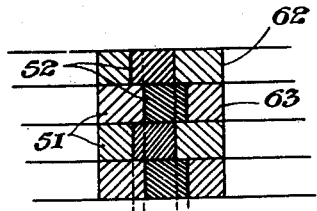
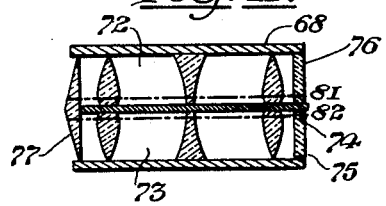
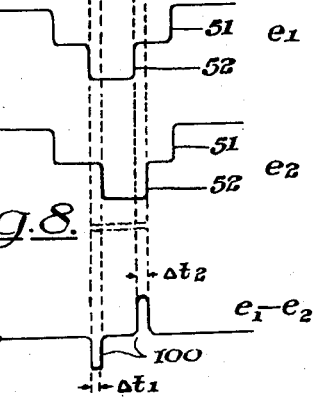
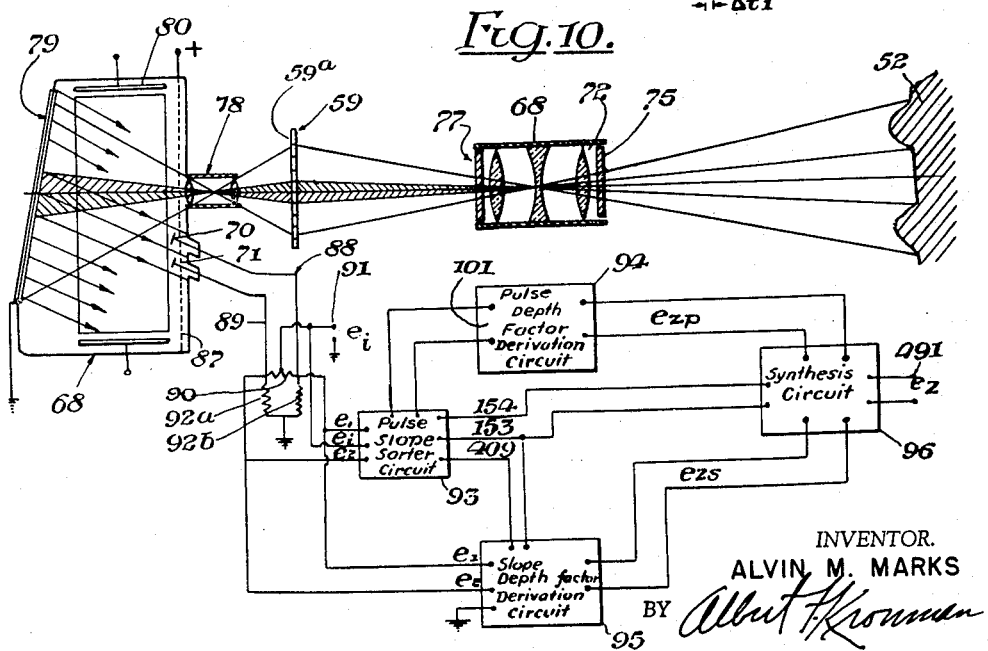
INVENTOR.
ALVIN M. MARKS

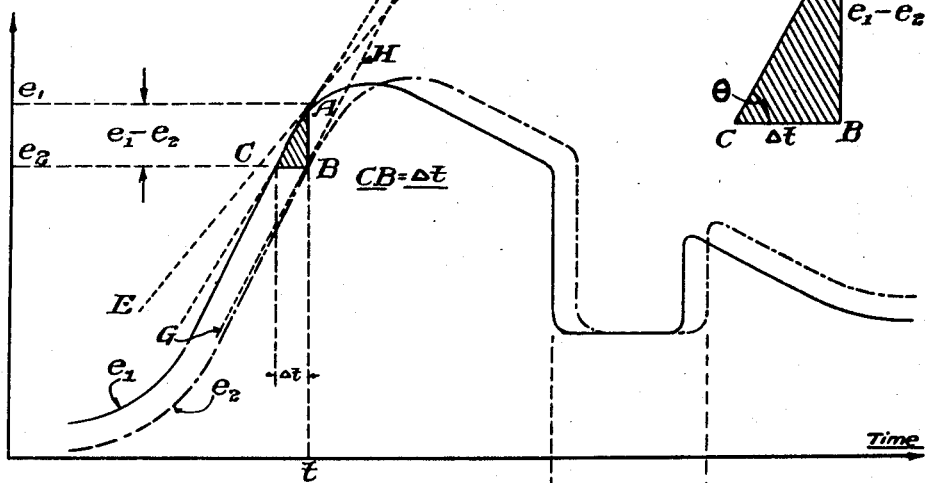
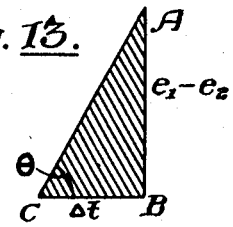
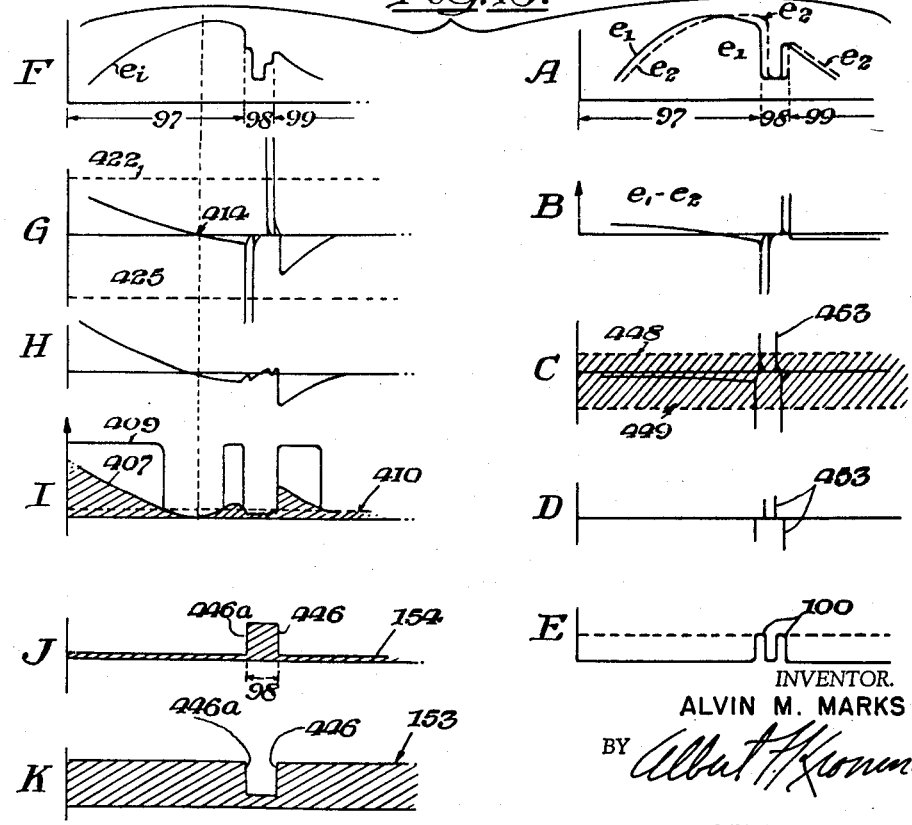

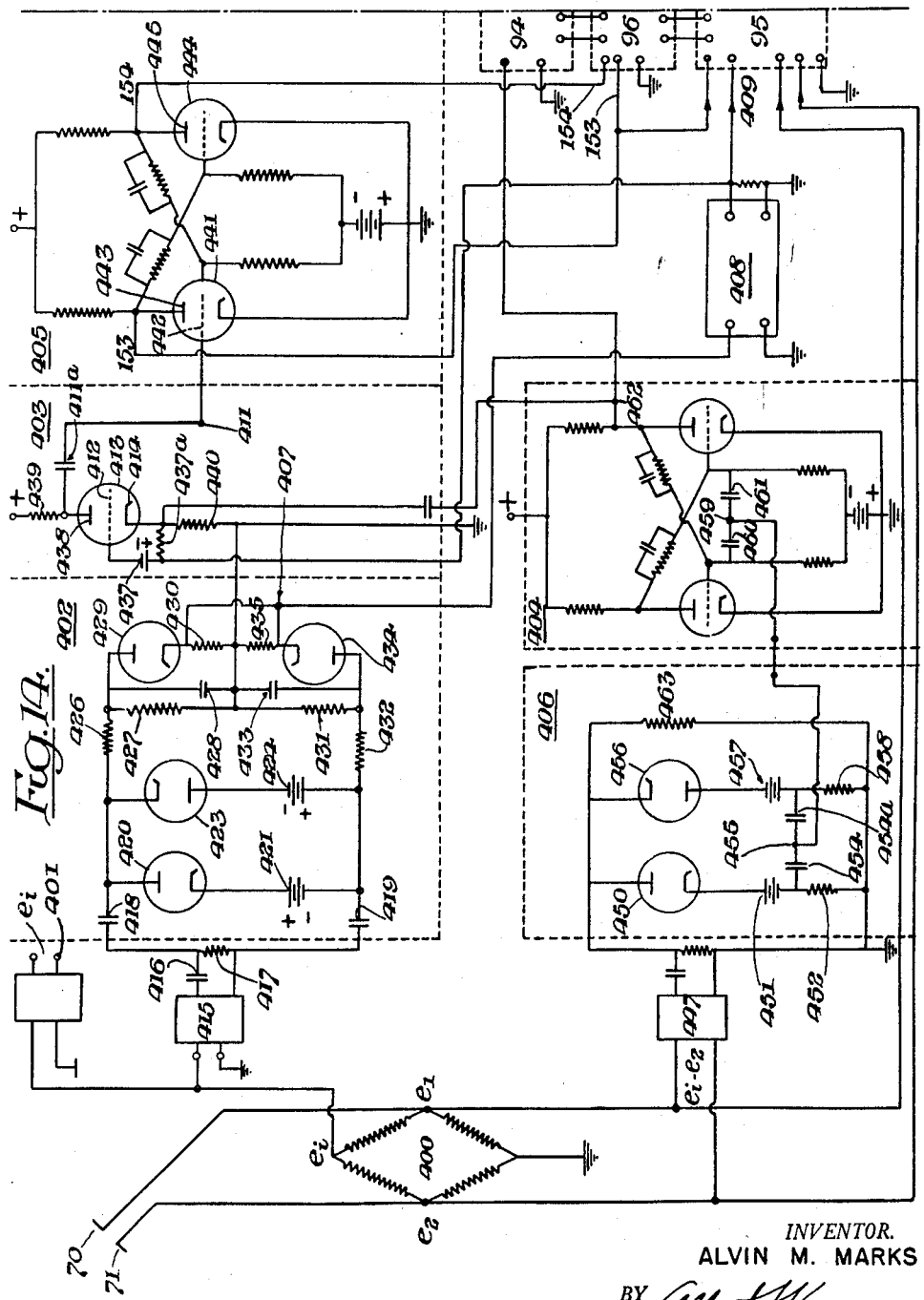

Nov. 22, 1960 — A. M. MARKS — 2,961,486
THREE-DIMENSIONAL DISPLAY SYSTEM
Original Filed March 5, 1951 — 22 Sheets-Sheet 6

INVENTOR
ALVIN M. MARKS
BY
ATTORNEY

Nov. 22, 1960 A. M. MARKS 2,961,486
THREE-DIMENSIONAL DISPLAY SYSTEM
Original Filed March 5, 1951 22 Sheets-Sheet 7
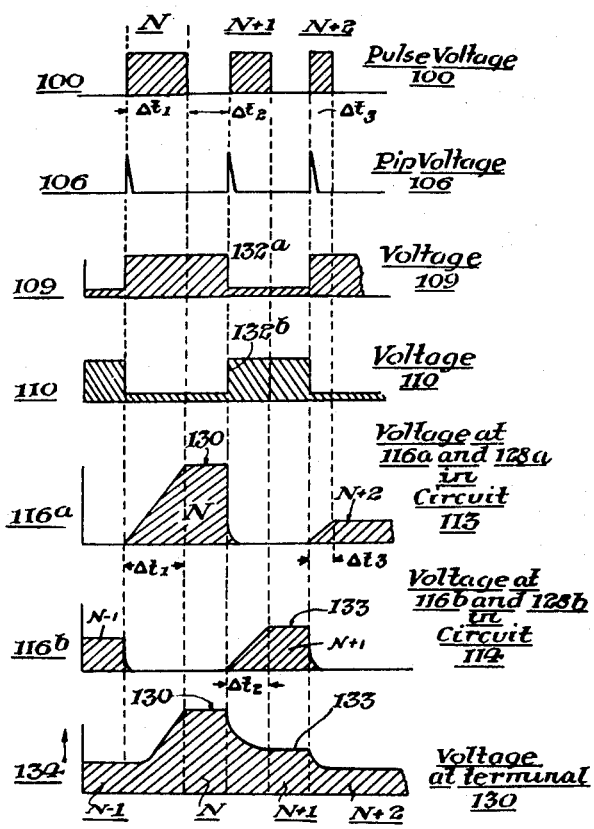
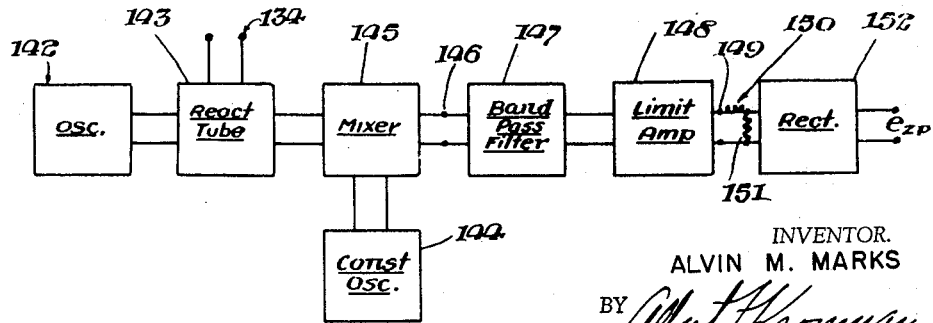
INVENTOR.
ALVIN M. MARKS
BY
ATTORNEY Nov. 22, 1960     A. M. MARKS     2,961,486
THREE-DIMENSIONAL DISPLAY SYSTEM
Original Filed March 5, 1951     22 Sheets-Sheet 9
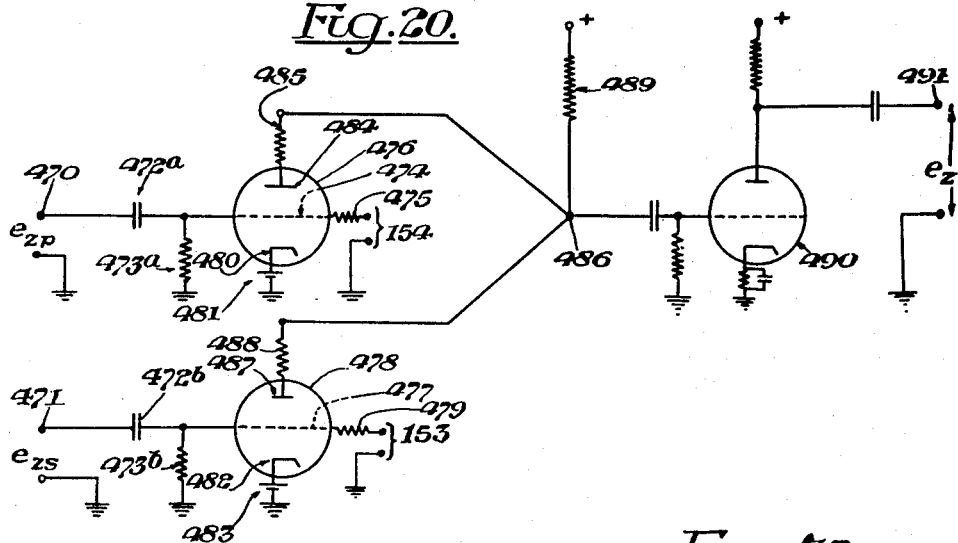
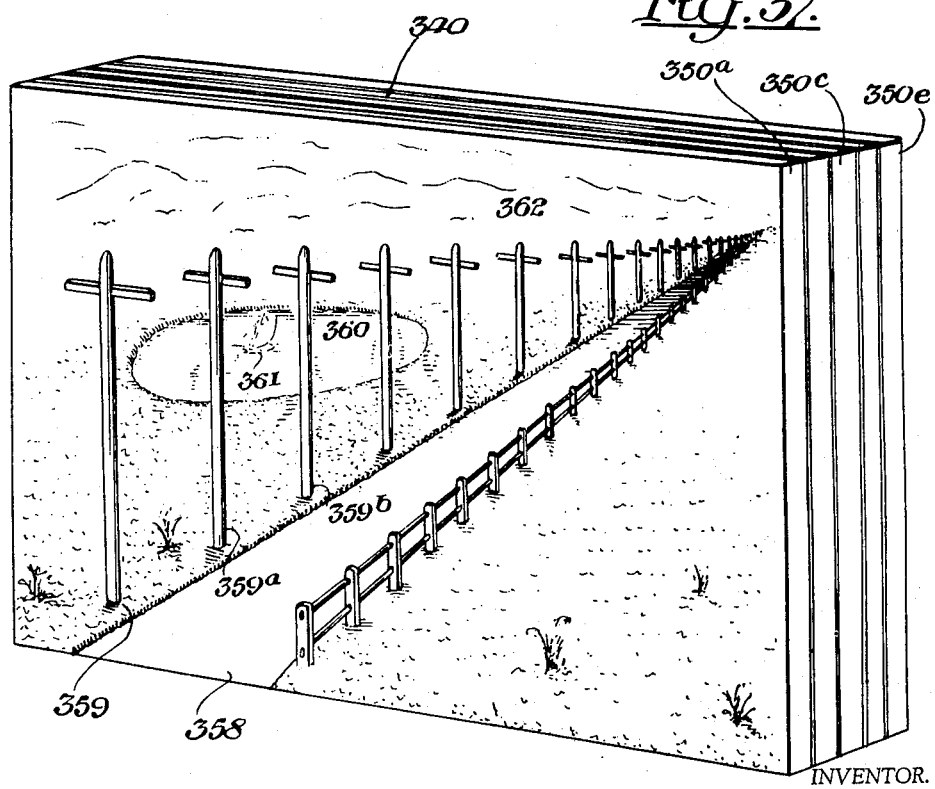
INVENTOR.
ALVIN M. MARKS
BY
ATTORNEY Nov. 22, 1960    A. M. MARKS    2,961,486
THREE-DIMENSIONAL DISPLAY SYSTEM
Original Filed March 5, 1951    22 Sheets-Sheet 10
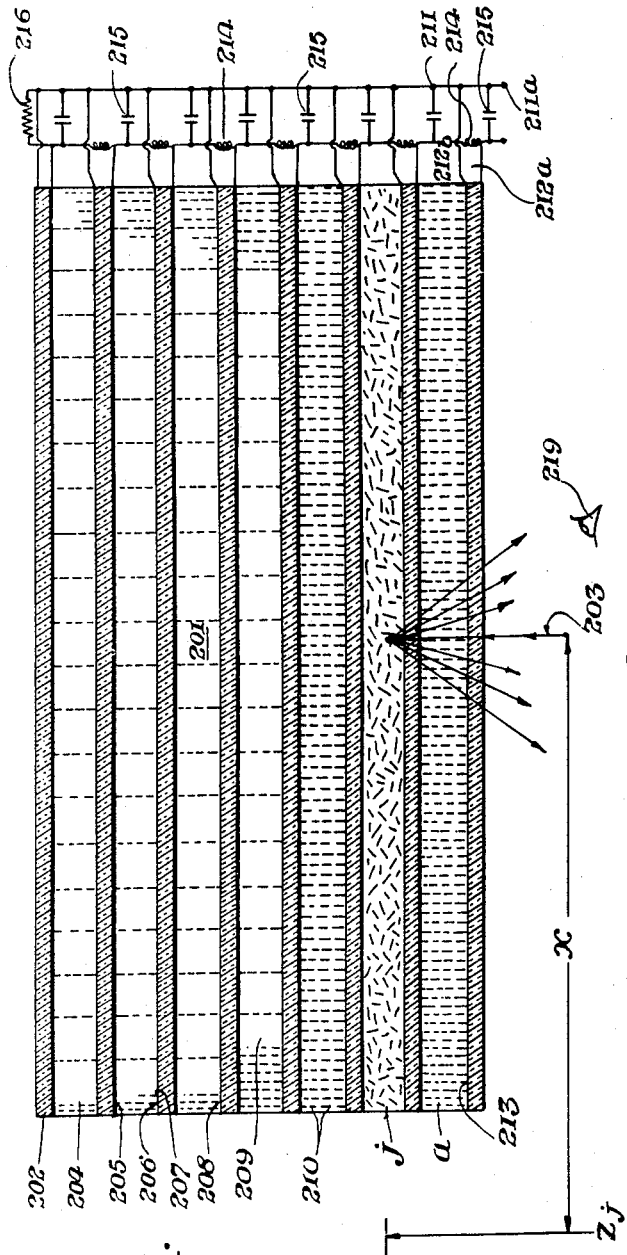
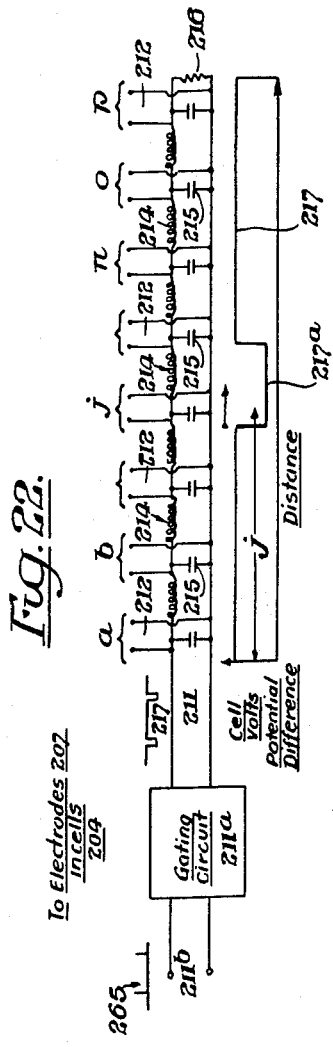
INVENTOR.
ALVIN M. MARKS
BY
ATTORNEY Nov. 22, 1960  A. M. MARKS  2,961,486
THREE-DIMENSIONAL DISPLAY SYSTEM
Original Filed March 5, 1951  22 Sheets-Sheet 11

INVENTOR.
ALVIN M. MARKS
BY
ATTORNEY

Nov. 22, 1960  A. M. MARKS  2,961,486
THREE-DIMENSIONAL DISPLAY SYSTEM
Original Filed March 5, 1951  22 Sheets-Sheet 12
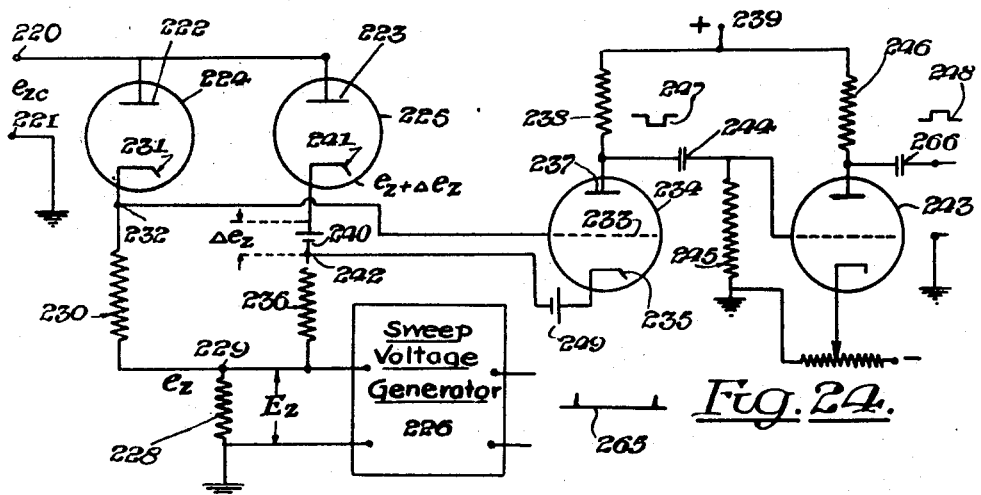
Fig. 24.
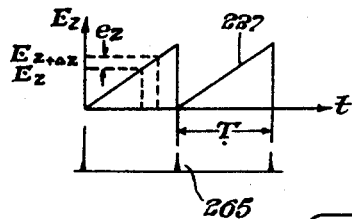
Fig. 25.
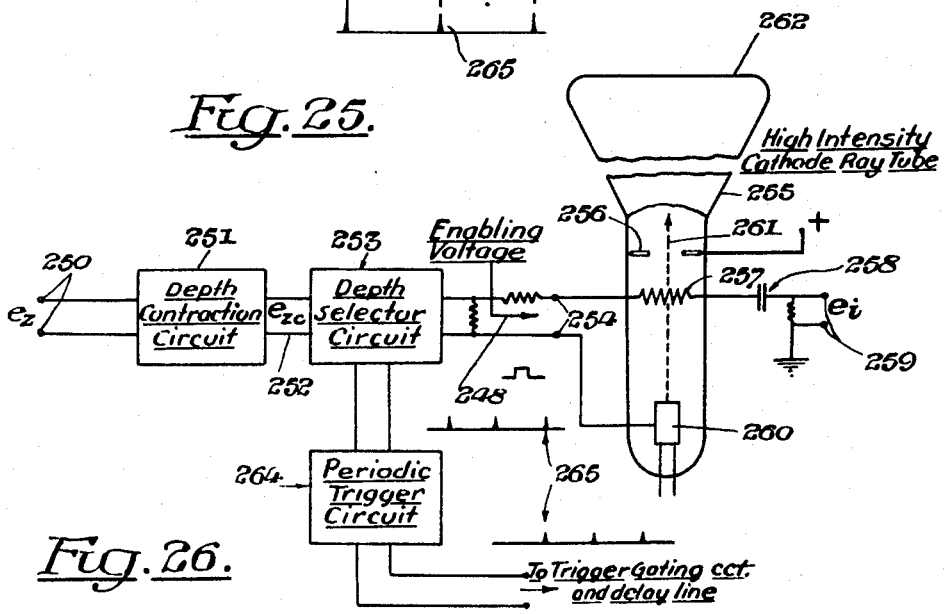
Fig. 26.
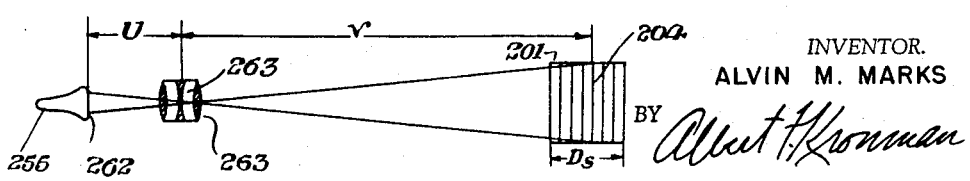
INVENTOR.
ALVIN M. MARKS
BY Albert F. Kronman
ATTORNEY Nov. 22, 1960 A. M. MARKS 2,961,486
THREE-DIMENSIONAL DISPLAY SYSTEM
Original Filed March 5, 1951 22 Sheets-Sheet 13

INVENTOR
ALVIN M. MARKS
BY
ATTORNEY

Nov. 22, 1960 A. M. MARKS 2,961,486
THREE-DIMENSIONAL DISPLAY SYSTEM
Original Filed March 5, 1951 22 Sheets-Sheet 14
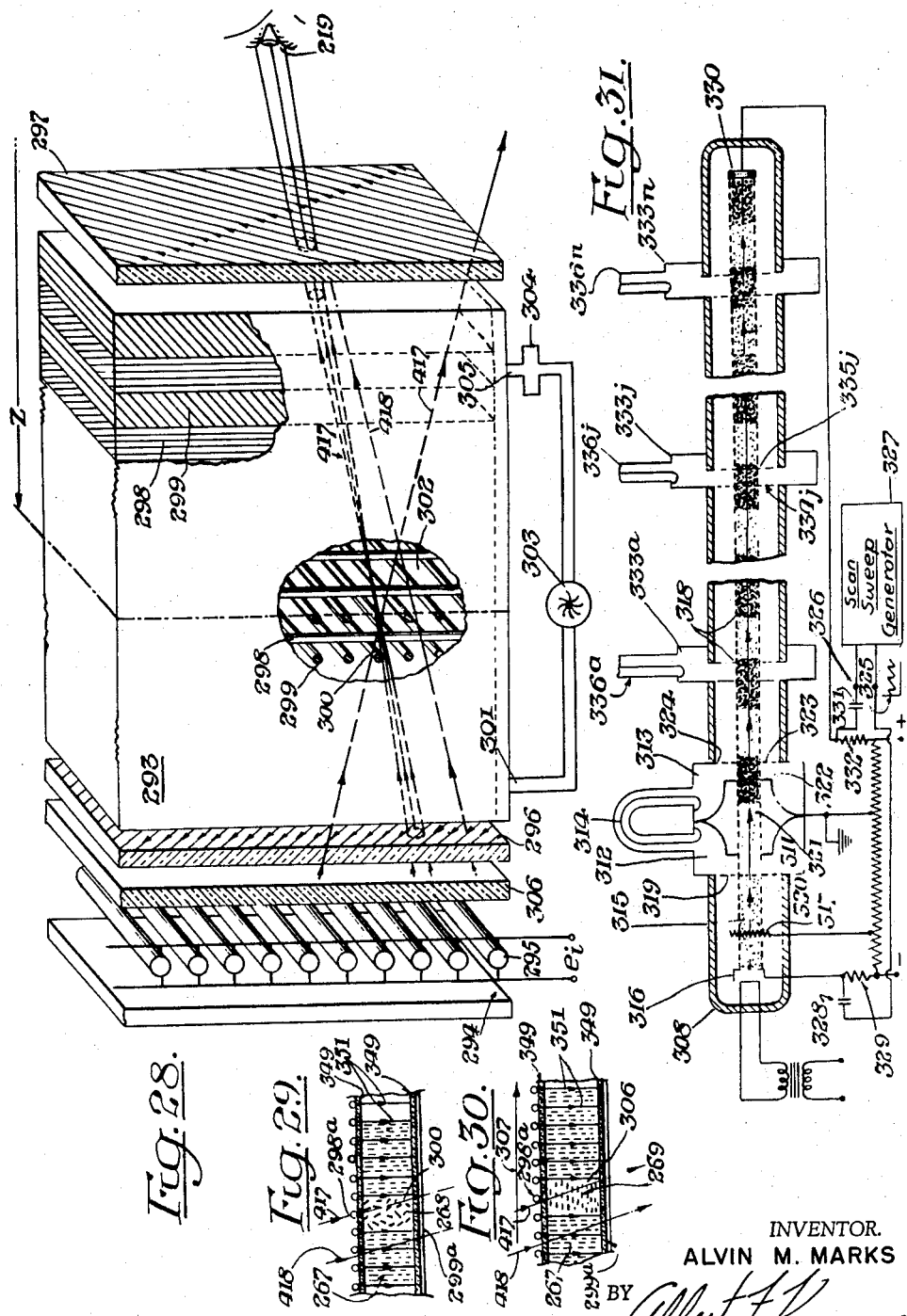
INVENTOR.
ALVIN M. MARKS
BY Albert F. Kronman
ATTORNEY

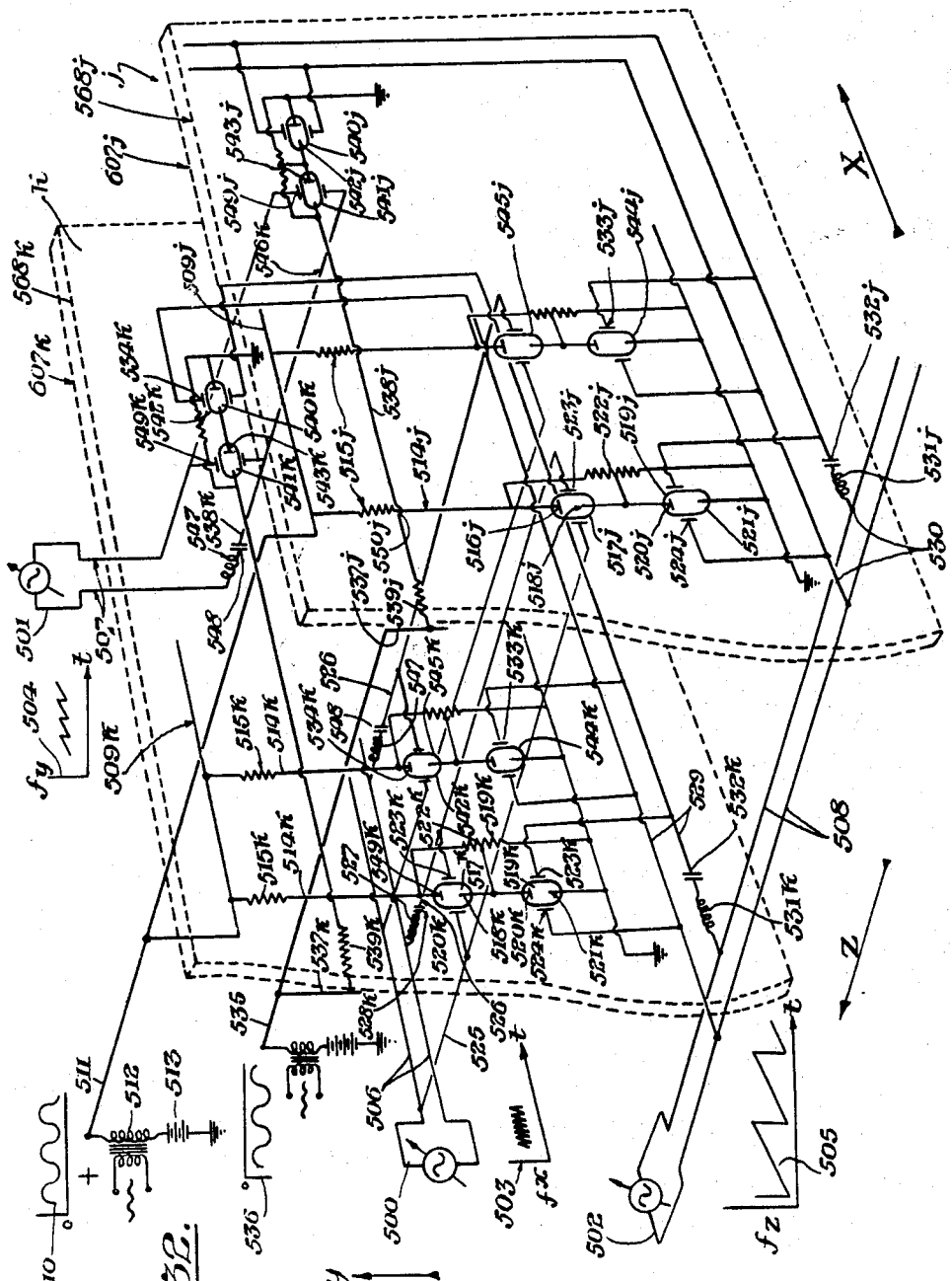

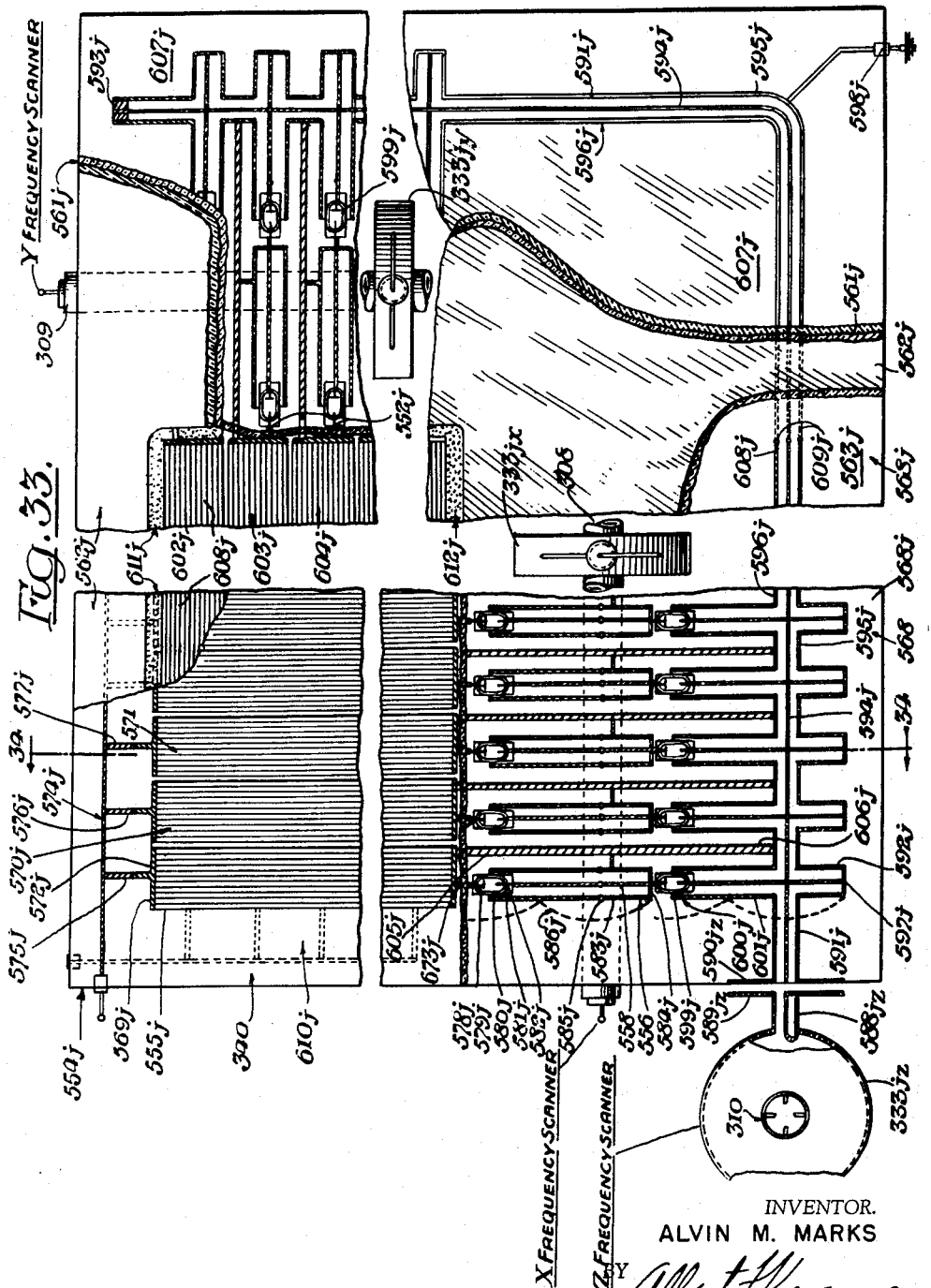

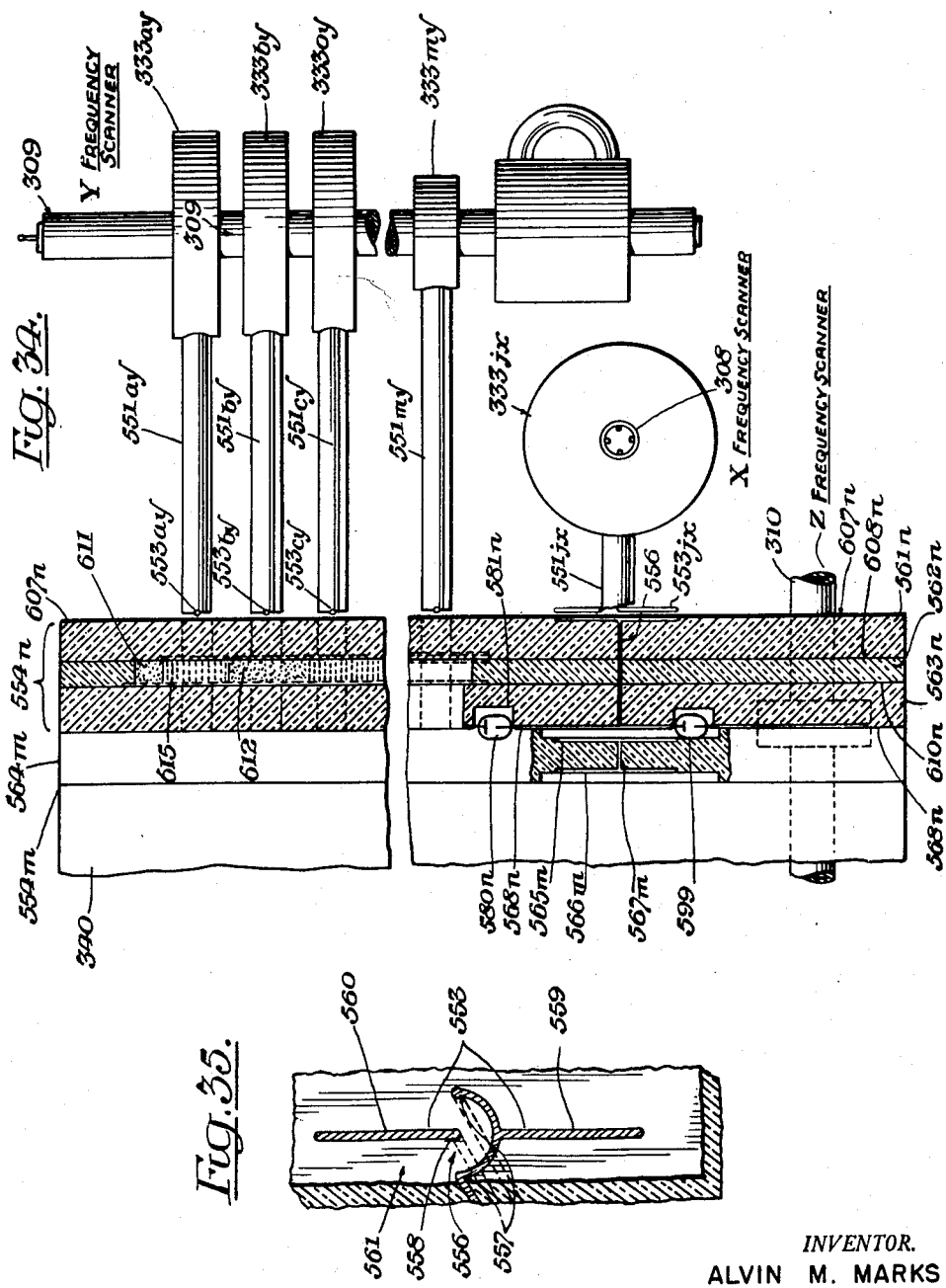

Nov. 22, 1960  A. M. MARKS  2,961,486
THREE-DIMENSIONAL DISPLAY SYSTEM
Original Filed March 5, 1951  22 Sheets-Sheet 18
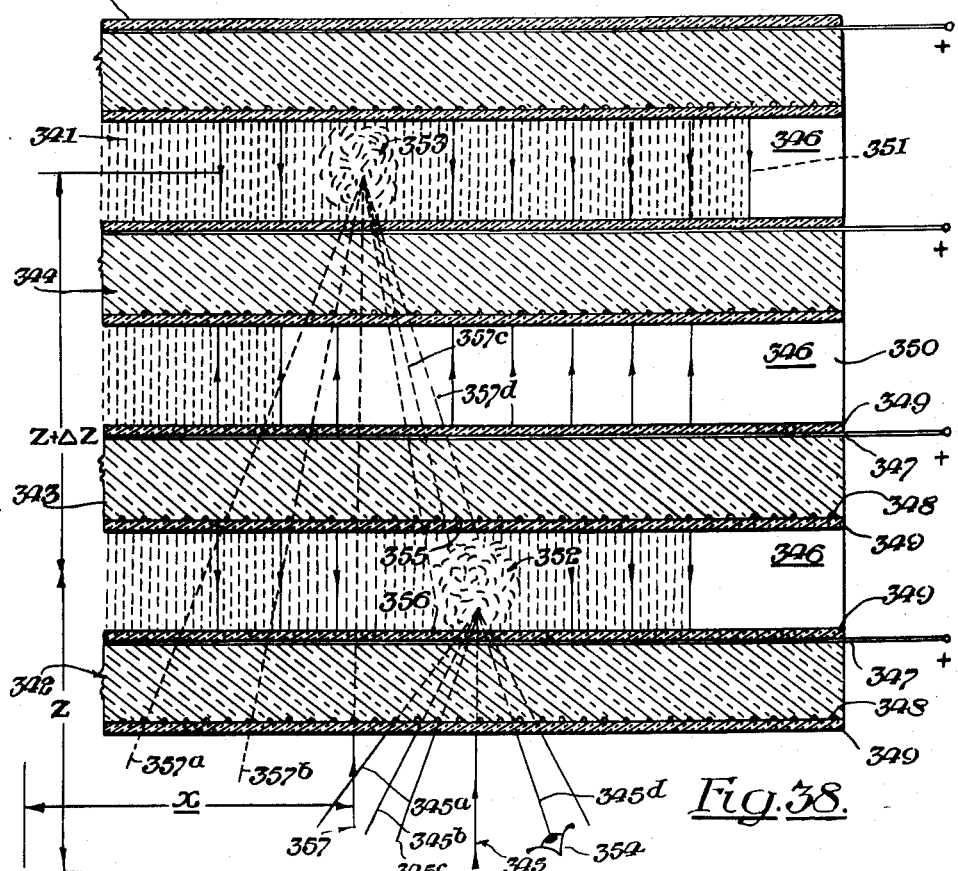
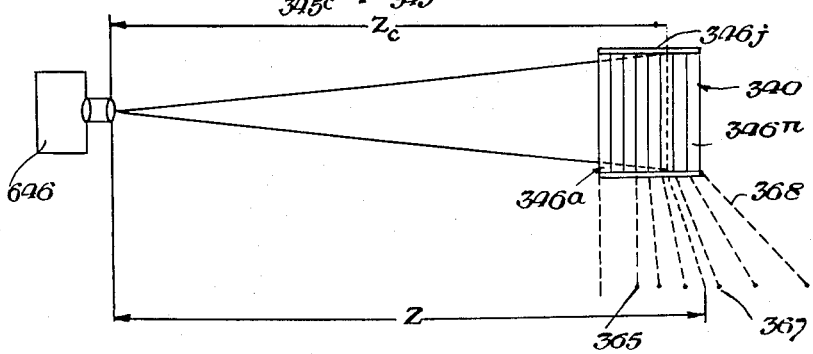
INVENTOR.
ALVIN M. MARKS
BY
ATTORNEY Nov. 22, 1960     A. M. MARKS     2,961,486
THREE-DIMENSIONAL DISPLAY SYSTEM
Original Filed March 5, 1951     22 Sheets-Sheet 19
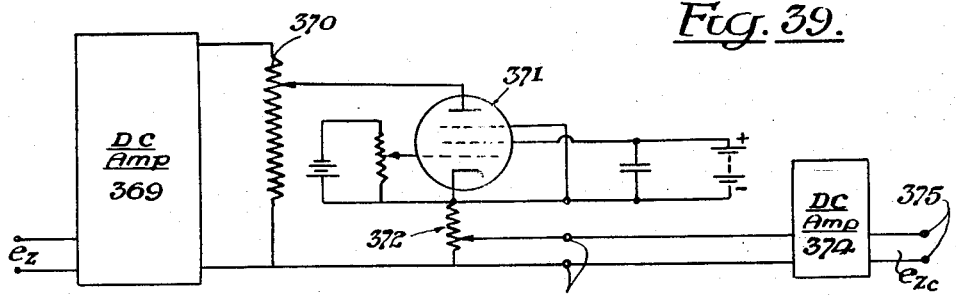
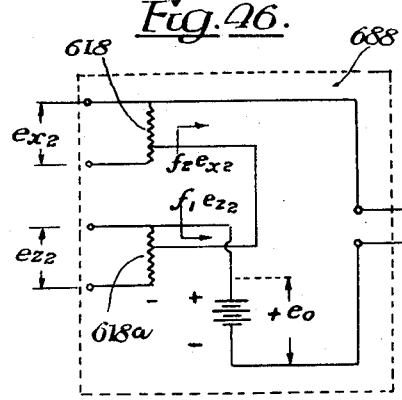
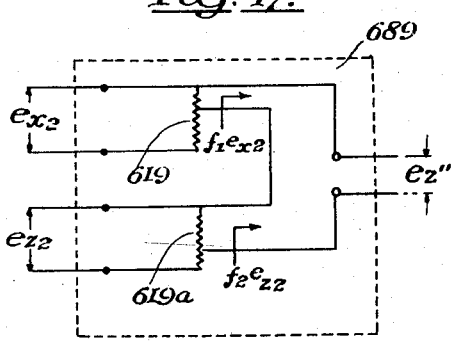
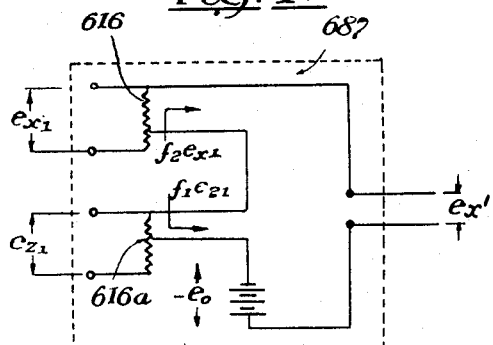
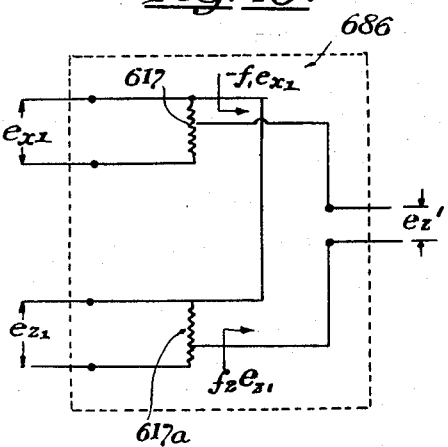
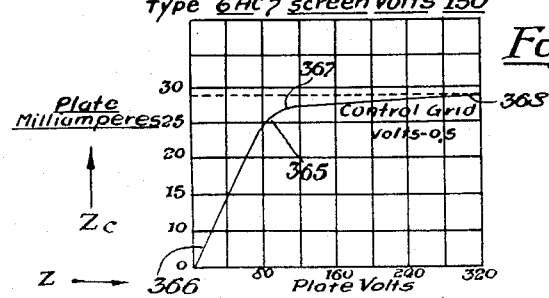
INVENTOR
ALVIN M. MARKS
BY
ATTORNEY

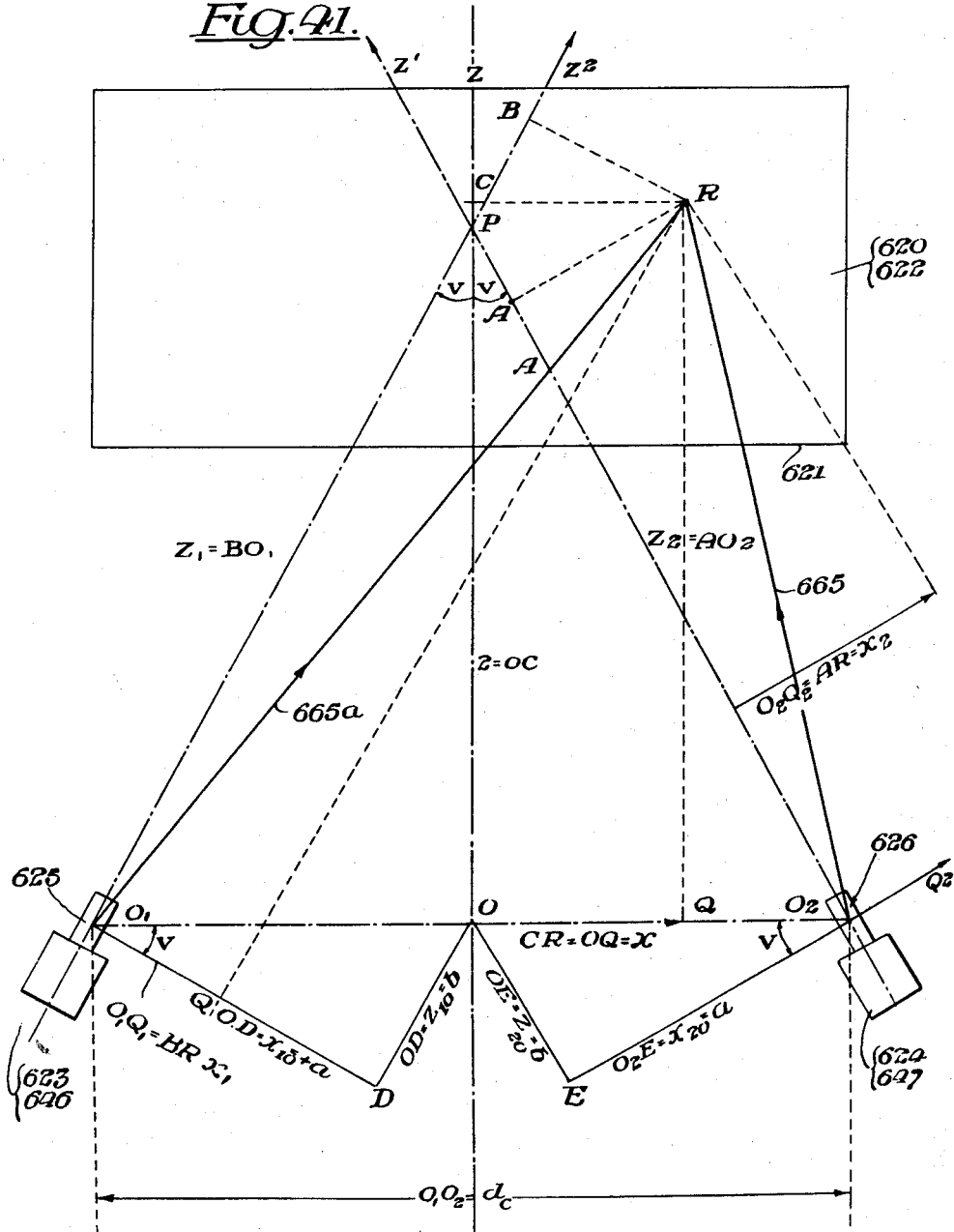

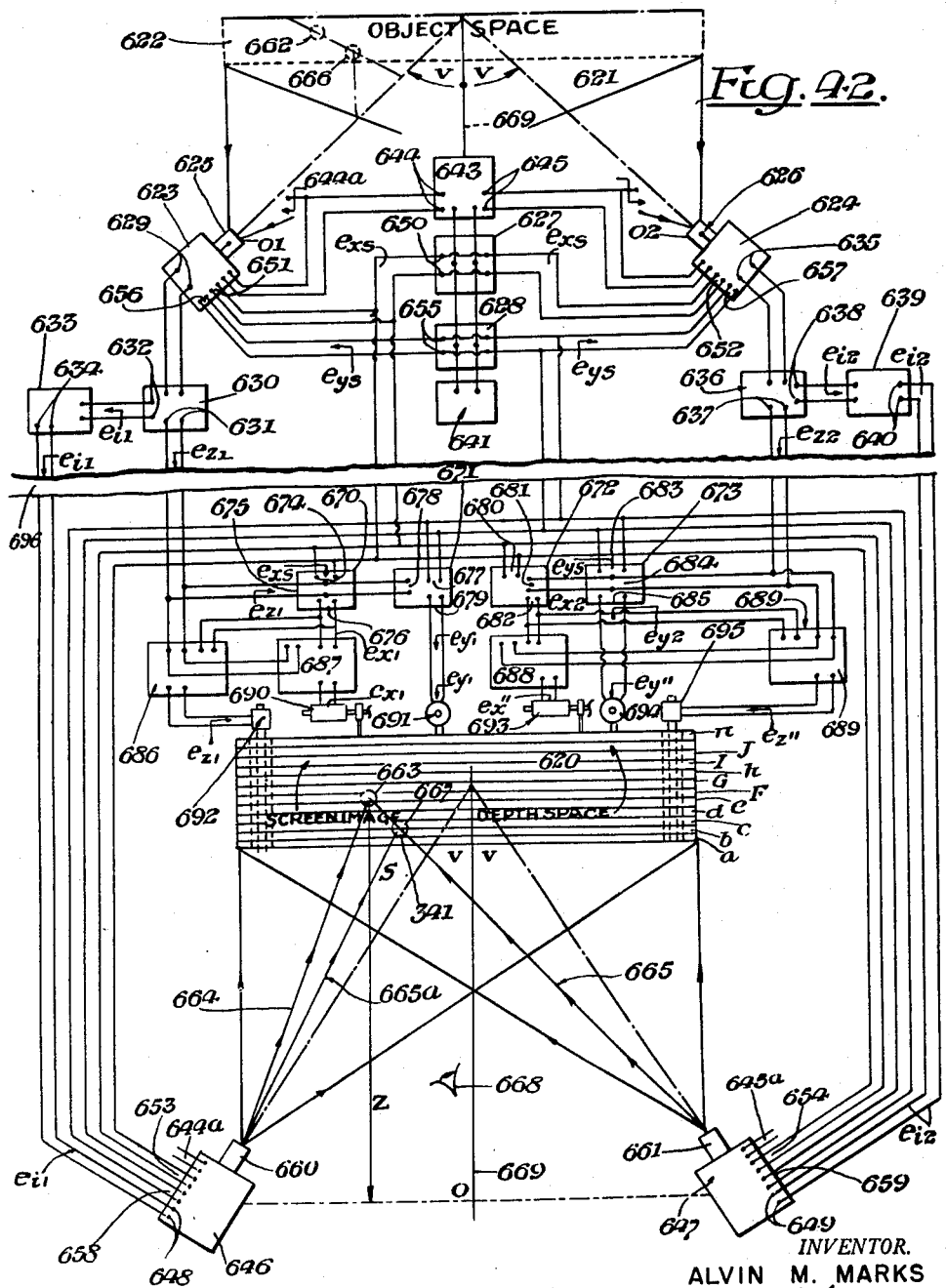

Nov. 22, 1960     A. M. MARKS     2,961,486
THREE-DIMENSIONAL DISPLAY SYSTEM
Original Filed March 5, 1951     22 Sheets-Sheet 22
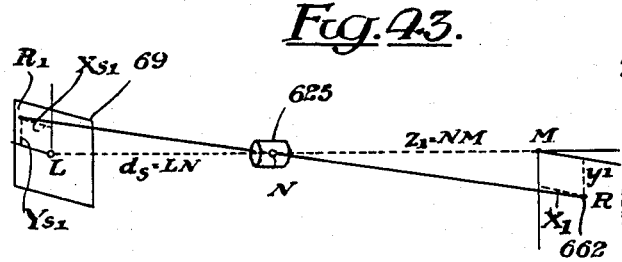
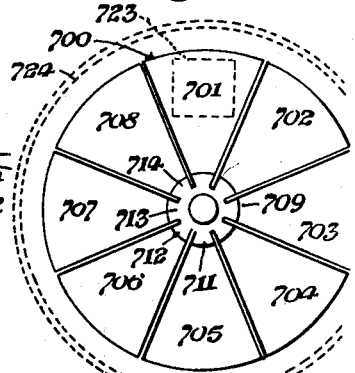
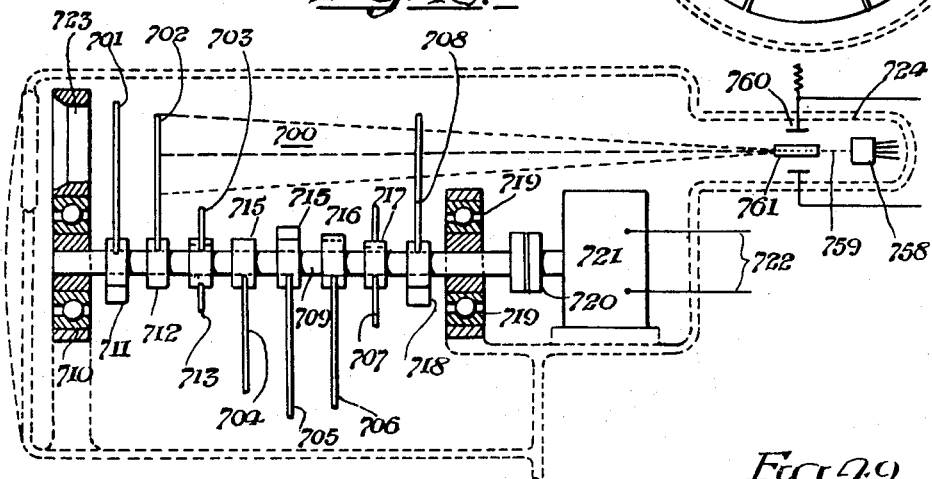
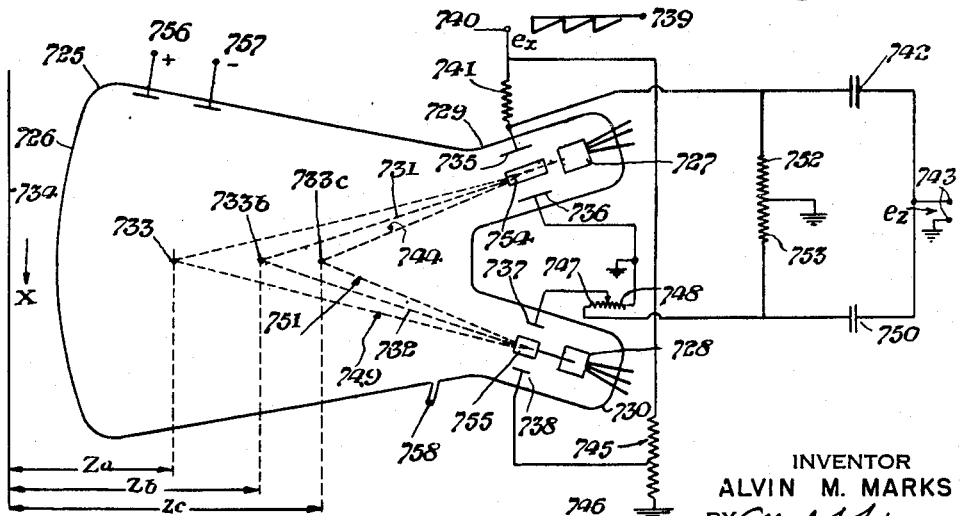
INVENTOR
ALVIN M. MARKS
BY
ATTORNEY United States Patent Office 2,961,486
Patented Nov. 22, 1960

2,961,486

THREE-DIMENSIONAL DISPLAY SYSTEM

Alvin M. Marks, 149—61 Powells Cove Blvd.,
Whitestone 57, N.Y.

Original application Mar. 5, 1951, Ser. No. 213,989, now Patent No. 2,777,011, dated Jan. 8, 1957. Divided and this application Jan. 7, 1957, Ser. No. 632,799

19 Claims. (Cl. 178—6.5)

This invention relates to the production and transmission of three-dimensional pictures for use in conjunction with motion pictures, television, radar and the related arts, and is a division of an original application entitled "Three-Dimensional Display System," filed March 5, 1951, Serial No. 213,989, now Patent No. 2,777,011, issued January 8, 1957.

It is well-known to create the illusion of depth in a picture by using the stereoptican effect in which slightly different pictures are presented to each eye of the observer, similar to that which would be seen by the two eyes of a person actually viewing the object. This method has been broadened to include moving pictures by projecting two images upon a screen simultaneously, and providing the observer with specially constructed colored or polarized glasses so that each eye will see only one of the images. The necessity for eye glasses or similar devices in employing this illusion has been responsible for its very limited adoption.

Various other schemes have been devised in which lenticulated or slotted screens have been used to eliminate the wearing of colored or polarizing glasses, but with little success. These methods restrict the angle of view from which the pictures may be observed to such a narrow space as to make them impractical.

Accordingly, it is the broad object of this invention to generate a picture in space which shall have height, width, and depth when viewed with the naked eye.

Another object of this invention is to recreate a solid image in space of the actual scene or object being televised.

Another object of this invention is to subsequently reproduce a motion picture having the same three-dimensional appearance as the original setting or subject.

A further object of this invention is to transmit a scene having three dimensions to a point distant from the image source and there recreate the said picture in a three-dimensional view.

An object of this invention is to create a solid image in space with a substantially unrestricted viewing angle without using colored glasses, lenticulated screens, shutters, or other objectionable accessories.

Another object of this invention is the generation of three-dimensional images in space having a full and natural color rendition, and a resulting realism which is presently unknown in the art.

Another object of this invention is to provide a means for displaying three-dimensional "radar" signals for use in blind flying, meterology, airplane "spotting," etc.

Another object of this invention is to provide a direct viewing two or three dimensional television screen which shall avoid the present limitations as to screen size.

Another object of this invention is to produce a motion picture film upon which shall be recorded the means for subsequently reproducing a three-dimensional image.

A further object of this invention is to provide a means whereby an image receiving screen may be scanned in depth, electrically or mechanically.

Another object of this invention is to provide a direct viewing television tube which shall generate three-dimensional images therein.

A feature of this invention is the use of a novel type of light filter termed a multichrome filter in taking the picture to derive depth impulses for each portion thereof.

Another object of this invention is to provide a self-illuminated screen responsive to a plurality of electrical impulses which generate an image therein.

Another feature of this invention is a screen, the reflecting portions of which shall have opacity from the rear so as to block out light from background objects exactly as solid foreground objects do in nature.

A further feature of this invention is a sensitive depth responsive electrical circuit capable of deriving a depth factor for each portion of the scene or object to be projected, and transferring those factors to each portion of the image within the screen.

Another feature of the invention is a novel scanning circuit which is adaptable to either two or three dimensional image projection.

A feature of this invention is a depth compression means whereby scenes showing great distances may be reproduced in three dimensions within limited space confines.

A further feature of this invention is a novel form of mosaic comparator plate for the taking of three-dimensional pictures by employing the iconoscope or orthicon tube.

A feature of this invention is an electron scanning beam of rectangular cross section for simultaneously scanning adjacent image strips of the mosaic comparator plate.

Another feature of this invention is a camera tube within which two stereo images projected upon a photoelectric comparator screen are simultaneously scanned by two collector electrodes.

A feature of this invention is a lens system, termed a duo-lens, for simultaneously taking two stereo images from slightly different vantage points.

Another feature of this invention is a novel image blocking screen.

An object of this invention is to provide a three-dimensional screen within which successive translucent or reflecting layers may be activated to permit the said screen to be scanned in depth.

Another feature of this invention is a mechanical receding screen in which the reflecting or luminous portions thereof are successively located at different depths.

A further feature of this invention is a receding screen having a plurality of cells therein containing suitably suspended light reflecting or emitting dipoles.

A feature of this invention is an electronic control circuit for successively orienting the light reflecting dipoles, comprising a delay line.

A further feature is an electrical circuit and an ion gun associated therewith for controlling the orientation of light reflecting dipoles.

Another feature of this invention is a frequency scanning means for controlling the orientation of light reflecting dipoles.

An object of this invention is to provide a screen within which a plurality of birefringent dipoles may be suitably space oriented to produce an apparently solid image.

Another object of this invention is to provide a three-dimensional solid image screen comprising a plurality of cells, containing dipoles, disposed between crossed polarizers and illuminated by a field of light of modulated intensity.

A further feature of this invention is a novel dipole having the property of opacity to rearwardly incident light and the property of reflecting light impinging on the face thereof.

A feature of this invention is a novel frequency scanning means employing a plurality of resonant cavities and a variable frequency means.

Another feature of this invention is a frequency scanning means employing the klystron principle together with a multiple resonator tube.

A feature of this invention is a wide angle viewing and projecting system.

A further feature of this invention is a two-dimensional screen system comprising a cell, within which is contained a plurality of orientable dipoles, and a source of intense background illumination capable of rapid modulation.

A feature of this invention is a novel three wire microwave circuit and a cell construction incorporating the said circuit.

Another feature of this invention is a novel microwave antenna dipole inscribed on a supporting medium.

A feature of this invention is an assembly comprising a novel three-dimensional electrical network built into the dipole orientation cells for the control of specific responsive regions within the three-dimensional screen.

The invention consists of the construction combination, arrangement of parts and the steps of the method herein illustrated, described and claimed.

In the accompanying drawings, forming part hereof, is illustrated several forms of the invention, in which drawings similar reference characters designate corresponding parts and in which:

Figure 1 is a diagrammatic plan view of a camera according to this invention,

Figure 2 is a transmission graph of a type "A" multichrome filter,

Figure 3 is a transmission graph of a type "B" multichrome filter,

Figure 4 is a diagrammatic front elevation of a blocking screen,

Figure 5 is a longitudinal section of the screen shown in Figure 4, on line 5—5, somewhat enlarged, Figure 5a is a fragmentary view in perspective of an iconoscope assembly showing a mosaic comparator plate according to this invention with certain portions cut away for the sake of clarity, Figure 6 is a diagrammatic representation of a typical portion of an image projected upon a comparator screen, Figure 7 is a graphical representation of the displaced electrical waves produced by the image in Figure 6, Figure 8 represents typical electrical pulses derived from the two wave forms shown in Figure 7, Figure 9 is a diagrammatic view of a camera having two photoelectric screens showing the geometry of the image displacement principle, Figure 10 is a diagrammatic view of a duo-lens camera employing a dissector tube and its associated optical and electrical system, Figure 11 is a horizontal sectional view of the duo-lens shown in Figure 10, Figure 12 is a graph showing typical pulse and slope voltage wave forms, Figure 13 is an enlarged view of the triangle ABC shown in Figure 12, Figure 14 is a schematic diagram of a circuit hereinafter referred to as the "pulse slope sorter circuit,"

Figure 16:
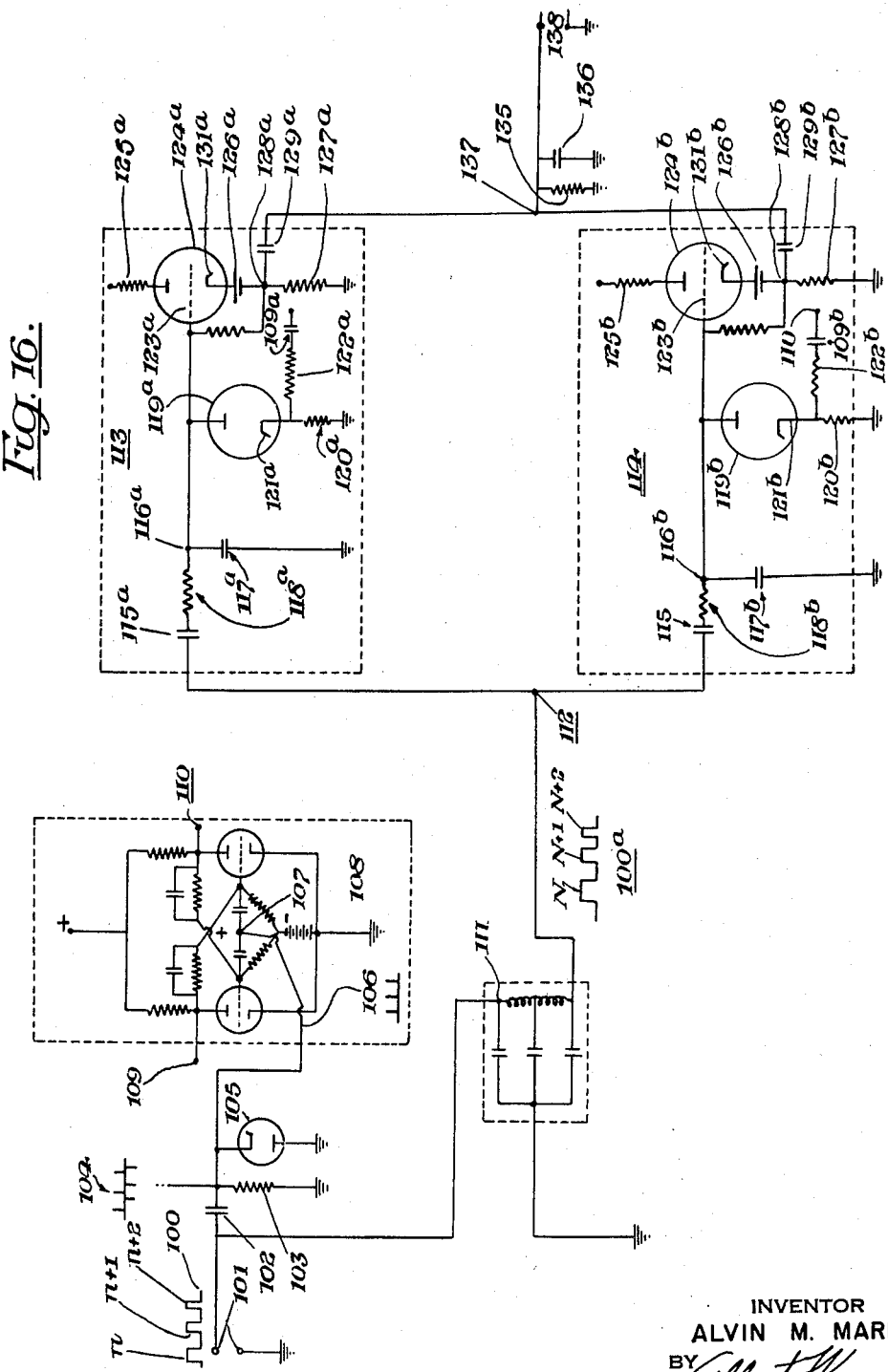

Figure 15 shows a number of wave forms characterizing the operation of the circuit shown in Figure 14, Figure 16 is a diagram of a circuit hereinafter referred to as the "pulse depth derivation circuit,"

Figure 17 shows a number of wave forms produced by the operation of the circuit shown in Figure 16, Figure 18 is a block diagram of a circuit hereinafter referred to as a "quotient circuit,"

Figure 19:
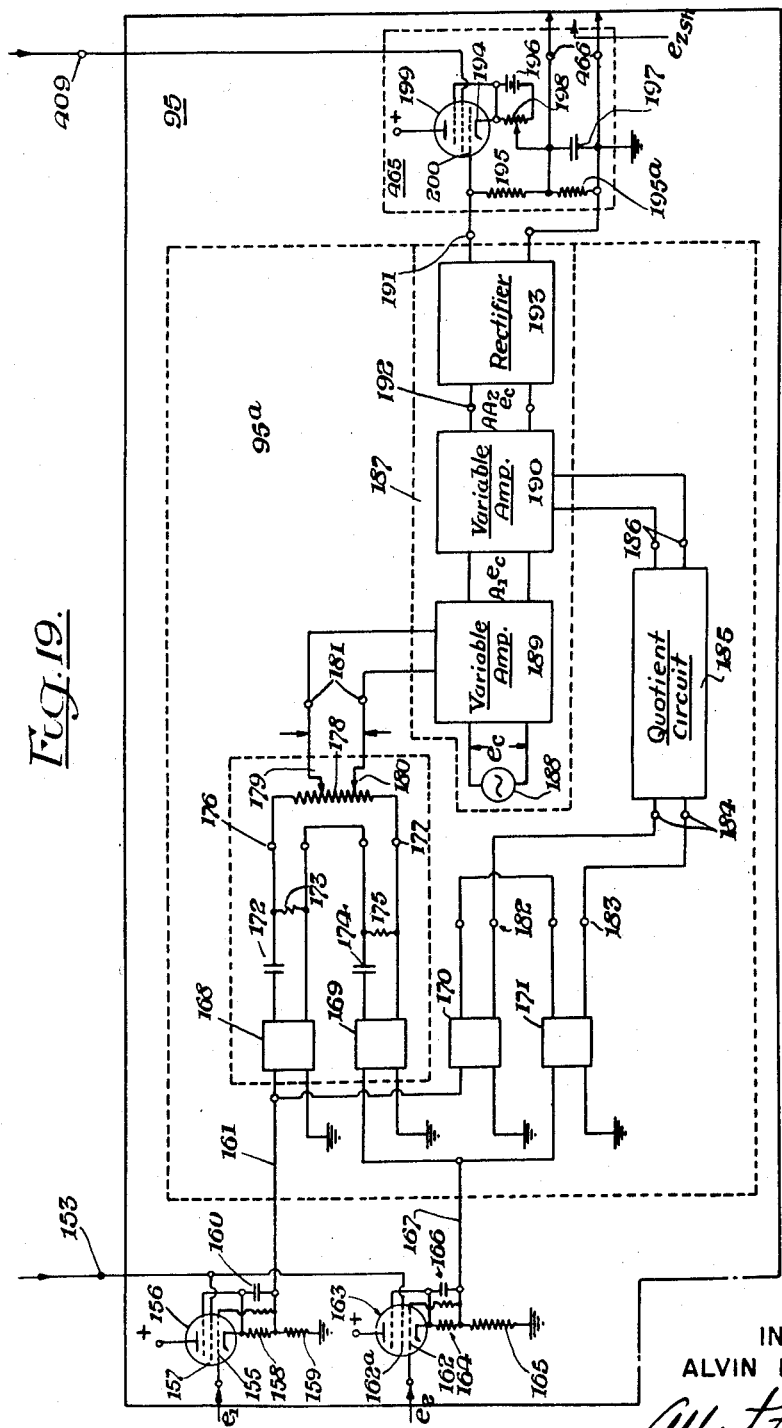

Figure 19 is a schematic diagram of a circuit hereinafter referred to as the "slope depth derivation circuit,"

Figure 20 is a schematic diagram of a circuit hereinafter termed the "synthesis" circuit, Figure 21 is a plan view of one embodiment of the three-dimensional screen hereinafter referred to as the "receding screen,"

Figure 23:
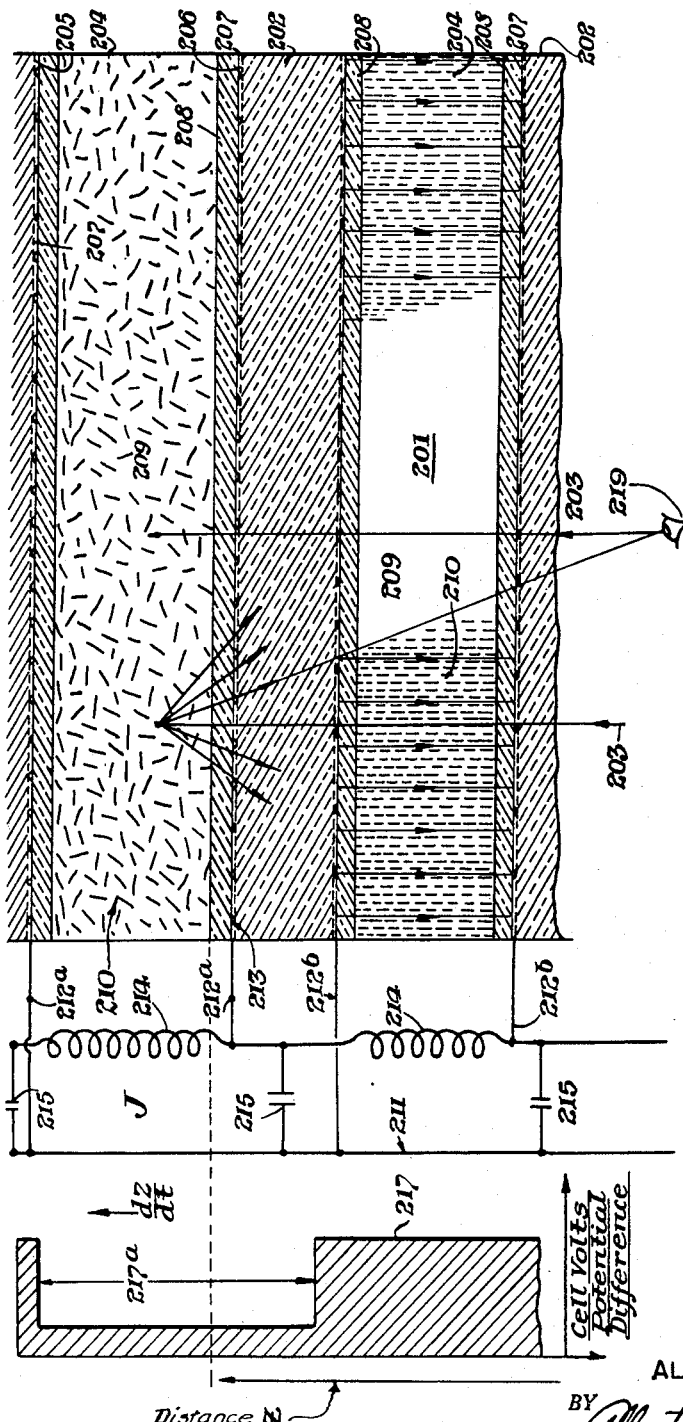

Figure 22 is a schematic view of a delay line used in connection with the screen shown in Figure 21, Figure 23 is an enlarged detail of the screen shown in Figure 21, Figure 24 is a schematic diagram of a circuit referred to herein as a "depth selector" circuit, Figure 25 illustrates a circuit associated with the receding screen projection apparatus, Figure 26 is a diagram showing the optical system employed for projecting upon the screen shown in Figure 21, Figure 27 is a diagram showing an ion gun controlled screen, Figure 28 is a diagrammatic view in perspective of another type of three-dimensional screen herein referred to as a "solid image screen," with certain portions cut away to show its internal construction, Figure 29 is a fragmentary view of a portion of a screen showing the disorientation of dipole particles, Figure 30 is a fragmentary view of a portion of a screen showing the realignment of dipole particles, Figure 31 is a sectional view along the axis of a frequency scanning tube according to this invention, Figure 32 is a schematic drawing of a three-dimensional circuit network used in conjunction with a three-dimensional screen.

Figure 33 illustrates a single cell of the three-dimensional screen fragmented and with certain portions cut away to show the microwave control circuits thereon, Figure 34 is a vertical section of the cell shown in Figure 33 taken on line 34—34 looking in the direction of the arrows, Figure 35 is a fragmentary view of the cell shown in Figure 33 showing a three wire coaxial line and a dipole antenna inscribed on the glass of the said cell, Figure 36 is a plan view of a form of three-dimensional screen hereinafter referred to as an opaque solid image screen, Figure 37 is a pictorial view, in perspective of a three-dimensional screen in operation showing a fanciful scene generated therein, Figure 38 is a diagrammatic view of a projector and three-dimensional screen illustrating the depth contraction principle, Figure 39 is a schematic view of a specific circuit employed in the depth contraction illustrated in Figure 38, Figure 40 is a graph illustrating one form of circuit element for use in the circuit shown in Figure 38, Figure 41 is a diagrammatic view of a wide angle projection system showing the elements of analytic geometry involved therein, Figure 42 is a schematic view of a complete embodiment of the wide angle viewing and projecting system and the interconnections therebetween, Figure 43 shows the geometric relationship between an object in space and its projected position upon a flat screen, Figure 44 is a schematic view of a circuit hereinafter referred to as a "rotation transformation circuit,"

Figure 45 is a second rotation transformation circuit,

Figure 46 is a third rotation transformation circuit,

Figure 47 is a fourth rotation transformation circuit,

Figure 48 is an end view of a mechanical receding screen,

Figure 48a is a vertical section of the screen shown in Figure 48,

Figure 49 is a schematic view of a direct viewing solid image tube and its associated control circuits.

The component parts of this invention comprise a camera capable of taking pictures, a projector, and a screen member within which images are generated by the projector, and associated electrical components.

The parts of the camera assembly cooperate to scan the objects which are to be reproduced and resolve them into four electrical signals corresponding to width elements, hereinafter designated by the letter X; height elements, hereinafter designated by the letter Y; depth elements, hereinafter designated by the letter Z; and color intensity elements, hereinafter designated by the letter I. These signals operate to reconstruct a projected image, or a solid image, within the confines of a three-dimensional screen.

The points of light are either generated or reflected from within the limits of the screen member which is built with a given depth, and provided with hereinafter described means for producing the said points of light. The principle upon which this invention is broadly based is that the picture is produced by a plurality of points of light located along its horizontal (X), vertical (Y), and depth (Z) axes, with such rapidity that the eye sees a complete three-dimensional picture.

For the sake of clarity, the various phases of this invention have been described under appropriate subheadings.

The camera

Referring to the drawings, and particularly to Figure 1, 50 designates a camera directed to receive light coming from objects 51 and 52. The object 51 may be considered to be located at infinity, and the object 52 at some point in the foreground fairly close to the camera 50. Two spaced lens systems 53, 54 similar in quality to the usual photographic camera lenses, are positioned at the front of the camera 50 to receive the light emanating from the objects 51 and 52.

The light from the objects 51 and 52 passes through two filters 55 and 56, the first of which is located in front of lens system 53, and the second in front of lens system 54. These filters 55, 56 may be made of neutral color polarizing material, preferably arranged with their respective polarizing axes at plus 45°, and minus 45° to the vertical. Color filters may also be used instead of polarizers, in which case the filters would comprise complementary tints such as red and green.

A preferred form of filters 55, 56 are the type "A" and type "B" multichrome filters, hereinafter described.

Multichrome filter

The term "multichrome filter" as herein employed, comprises two plates referred to as type "A" and type "B," having spaced absorption bands throughout the visible spectrum. These absorption bands, shown as shaded sections in Figures 2 and 3, are preferably narrow. Spaced between the aforesaid absorption bands, preferably with uniform spacing, are alternate bands of high transmission. As many absorption bands alternating with transmission bands, as it is physically possible to obtain with a natural system, should be provided throughout the visible spectrum. As a practical matter, a minimum of three absorption bands and three alternate transmission bands may be chosen, although it is desirable to have as many as ten of the aforesaid absorption and transmission bands, alternating and adjacent to one another.

In the utilization of the multichrome filters, it is contemplated that two such sets of filters type A and type B will be employed. Type A will have, for example, five absorption bands from 400 to 700 millimicrons, and five transmission bands alternating with the absorption bands, and adjacent thereto. The absorption and transmission bands will, preferably, be of equal width. In this way substantially white light is transmitted through each type of multichrome filter.

The multichrome filter belonging to type B will also have five transmission and five absorption bands. However, in type B the transmission bands of a type B filter will occur at those positions where type A has absorption bands, and vice versa, as shown in Figures 2 and 3.

A property of the multichrome filters belonging to types A and B is that each multichrome filter transmits white light; that is, appears gray against a white background. However, when the light from a multichrome filter falls upon a second multichrome filter, as for example, from type A to type B, or from type B to type A, the second multichrome filter will absorb all of the light falling upon it.

Two multichrome filters, type A superimposed upon a type B, or type B superimposed upon a type A, appear black. Each multichrome filter used separately appears exactly like every other filter, and preferably has a gray color. Such multichrome filters may be constructed from materials having well-known absorption bands, for example, copper chloride which absorbs in the red and in the blue; didymium chloride which absorbs in the yellow; iodine which absorbs in the blue and yellow, as well as many well-known dyestuffs. These materials, which are said to contain "chromophoric" structures, are herein more simply referred to as "chromophoric materials."

Suitable mixtures of these materials are compounded into a transparent resin in which the said materials are held in a state of solid solution, providing a transparent film having the properties of the aforementioned multichrome filter.

Since most substances have absorption bands, or transmission bands, which may be wide and not sufficiently sharp, there is provided means for producing narrower absorption bands, by utilizing the principle that crystalline materials generally have sharper absorption bands than amorphous materials. Thus, the light absorbing materials are caused to inter-crystallize with a crystalline plastic.

Suitable plastics may comprise, for example, polyvinyl alcohol or acetals, cellulose hydrate, the polyamides, polyvinylidene chloride, etc.

It is also known that absorption bands may be shifted by dissolving the absorbing materials in various solvent media. Similarly, various plastic media may be employed to form solid solutions with the chromophoric materials. The plastic may be crystallized, as by stretching, with the result that the absorption bands of the chromophoric materials are narrowed. By employing various well-known differing chemical structures for the said crystalline plastics, the result of shifting the wavelengths of the absorption bands may be accomplished. Thus there has been provided means for narrowing and shifting the absorption bands of chromophoric materials.

In this manner a series of substances may be utilized within a crystallized plastic of one composition for multichrome filter A; and a similar series of absorbing materials may be included in a crystallized plastic of a different composition, for multichrome filter B.

The result achieved by this means is the shifting of all of the absorption bands simultaneously, so as to form either a type A or a type B multichrome filter.

Image blocking grating

Referring again to Figure 1, the light from lens system 54 is reflected from mirrors 57, 58 and thrown upon an image blocking grating 59 within the camera 50. The light from lens system 53 is reflected from mirrors 60, 61 and thrown upon the same grating 59. The grating 59 is formed of alternate strips of material 62, 63, as shown in Figure 4, having the same light transmitting characteristics as those of the filters 55, 56. This, for example, if the filters 55, 56 are made of neutral color polarizers having their axes of polarization at right angles to each other, the alternate strips 62, 63 will be similarly constructed and disposed. In this manner, light coming through filter 55 and lens system 53 will pass only through alternate strips 62, and will be blocked by strips 63 by the well-known operation of crossed polarizers. Light coming through filter 56 and lens system 54 will pass only through alternate strips 63. Although lines of polarization are indicated at plus and minus 45° in Figure 4, it is also possible to have them at 0° and 90°. The latter alignment may be preferable where mirror reflections are involved.

Instead of employing polarizers, multichrome filters may be employed. Filter 55 and strips 62 may comprise a type A multichrome filter, and filter 56 and strips 63 may comprise a type B multichrome filter. An advantage of this construction is that the multichrome filter does not require angular adjustment as does the polarized filter.

The construction of one form of grating 59 employing polarizers is best shown in Figures 4 and 5. Figure 4 is a front elevation of the grating and shows clearly the position of the alternate strips 62, 63. Figure 5 is a longitudinal section of the grating 59, shown in Figure 4. In forming these screens, any suitable polarizing medium having polarizing surface layers, may be employed, for example, the polarizing medium disclosed in my United States Patents Nos. 2,104,949, dated January 1, 1938, and 2,199,227, dated April 30, 1940, are particularly suitable.

As shown in Figure 5, the polarizing surface medium is scraped or cut away from the supporting glass surface 64, leaving strips 62 remaining thereon. A transparent lacquer 65 is then applied and allowed to dry. The opposed glass support 66 is similarly scraped leaving strips 63 over which lacquer 65 is applied to protect the surface thus formed. The two surfaces are then joined by a transparent cement 67, such as a transparent thermoplastic resin commonly employed for such purposes in the optical art.

Electron multiplier electrodes are conventionally associated with the collector electrode employed with the Farnsworth dissector tube to increase the sensitivity thereof. To increase the sensitivity of the image dissector tube hereindescribed electron multiplier electrodes may also be advantageously employed in connection with the collector electrodes 70 and 71 shown in Figure 10. However, to simplify the drawing these electron multiplier tube structures are not shown.

*Dissector tube*

A Farnsworth or similar image dissector tube 68, shown in Figure 1, is located behind the grating 59. While the photo-electrical screen 69 of this tube 68 is positioned, for the sake of clarity, in the drawing, so that the light impinges upon the rear of it, it will be obvious to anyone skilled in the art that a conventional type Farnsworth image dissector tube may be employed in lieu thereof, with the light projected approximately normal to the front surface of the screen 69. It is clear, however, that in the event a standard tube is used, images formed on the grating 59 would again have to be thrown upon the front surface of the screen by a second projection lens, as shown in Figure 10.

Instead of the single collector electrode, usually employed in the Farnsworth tube, two collector electrodes 70, 71 are used. The electrodes 70, 71 are disposed vertically within the camera 50, but are shown in a horizontal position in the plan view of Figure 1, for the purpose of clarity.

The electrons emitted from the surface of the screen 69 are scanned in the conventional manner by the electrodes 70, 71 along the height and width of the said screen. The electrons liberated by the light which passed through strips 62 of the grating 59 are scanned by the upper electrode 70, while those which resulted from the light passing through the strips 63 of the grating 59 are scanned by the lower electrode 71.

*Iconoscope or orthicon tube comparator screen*

As an alternate pickup tube, the well-known iconoscope or orthicon principle may be employed.

The present invention contemplates the utilization of a novel type or comparator screen in connection with the iconoscope or orthicon camera tubes. Figure 5a is a schematic representation in perspective of the present invention. The mosaic plate 69a, which may be of mica, has the conventional photoelectric globules 267 deposited on one face thereof. On the other face, in place of the continuous coating or single electrode ordinarily used in this type of tube, there is employed two electrodes forming the interlocking pattern shown in Figure 5a. All of the electrode strips 62a are interconnected and all of the electrode strips 63a are interconnected. The strips 62a are connected to the electrode 70a and the strips 63a are connected to the electrode 71a. The alternate strips 62a, 63a correspond to the right and left images which are projected on the globules 267, in front of the corresponding strips 62a, 63a. That is, image strip 62, always falls upon those globules 267 on the face opposite conducting strip 62a, and image strip 63 falls upon those globules 267 on the face opposite conducting strip 63a.

An electron beam 85a is employed in scanning the screen. The cross sectional area of the electron beam 85a is rectangular as shown in Figure 5a. Such an electron beam may be formed by emission through a rectangular aperture in the electron gun structure 728. The electron beam 85a thus is made to fall simultaneously upon those globules 267 upon which the image strips 62, 63 are focused. Collector ring 87a may pick up the photo-electrons or electrons which are scattered from the mosaic screen.

Due to the photoelectric emission, and simultaneous replenishment of the charge by the electron beam 85a, two signals, produced by capacitative action, are created, which are thereupon led from the electrodes 70a and 71a through conventional compensated amplifiers, similar to those ordinarily employed with iconoscope or orthicon camera tubes, and are thence led along the lines 88, 89 respectively to the circuits shown in Figure 10. Thus signals generated at terminals 70a, 71a eventually appear at terminal 491 as a voltage $e_z$, or depth factor voltage, and at terminal 91 as $e_i$, or the intensity factor voltage, characteristic of the element of area instantaneously being scanned. The behavior of the device schematically indicated in Figure 5a is otherwise conventional. A similar mosaic plate may be employed in connection with orthicon tube employing semitransparent or translucent strips 62a, 63a. To simplify the drawing the tube envelope has not been shown in Figure 5a.

*Image displacement principle*

The light which was reflected from the object 51 located at infinity will pass through the two lens systems 53, 54 in such manner as to become vertically aligned upon adjacent strips, as to point 51a upon the comparator screen 69. The result is that both electrodes 70, 71 will be energized equally. The light which was reflected from the foreground object 52, however, will become vertically displaced upon the screen 69 after it has passed through the lens systems 53, 54. Because of the spaced relationship of the lens systems 53, 54, the images of the object 52 will appear displaced either to the right or to the left, as at 52a and 52b, respectively.

It has been determined that the closer the object 52 is to the lens systems 53, 54, the greater will be this lateral displacement. The farther the object from the lens systems 53, 54, the smaller becomes this deviation, until it reaches a point indicated by the object 51 beyond which there will be no effectively measurable lateral displacement, and which may be termed infinity. The extent of the displacement of each of the adjacent image elements upon the screen is translated by the electrodes 70, 71, and by the hereinafter described electrical network, into an electrical signal representing this displacement. Thus a depth factor (Z) is obtained for each element of area of the image, in addition to its horizontal (X) and vertical (Y) location in the picture.

A graphical illustration of the above mentioned displacement is shown in Figures 6, 7 and 8. The object 51 which is assumed to be at infinity is indicated in each of the strips 62, 63 in Figure 6. The object 52 which, for example, may be a telegraph pole in the foreground, is represented by the solid section in each of the strips, 62, 63. It is apparent from an examination of Figure 6, that the image of the object 51 is not appreciably displaced as it passes through the lens 53, 54. The images of the foreground object 52, however, are relatively displaced on the adjacent strips. This optical result is translated into corresponding electrical signals by the comparator screen 69 of the dissector tube 68, and picked up by the electrodes 70, 71 therein. The electrical signals resulting from the displacement of the light from the image 52, and the coincident light from the object 51 located at infinity, are graphically shown in Figure 7. The portions of the lines which correspond to the respective pulses have been given the same reference numbers as the objects 51, 52 themselves, for the sake of clarity. The dotted lines indicate the extent of the foreground displacement between adjacent strips 62, 63. The difference in this displacement in adjacent strips is illustrated as translated into pulses 100 of the time durations $\Delta t_1$ and $\Delta t_2$ in Figure 8, which gives rise to the depth factor (Z).

An examination of Figure 9 will reveal that certain mathematical relationships may be established with respect to this system. It will be advantageous for the subsequent understanding of the invention to set forth these relationships in the form of simple equations.

Accordingly, Figure 9 schematically illustrates two television type cameras in which the screens 83—84 are scanned in any suitable manner, as for example, as shown in Figure 1. These cameras have two spaced lens systems 53, 54 which are focused upon a foreground object 52. Each lens 53, 54 projects an image upon separate screens 83, 84 as indicated at 52a—52b. Photoelectron beams 85, 86, forming an electronic image, are emitted from screens 83, 84, said electronic image being given a scanning motion by electric fields (not shown).

Adopting a system of symbols to represent the factors involved:

Z equals the distance between a line joining the optical centers of the lens systems 53, 54 and the object 52
$d_1$ equals the distance between the optical centers of the lens systems 53, 54
$d_2$ equals the distance between the image points 52a, 52b thrown upon the screens 83, 84 by the lens systems 53, 54 from the object 52
$d_3$ equals the constant distance between the two electron beams 85, 86 coming from corresponding portions of the screens 83, 84
$\Delta d$ equals $d_2$ minus $d_3$; equals displacement of the images 52a, 52b, relative to the constant distance between the electron beams 85, 86
D equals the distance between the projected images 52a, 52b, and the optical centers of the lens systems 53, 54
V equals the speed of sweep Constants $K_1$, $K_2$, and $K_3$ defined as follows, are useful in the derivation. $K_1 = Dd_1; K_2 = Dd_1/V; K_3 = d_1 - d_3$
From the geometry of Figure 9 are obtained the following equations:

$$d_2/d_1 = (Z+D)/Z \qquad (1)$$
$$d_2 = (1+D/Z)d_1 = d_1 + Dd_1/Z \qquad (2)$$

Computing the value of $\Delta d$ by substituting the value for $d_2$:

$$\Delta d = d_2 - d_3 = d_1 + Dd_1/Z - d_3 = K_3 + K_1/Z \qquad (3)$$

The distance between the electron beams 85, 86 is held constant $= d_3$.

Referring to Figure 11, the optical axes of the lens systems 53, 54 may be brought quite close together, and by employing the prism 77 $d_1$ and $d_3$ may be made equal, and thereupon $K_3 = 0$. Under these circumstances the following is obtained:

$$\Delta d = K_1/Z \qquad (4)$$

Even if the term $K_3$ in (3) has some value other than 0 this constant term may be eliminated electrically by using only the variational, or second term, for example, by employing a blocking capacitor to eliminate the constant or D.C. electrical component.

*Pulses*

Where an abrupt change occurs in the illumination received by the comparator screen 79, shown in Figure 10, a pulse is produced at the collector electrode terminals 70, 71. In order to subsequently produce a signal proportional to the depth (Z), a voltage proportional to the duration $\Delta t$ of the said pulse must first be generated. Furthermore, the said voltage must be maintained until a new pulse is generated corresponding to another depth to the object being viewed. The duration of the pulse and the voltage derived therefrom depend upon the displacement indicated above as $\Delta d$. This displacement, $\Delta d$, in turn is related to the depth factor (Z) by the Equation 3 or 4, the latter being the simplified version.

In addition to abrupt changes, relatively gradual variations emanating from the comparator screen 79 may occur in lieu of the pulses. Disclosure is hereinafter made of means for deriving an electrical depth factor from such relatively gradual changes, subsequently referred to as "slope responses or slope voltages," and illustrated in Figure 12.

For abrupt changes in illumination, displacement $\Delta d$ is converted to a pulse of duration $\Delta t$. This follows, since the electron beam 86 traverses the distance $\Delta d$ in the time $\Delta t$. If the velocity of the electron beam is V, then the following relationship exists:

$$V = \Delta d / \Delta t \qquad (5)$$

From which:

$$\Delta t = \Delta d / V \qquad (6)$$

By substituting for $\Delta d$ the value derived in Equation 4, there is obtained:

$$\Delta t = (Dd_1/V)/Z = K_2/Z \qquad (7)$$

*Slope depth factor derivation*

Having arrived at Equation 7, it now becomes possible to indicate mathematically certain relationships with respect to the slope depth factor derivation circuit, shown diagrammatically at 95 in Figure 10. It has been seen in connection with Equation 7 that the duration of the displacement $\Delta t$ is reciprocally related to the depth factor (Z).

If the object 52 in Figure 10 comprises areas which shade gradually as well as varying with distance, the voltage at the two collector electrodes 70, 71, hereinafter referred to as $e_1$ and $e_2$, respectively, and measured with respect to ground across resistors 92a and 92b, will produce a voltage time graph, a typical example of which is shown in Figure 12. In Figure 12 typical slope response regions on the said graph are shown as the intervals 97 and 99. Also shown in Figure 12 is an intermediate interval 98, which corresponds to a pulse which might be produced by a small dark object scanned during the said interval 98. The pulse in region 98 generates a depth factor signal described below in connection with circuit 94, shown in Figure 10.

Returning to the intervals 97 and 99, during which intervals the voltage time graph has a sloping wave form similar to that shown, it is seen that sloping waves $e_1$ and $e_2$ are slightly displaced from one another in time, the time displacement being instantaneously proportional to $\Delta t$.

Since the displacement $\Delta t$ cannot readily be measured instantaneously and continuously by any previously known means, an electronic circuit has been devised which is capable of performing this operation, with the result that the output of the said circuit is a signal voltage instantaneously proportional to the depth factor (Z).

It has become necessary, however, to derive a new equation for measuring $\Delta t$ from quantities which are instantaneously derivable from the collector voltages $e_1$ and $e_2$.

Referring to Figure 12, and more particularly to the triangle ABC in which the angle $ACB=e$, shown in an enlarged view in Figure 13, it will be seen that:

$$AB = e_1 - e_2$$
$$CB = \Delta t$$

The slopes of the waves of $e_1$ and $e_2$ at A and B respectively, are the instantaneous slopes, or tangents EF and GH to the said waves $e_1$ and $e_2$ at A and B. The average of the slopes of EF and GH is approximately equal to the slope of the line AC, i.e., $$\tan 0 = AB/CB = (e_1 - e_2)/\Delta t \quad (8)$$
$$\text{Slope } EF = de_1/dt$$
$$\text{Slope } GH = de_2/dt$$

$$\text{Slope of } AC = \tan 0 = (de/dt) \text{ ave.}$$
$$= \frac{1}{2}(de_1/dt + de_2/dt) \quad (9)$$

Solving (8) for $\Delta t$, and substituting for tan 0 from (9) the following is obtained:

$$\Delta t = (e_1 - e_2)/\tan 0 = (e_1 - e_2)/(de/dt) \text{ ave.} \quad (10)$$

From Equation 7:

$$\Delta t = K_2/Z \quad (11)$$

Solving Equation 7 for Z, and substituting the value of $\Delta t$ from Equation 10:

$$Z = K_2(de/dt) \text{ ave.}/(e_1 - e_2) \quad (12)$$

This final equation (12) is the one which the slope depth factor derivation circuit, hereinafter described, utilizes to automatically compute, instantaneously, the value $e_{zs}$ from the collector voltages $e_1$ and $e_2$; where $e_{zs}$ is a voltage proportional to the depth factor (Z).

Having Equation 12, it now becomes apparent that the instantaneous depth factor (Z) corresponding to a point at XYZ on the object, may be derived from the voltage time graphs of the collector electrode voltages $e_1$ and $e_2$.

While various methods of instantaneously deriving a signal voltage $e_z$ proportional to (Z) may be employed, now that Equation 12 has been derived, it is preferred to use the electronic device described below, and diagrammatically shown in Figure 19.

The duo-lens camera

Figure 10 shows an alternative form of lens system, hereinafter referred to as a "duo-lens" and a diagrammatic view of the circuit associated therewith. This form is preferred to that shown in Figure 1, although the first showing facilitates the explanation of the camera's operation.

The duo-lens arrangement shown in Figure 11 in plan, comprises two lens systems 72, 73 having their optical axes 81, 82 separated by only a small distance. The two lens systems are separated by an absorbing partition 74. The object of this construction is to provide only a very slight displacement between adjacent portions of the image on the grating 59. Where the lens systems are widely separated, as is shown in Figures 1 and 9, excessive separation of the images may be produced with a resulting confusion of the depth signals.

Lens 72 may comprise a spherocylindric lens (not shown) for the purpose of elongating the image elements projected on screen 79. This construction may be provided so that small circular objects will appear sufficiently elongated to enable a satisfactory displacement to be obtained on the adjacent strips 62, 63.

The manner in which a conventional image dissector tube may be used in conjunction with this invention is also shown in Figure 10. The light from the object 52 enters each of the lens systems 72, 73 comprising the duo-lens system, having first passed through polarizers or multichrome filters 75, 76. The light leaving the duo-lens is bent by a bi-prism 77 which causes the two beams to converge and impinge upon the face of a blocking screen 59, as above described in connection with Figures 4 and 5. This convergence is preferably such as to produce vertical alignment for image points on adjacent blocking screen strips from object points located at infinity.

The light emanating from the screen 59, which preferably has a diffusing surface 59a, such as a fine sandblasted surface, is picked up by a second projecting lens 78 and thrown upon the photosensitive screen 79 within the tube 68. The electrons emitted from the screen 79 pass between the well-known sweep plate arrangement 80 and are scanned by the electrodes 70, 71. A positive grating 87 is positioned behind the collector electrodes 70, 71, to cause the electrons which are emitted from the screen 79 to travel in approximately parallel lines away from the screen 79, as shown. Those electrons which do not impinge upon collector electrodes 70, 71, are picked up by the positive grating 87.

Depth voltage derivation

The electrical signals $e_1$ and $e_2$ received by the electrodes 70, 71 (Figure 10) are conducted along the wires 88, 89. A resistor 90 is shunted across the wires 88, 89 and a signal is taken from the midpoint of the resistor 90 by the wire 91. The signal, $e_1$, transmitted by the wire 91 is proportional to the average intensity of the image elements giving rise to the adjacent electron beams 85, 86. The signal $e_1$ is also used in the image projection for the control of the intensity of corresponding elements. The conductors 88, 89 are connected through resistances 92a, 92b to ground, and the current derived thereby is carried by the wires 88, 89 to a pulse slope sorter circuit 93, hereinafter described. At the pulse sorter 93 the two types of signals received by the camera, that is, pulses diagrammatically shown in Figure 8 and slopes shown at 97 and 99 in Figure 12, are separated. The pulses are passed along to the pulse depth factor derivation circuit 94, which, by employing Equation 7, continuously and substantially instaneously electrically computes a depth factor voltage, which is herein indicated as $e_{zp}$. The voltage $e_{zp}$ is inversely proportional to the duration $\Delta t$ of the pulse, and is directly proportional to the depth factor (Z) of the element scanned at that instant. The slope voltages are passed along to a slope depth factor derivation circuit 95.

During the time the slope voltages are created by gradual variations of light intensity emanating from the object, the slope depth factor derivation circuit 95 produces instantaneously therefrom an output signal $e_{zs}$, which is proportional to the instantaneous depth of the scanned element. The method by which the slope depth factor derivation circuit accomplishes this function is hereinafter more specifically described.

Both voltage $e_{zp}$ and voltage $e_{zs}$ produced respectively by the circuits in blocks 94, 95 are applied to the synthesis circuit 96, described more specifically below, and shown in Figure 20.

The synthesis circuit 96 assimilates $e_{zp}$ and $e_{zs}$, and produces voltage $e_z$, which corresponds to the instantaneous depth Z.

The parts of the circuit which comprise the pulse slope sorter circuit have been numbered consecutively, starting from 400, inasmuch as the numbers from 100 to 399 have been reserved for subsequent portions of this disclosure.

Pulse slope sorter circuit

The broad function of the pulse slope sorter circuit 93 is to divide the signals from the comparator screen 69 by way of the collector electrodes 70, 71, into either of two channels. One channel is for voltage pulses resulting from abrupt changes in illumination. The second channel is for slope voltages resulting from gradual changes in illumination. The pulse voltages are fed into the pulse depth factor derivation circuit 94, and the slopes into the slope depth factor derivation circuit 95.

In addition to the above function the pulse slope sorter circuit produces enabling voltages 153, 154 and 409, which are supplied to the slope depth factor derivation circuit 95 and also the synthesis circuit 96. Since the various pulses which arrive at the pulse slope sorter circuit 93 are of different amplitudes, it is also the function of this circuit 93 to produce pulses of constant amplitude while preserving the duration of the original pulse.

The voltage $e_1$ and $e_2$ which are picked up by the collector electrodes 70, 71 are fed into a resistor network 400. The output of this network 400 is a voltage $e_i$ which is the average value of the two voltages $e_1$ and $e_2$ and also corresponds to the average intensity of the illumination received. The voltage $e_i$ is led off as at 401 for subsequent use in projecting the intensity of the three-dimensional image, as hereinafter described. The voltage $e_i$ is also fed into the pulse slope sorter circuit 93, shown in Figure 14.

Referring now to Figure 15, the graph A illustrates typical slope and pulse wave voltages $e_1$ and $e_2$, such as are received by the collector electrodes 70 and 71. Graph F shows these voltages $e_1$ and $e_2$ averaged and resolved into a single voltage wave $e_i$ by reason of having been passed through the resistance network 400 prior to being fed into the pulse slope sorter circuit 93.

The complete preferred form of the pulse slope sorter circuit 93 and the manner in which it operates to energize the pulse depth factor derivation circuit 94, the slope depth factor derivation circuit 95, and the synthesis circuit 96, is shown in Figure 14. The various circuits 402, 403, 404, 405 and 406, comprising this pulse slope sorter circuit 93, are enclosed within boxes for their convenient identification.

The broad operational functions of the circuits 402, 403, 404, 405 and 406 are as follows:

The circuit contained within the box 402 responds only to that portion of the voltage $e_i$ which contains slopes, producing a positive voltage at terminal 407 whether the input slope voltage is positive or negative. This positive voltage at 407 is fed into a clipper and limit amplifier 408, which produces a constant level enabling voltage output at 409 whenever the input voltage 407 is greater than a minimum positive voltage 410, as shown on curve I in Figure 15.

The circuit in box 403 produces a decreased output voltage at terminal 411 whenever the positive slope voltage 409 is applied to the grid 412 of the gas tube 413. A sharply increased voltage, however, is produced at terminal 411 when a positive pulse from the circuit in box 404 is applied to the cathode 414 of the gas tube 413, causing the said tube 413 to stop conducting.

The Eccles-Jordan circuit in box 405, which is connected to the circuit in box 403 at terminal 411, is actuated by the increased voltage at the said terminal 411. Thus the Eccles-Jordan circuit 405 functions to rapidly reverse the aforementioned enabling voltages 153, 154, supplied by the pulse slope sorter circuit 93 to the synthesis circuit 96, as shown on curves K and J in Figure 15.

The circuits contained in boxes 404 and 406 respond only to the pulse voltage elements in the voltages $e_1$ and $e_2$. These circuits eliminate slope wave components and produce, from the incident wave, which is a mixture of both slope and pulse voltage components, constant amplitude pulses which differ only as to their duration.

Referring again to the specific circuit contained in box 402 in Figure 14, the wave form F, shown in Figure 15, is fed through a buffer amplifier 415 and the output thereof is differentiated. This differentiation is accomplished by passing the wave from F through a differentiator circuit comprising the capacitor 416 and the resistor 417. The wave form thus produced is shown at G in Figure 15. The wave form G is then fed into the circuit in box 402 through the capacitors 418, 419. The diode 420 and the positive potential source 421 act to clip the wave form G at voltage level 422. The diode 423 and the negative potential source 424 act to clip the wave form G at voltage level 425.

A voltage divider comprising resistors 426 and 427 and the capacitor 428 which shunts resistor 427, acts to supply positive slope voltages to diode 429, which thereupon draws current through resistor 430, applying a positive voltage at terminal 407. The pulses, which constitute voltage surges, produce sharp pips which are shorted through the capacitor 428 so as not to affect the diode 429. In this manner the output voltage wave 407 is not affected by the pulses.

The negative slope voltages and negative voltage pips are similarly applied to the voltage divider comprising resistors 431 and 432, and capacitor 433, the said capacitor 433 shunting the resistor 431. This voltage divider applies the negative slope wave components to the diode 434, producing a current thereby through the resistor 435, which thereupon also produces a positive voltage at terminal 407. The negative pulse pips are also shorted past the diode 434 by the capacitor 433, as above noted with the diode 429.

The wave form H, shown in Figure 15, represents the voltage across the resistors 427 and 431, the positive or negative pips having been absorbed on capacitors 428 and 433. Thus a positive output wave 407, similar to that shown in curve I, is produced when the input voltage wave $e_i$ contains either positive or negative sloping wave components, together with a succession of pulses.

Since the positive voltage 407, shown on curve I, may vary considerably in amplitude, a conventional clipper and amplifier 408 is employed therewith. This circuit 408 produces a constant voltage 409 whenever the voltage wave 407 exceeds the positive voltage 410, shown on curve I. The voltage 409, hereinafter referred to as a gating voltage, is used to operate a "hold" circuit 465, described below (see Figure 19), whenever the voltage 407 is less than the voltage 410.

The voltage 409 is also applied to the circuit shown in box 403. When used in connection with the circuit 403 the voltage 409 signals the arrival at the circuit in box 403 of the slope voltage components in the input voltage $e_i$. The application of this voltage 409 to the circuit 403 causes the Eccles-Jordan circuit in box 405 to produce the enabling voltages 153 and 154 which control the synthesis circuit 96.

The means by which the voltage at terminal 407, through the circuits shown in boxes 403 and 405 results in the enabling voltages 153, 154, is as follows:

The voltage wave 407, of varying amplitude, is impressed upon the circuit 408 and produces a gating wave 409 whenever the voltage 407 exceeds a minimum voltage 410. The positive gating voltage 409 is then applied to the grid 412 of the tube 413 which is ordinarily held below cutoff by the negative potential source 437. The tube 413 is a gas tube, which, once having been rendered conducting, by virtue of the grid 412 going positive relative to its cathode 414, remains conducting until the voltage between its plate 438 and cathode 414 falls below a critical value. In the absence of a pulse voltage supplied to the cathode 414, once a slope voltage wave has established conduction in the tube 413, current is passed through the plate resistor 439, the tube 413, and the resistor 440 to ground. The decreased potential at plate 438 caused thereby is transmitted through the capacitor 411a to the terminal 411. This drop in potential at 411 when applied to the grid 442 of the tube 441 in the box 405, tends to cause the tube 441 to become non-conducting. As a result, the enabling voltage 153 at the plate 443 of the tube 441 increases, and voltage 154 at the plate 445 of the tube 444 decreases, as shown at 446 on curves J and K in Figure 15.

However, when a positive voltage arrives at cathode 414, of the tube 413, the said cathode 414 increases in potential relative to the plate 438 of the said tube 413 and conduction therethrough stops, causing the potential at the said plate 438 to increase suddenly. This increase in potential is transmitted through the capacitor 411a to the grid 442 of the tube 441, thereby causing the tube 441 to conduct and the tube 444 to become non-conducting.

The voltage 153 thus tends to decrease suddenly while the voltage 154 simultaneously increases suddenly. This is shown on the curves J and K at 446a in Figure 15. The enabling voltages 153 and 409, together with the voltages $e_1$ and $e_2$ from the collector electrodes 70, 71, are supplied to the slope depth factor derivation circuit 95.

Where two voltage pulses N and N+1 are received by the collector electrodes 70, 71 without a slope wave component intervening, as shown on curve B in Figure 15, the tube 413 in box 403 remains non-conducting with the resultant enabling wave forms shown on curves J and K in Figure 15. During the interval 98, thus produced, the synthesis circuit 96 switches the pulse depth factor derivation circuit 94 into the output channel 491, the voltage thereat being termed $e_z$. The depth voltage factor $e_{zp}$ derived from the first pulse N is held until the second pulse N+1 comes along. Thus the voltage $e_{zp}$ becomes the voltage $e_z$ until a slope voltage $e_{zs}$ is received, thereby causing the synthesis circuit 96 to switch the voltage $e_{zs}$ from the slope depth factor derivation circuit 95 to the output channel 491, whereupon $e_{zs}$ then becomes, momentarily, identical to $e_z$.

Before applying the voltage $e_1$ and $e_2$ to the circuit shown in box 406, which is to respond only to pulse voltages, it becomes necessary to derive the arithmetic difference between these two voltage waves $e_1$ and $e_2$. An examination of curve B in Figure 15 which illustrates this arithmetic difference shows that the arithmetic difference between the slope wave components is usually a negligible voltage compared to the difference between the pulse components. Thus by obtaining the arithmetic difference between the two wave forms $e_1$ and $e_2$ the slope wave components may be largely eliminated before applying the voltages to the circuit in box 406. The arithmetical difference between $e_1$ and $e_2$ is obtained by connecting the buffer amplifier 447 directly to the collector electrodes 70, 71. The voltage wave $e_1-e_2$ is fed through a buffer amplifier 447 and then through the differentiator circuit which produces an output wave proportional to $d(e_1-e_2)/dt$; a typical example of which is shown as curve C. A comparison of the differentiated slope component as shown in curve C with the arithmetic difference between the slope components in $e_1$ and $e_2$ shown in curve B will illustrate that the slope components in curve C are even more negligible than the difference between $e_1$ and $e_2$, in curve B. Under certain conditions, however, the amplitude of the differentiated slope components may be appreciable. For this reason the circuit in box 406, which is utilized to pass only pulse components and to absorb the slope components, is provided with means for clipping the voltage wave shown in Figure 15 at C at the levels 448 and 449.

The clipping portion of the circuit 406 comprises the diode 450, potential source 451 and the resistor 452 which function to transmit all positive voltage components greater in value than the clipping voltage level 448 to ground. Since pulse voltages alone will produce pips 453 as shown on curve C, which will exceed the clipping voltage level 448 only pips 453 will be transmitted to ground. When a pip 453 is transmitted through resistor 452 however, it results in a potential rise at the capacitor 454. This potential rise is transmitted to the midpoint terminal 455 of the capacitors, 454, 454a. Similarly, all pip voltages which are more negative than clipping voltage level 449 are transmitted by the diode 456, the potential source 457 and the resistor 458 to ground. Thus both positive and negative pips which are either above or below the clipping levels 448 and 449, respectively are transmitted to the midpoint terminal 455, and appear as shown in curve D in Figure 15 as positive or negative pips 453. These pips 453 are then fed into the midpoint 459 of capacitors 460, 461 which comprise part of the Eccles-Jordan "flipflop" circuit, shown in box 404. Either positive or negative pips 453 cause the circuit 404 to "turn over," with the result that there is produced at terminal 462 a series of pulses 100 which are of constant amplitude, varying only in duration. These pulses 100 are then fed into the pulse depth factor derivation circuit 94 for analysis into voltage $e_{zp}$ and thence for subsequent transmission to the synthesis circuit 96 and to the projecting apparatus.

Returning again to the circuit in box 406, the voltage wave components which lie between the clipping voltage levels 448, 449 are fed into the resistive load 463 where they are absorbed.

*Pulse depth factor derivation circuit*

Referring to Figure 16, 100 indicates a succession of square wave pulses, corresponding to abrupt changes in illumination, the duration of which is inversely proportional to the depth factor (Z). That is, for a depth of infinity the pulse duration is 0, whereas for foreground objects the pulse length may be, for example, of the order of several microseconds.

The three pulses N, N+1 and N+2, which are shown at 100, may comprise any three successive pulses. These pulses are of the same amplitude inasmuch as the input depth signal has previously been amplified and clipped at a definite voltage level by any suitable means. The pulses 100, therefore, differ only in their respective durations.

The pulses 100 are applied to the terminals 101 of the pulse depth factor derivation circuit 94, shown in Figures 10 and 16. The pulses 100 are led to a differentiator circuit comprising a capacitor 102 and a resistor 103 wherein the square wave duration pulses 100 are converted to positive and negative pips as indicated at 104. The negative pips are clipped by the diode 105 so that only the positive pips remain at 106 and are fed into terminal 107 of the Eccles-Jordan "flip-flop" circuit illustrated in box 108. The function of the circuit 108 is to cause switching voltages 109 and 110 to be produced and controlled by the pip input 106.

Also connected to the input terminal 101 is a delay line 111, which introduces a very slight delay before transmitting the pulses 100a to the terminal 112. It is within the purview of this invention to insert delay lines between the various circuits in order to produce the same time delay, for example, in computing and feeding the voltage $e_{zs}$ to the synthesis circuit 96 as compared to feeding the voltage $e_{zp}$ to the same circuit 96. One such delay line 111 is shown in Figure 16 but for the purpose of simplicity further delay lines have been omitted.

The purpose of the switching voltages 109 and 110 is to enable circuits shown in dotted blocks 113 and 114 to function alternately.

More particularly, pulse N will be applied to circuit 113 through condenser 115a and causes the potential to rise at terminal 116a which is connected through capacitor 117a, and resistor 118a to ground. The RC value of 118a and 117a is so adjusted that for the pulse durations ordinarily handled, the voltage rise at 116a is proportional to the duration of the applied pulse N.

A diode 119a is connected between terminal 116a through resistor 120a to ground as indicated. Switching voltage 109 is applied to the cathode 121a via resistor 122a through capacitor 109a. As shown, the positive voltage 109 produced by circuit 108 causes the cathode 121a to be driven positive, thus rendering the diode 119a non-conducting. Consequently, it will be apparent that when the switching voltage 109, shown at 109 in Figure 17, is positive, the grid 123a of the tube 124a will acquire the same potential as the terminal 116a, and if the tube 124a is operated on the straight line portion of its characteristic curve, a current is caused to flow through its plate circuit resistor 125a and its cathode circuit resistor 127a proportional to the voltage maximum at 116a, as long as the switching voltage 109 remains positive (see Figure 17). However, as soon as the switching voltage 109 drops, the diode 119a connects the grid 123a to ground and also rapidly discharges the condenser 117a. The tube 124a also stops conducting owing to the cathode 131a of the tube 124a being maintained positive by potential source 126a.

As a consequence, the current through the tube 124a flows through resistor 127a and produces a potential at terminal 128a proportional to the duration of the applied pulse N. This potential at terminal 128a is applied across condenser 129a to common terminal 137, which is the junction point of circuits 113 and 114.

Circuit 114 is identical with that of 113 and operates in the same manner, except that switching voltage 110 is applied as shown via resistor 122b through capacitor 109b, instead of voltage 109 through capacitor 109a to resistor 122a in circuit 113.

Broadly speaking the operation of the circuit components 108, 111, 113, 114 act as follows: Pulse N causes circuit 108 to apply control voltage 109 at cathode 121a, at the same time control voltage 110 drops to nearly zero, thus discharging 117b and disabling tube 124b; the voltage at 116a continues to increase linearly for the duration of the applied pulse N. The final voltage which is attained thus depends on the duration $\Delta t_1$ of the pulse N. The net effect is to produce a voltage at 137 proportional to the pulse duration $\Delta t_1$. This voltage is maintained as shown at 130 in Figure 17, until the next pulse $N+1$ comes along, which causes the circuit 108 to again become operative, causing voltage 109 to drop to nearly zero, and causing voltage 110 to become more positive. This change of voltage illustrated in Figure 17 at 132a and 132b renders 119a conducting and causes condenser 117a to discharge, also causing the tube 124a to become non-conducting. Simultaneously, diode 119b becomes non-conducting, and condenser 117b becomes charged to a voltage proportional to the duration of pulse $N+1$. This voltage, appearing at terminal 116b, in the manner described in connection with circuit 113, produces a voltage 133, as shown in Figure 17, at terminal 137, which is proportional to the duration of pulse $N+1$. The voltage 133 is maintained until pulse $N+2$ come along. The operation continues as additional pulses arrive.

Since the voltages from 113 and 114 are applied to a common terminal 137, the voltages resulting from pulses N, $N+1$, and $N+2$ follow successively, as shown on curve 134 in Figure 17. Inasmuch as a rapid but smooth variation of the single $e_z$ is preferred, resistor 135 and condenser 136 are added, as shown in Figure 16, across terminal 137. The result is that the voltage output at terminal 138 varies smoothly and substantially without oscillation between changes of voltage level, such as between 130 and 133 as shown on curve 134 in Figure 17.

There is now provided at terminal 138 a voltage 134 proportional to the pulse duration $\Delta t$. Referring now to Equation 7, it will be seen that the voltage 134 is inversely proportional to the depth factor (Z). It therefore becomes necessary to feed the voltage 134 into a circuit which will instantaneously compute and produce an output voltage which is proportional to the reciprocal of the applied voltage 134. This is accomplished by a circuit which is hereinafter called the "quotient circuit."

The circuit elements comprising capacitor 117a and resistor 118a are well-known as an "integrator circuit." This circuit functions so that the voltage at terminals 116a is the integral of the voltage applied across both of the circuit elements.

Quotient circuit

Referring to Figure 18, there is shown a quotient circuit constructed with familiar circuit components. An oscillator 142 has its frequency controlled by means of the reactance tube and tank circuit 143. The voltage 134 described above in connection with Figures 16 and 17 is applied to the reactance tube circuit 143 and causes the frequency $f$ of oscillator 142 to vary. This variation is purposely kept within a few percent, in order that the change of frequency of oscillator 142 may be precisely linear in the narrow range of variation.

In addition to the oscillator 142, a constant frequency oscillator 144 is required, for example, a crystal controlled oscillator. The output of the crystal controlled oscillator 144, of the constant frequency $f_0$, and the output of circuits 142, 143, of frequency $f$, are fed into the mixer 145 and produce an output voltage at terminals 146 of intermediate frequency $f_1 = f - f_0$.

If the oscillator 142 is initially set so that its frequency $f = f_0$ when the applied voltage 134 is zero, then any linear change in the frequency $f$ produced by the applied voltage 134 will produce a frequency $f_1$ proportional to the applied voltage 134. The frequency $f_1$ is applied to the band pass filter 147 which eliminates unwanted harmonics and the output wave is applied to amplifier 148 which contains any suitable well-known volume control circuit for producing an output at 149 having a constant voltage amplitude at terminal 149 of frequency $f_1$. The output signal at 149 is applied across the inductor 150 and the resistor 151, producing across the said resistor 151 a voltage inversely proportional to the frequency $f_1$. The voltage across resistor 151 is applied to rectifier 152, producing thereby an output voltage $e_{zp}$, which varies instantaneously proportional to the depth factor (Z); said depth factor being produced, for example, by the pulse N.

Slope depth factor derivation circuit

Referring again to Figure 14, it will be seen that the voltage derived by the circuits shown in boxes 402, 403 and 405 are enabling voltages which are present when there are slope components in the input from the collector electrodes 70, 71. These enabling voltages are fed into the slope depth factor derivation circuit 95 and permit this circuit to operate only when said slope components are present.

The function of the circuit 95, shown in block in Figure 19 is to derive an output voltage $e_{zs}$ from slope voltage components present in the voltage waves $e_1$ and $e_2$. The voltage $e_{zs}$ is proportional to the depth (Z) derived from the input voltages $e_1$ and $e_2$. Moreover, as previously pointed out, the slope depth factor derivation circuit 95 is responsive to an enabling voltage 153 produced by the pulse slope sorter circuit 93. The voltage 153 causes the circuit 95 to operate only when the said voltage 153 is at its high constant positive value.

The specific operation of the slope depth factor derivation circuit 95 becomes apparent from an examination of Figure 19. The voltage $e_1$ is fed into the control grid 155 of the pentode tube 156. The screen grid 157 of the pentode 156 is connected to the source of the enabling voltage 153. Thus the tube 156 conducts only when the voltage 153 is sufficiently positive, thereby enabling the cathode follower circuit, comprising resistors 158, 159 and capacitor 160, to function producing an output voltage 161 proportional to $e_1$. In the same manner, the voltage $e_2$ is impressed upon the control grid 162 of the pentode 163. The screen grid 162a of the pentode 163 is also connected to the enabling voltage 153 while the resistors 164, 165, and the capacitor 166 also function as a cathode follower circuit to produce an output voltage 167 proportional to $e_2$.

The circuits affiliated with the tubes 156, 163 effectively act as buffer amplifier circuits and also serve as switches, under the control of the enabling voltage 153 permitting the voltages $e_1$ and $e_2$ to be applied to or disconnected from the circuits enclosed within block 95a. Thus the output voltage 161 from one cathode follower circuit is impressed upon the buffer amplifiers 168 and 170 while the output voltage 167 from the second cathode follower circuit is impressed upon the buffer amplifiers 169, 171.

The output voltages of buffer amplifiers 168, 169 are passed through the differentiator circuits 172—173, and 174—175 respectively. Differentiator circuit 172—173 produces an output voltage at terminals 176 proportional to $de_1/dt$. Differentiator circuit 174—175 produces an output voltage at terminal 177 proportional to $de_2/dt$. The voltages at terminals 176 and 177 are connected in series, the sum thereof appearing across the potentiometer 178. The taps 179, 180 of the potentiometer 178 are adjusted so that the voltage output at terminals 181 comprises the average of the voltages appearing across the terminals 176, 177. The voltage appearing at 181, therefore, equals $(de/dt)$ ave.

Returning to the buffer amplifiers 170, 171, the output at terminals 182, 183 are so connected that the arithmetic difference of the voltages $e_1$ and $e_2$ appears across terminals 184. This voltage $(e_1-e_2)$, is applied to a quotient circuit, shown in block 185, identical in construction to that described in connection with Figure 18. The output of this quotient circuit 185 is a voltage at terminals 186 which is proportional to $1/(e_1-e_2)$.

The function of the circuits shown within the block 187 is to take the applied voltages $(de/dt)$ ave. and $1/(e_1-e_2)$ from terminals 181 and 186 respectively and instantaneously and automatically compute their product. Block 187 is, therefore, hereinafter referred to as a product circuit.

The product circuit 187 comprises a radio frequency source 188 of constant amplitude and frequency, and a first variable amplifier 189 which feeds into a second variable amplifier 190. The voltage $(de/dt)$ ave. produced at terminal 181 is applied to the control grid of the variable amplifier 189 and the voltage $1/(e_1-e_2)$ produced at terminal 186 is supplied to the control grid of the amplifier 190. The product voltage at terminal 191 is $e_{zs}$, which is proportional to the depth (Z). That the depth (Z) is proportional to the said product is evident from Equation 12, which was herein previously derived from mathematic and geometric considerations.

The radio frequency variable amplifiers 189, 190 utilize tubes (not shown) which are of the remote cut-off type. These tubes are similar to those used in radio receivers employing conventional volume control circuits in which the amplification of signals in the RF stage depends upon the voltage impressed between the cathode and control grids of the RF amplifier tubes. These circuits have not been shown as they are conventional. The characteristics of the tubes chosen for the control amplification herein employed are preferably such that their amplification factor is proportional to the impressed voltage between the cathode and the grids. Such tubes are usually constructed with a variable spacing between the turns of the wires comprising the grid spiral.

Thus the amplification factor $A_1$ of the amplifier 189 is proportional to the voltage $(de/dt)$ ave.; that is:

$$A_1 = K_4 (de/dt) \text{ ave.} \quad (13)$$

The amplification factor $A_2$ of the amplifier 190 is proportioned to $1/(e_1-e_2)$ that is:

$$A_2 = K_5/(e_1-e_2) \quad (14)$$

Since the voltage amplitude at 192 equals $e_c A_1 A_2$, it is also proportional to:

$$(de/dt) \text{ ave.}/(e_1-e_2) \quad (15)$$

The RF signal at 192 is rectified by the rectifier 193, producing the output voltage $e_{zx}$ at terminals 191. The rectifier 193 may contain a linear D.C. amplifier and a potentiometer to adjust the magnitude of the output voltage $e_{zs}$ at terminals 191.

Hold circuit

When the succession of pulses of various durations arrive at the pulse slope sorter circuit 93, in the absence of slope voltages, the pulse depth factor derivation circuit 94 produces an output voltage $e_{zp}$ inversely proportional to the immediately previous pulse duration. This value of $e_{zp}$ is held until the immediately subsequent pulse comes along. Thus $e_{zp}$ is always proportional to the depth (Z), which may change with each pulse. If, however, after any pulse, a slope voltage wave occurs, the slope depth factor derivation circuit 95 produces an output voltage $e_{zs}$ proportional to the depth (Z) corresponding to the said slope voltage wave.

If now the slope voltage wave gradually drops to zero as XX at 414 on curve G in Figure 15, the slope depth factor derivation circuit 95 must hold the immediately previous depth factor until either a pulse or another slope voltage wave of sufficient magnitude comes along. The circuit by means of which this is accomplished is hereinafter called the "hold" circuit and appears in box 465 of Figure 19.

A preferred specific embodiment of the hold circuit 465 comprises a cathode follower type of circuit in which the resistors 195, 195a are very large, for example 1 to 100 megohms and 197 is a small capacitor of the order of 100 to 1000 micromicrofarads. The capacitor 197 is capable of following rapid variations in voltage which are impressed across the low resistance path, comprising the resistor 198 (of about 5000 ohms) and the pentode 199, when the enabling voltage 409 is positive. The input voltage $e_{zs}$ at terminals 191 is applied through a coupling capacitor (not shown) across a high impedance comprising the grid 200 (which is held at a negative potential relative to the cathode 194 by the potential source 196 and the potentiometer 198) and the large resistors 195 and 195a to ground.

The high impedance input to the cathode follower constitutes a negligible load on the input signal at terminal 191. When the enabling voltage 409 is positive, the pentode 199 conducts. The voltage variations are then transmitted through the low resistance path comprising the pentode 199, the cathode resistor 198 the capacitor 197 and thence to the ground. Because of its small capacitance, the capacitor 197 is able to quickly follow the rapid voltage variations. However, when the slope voltage 407 (see Figures 14 and 15) falls below the minimum voltage 435 enabling voltage 409 suddenly drops to zero and the pentode 199 ceases to conduct. The capacitor 197 thereupon is instantaneously and effectively isolated and feeds into a high impedance circuit comprising resistor 195a and the output load comprising the synthesis circuit 96. The capacitor 197 retains its voltage for an appreciable time following such isolation, until the slope voltage 407 again exceeds the minimum voltage 435, whereupon voltage 409 again regains its constant positive value, and the pentode again becomes conducting.

As a result of this operation the circuit 465 "holds" the immediately previous value of $e_{zs}$ at terminals 466 for an appreciable time whenever the slope voltage is less than the minimum value 435. The voltage $e_{zsh}$ at terminal 466 therefore remains approximately constant for a short time, until the slope voltage is again appreciably large.

During such time as pulse voltages are applied, voltage 153 in Figure 19 is low and buffer amplifier tubes 156 and 163 effectively protect the entire slope depth factor derivation circuit shown, in Figure 19, from pulse voltage surges.

Synthesis circuit

Figure 20 shows the synthesis circuit 96 referred to above in connection with Figures 10, 14, 16 and 19. The function of the synthesis circuit 96 is to alternately accept the voltages $e_{zp}$, $e_{zs}$, produced respectively by the pulse depth factor derivation circuit, and the slope depth factor derivation circuit, which are indicated as blocks 94 and 95, respectively, in Figure 10, and to synthesize said voltages into a single volatge $e_z$, which is continuously proportional to the depth (Z), regardless of whether said depth varies abruptly or gradually.

Referring to Figure 10, in which there is shown the pulse slope sorter circuit 93, it will be recalled that this circuit generates enabling voltages 153, 154. The enabling voltage 154 is a voltage which is positive when the pulse slope sorter circuit 93 sends a pulse to the pulse depth derivation circuit, and may be, for example, zero, when the pulse slope sorter circuit 93 switches a slope voltage wave to the slope depth derivation circuit 95.

Enabling voltage 153 operates simultaneously with the voltage 154, but in the opposite manner; that is, when voltage 153 is positive 154 may be zero, when 154 is positive, 153 may, for example, be zero. In Figure 20 these voltages 154, 153 are applied respectively to the control grid 474 of the tube 476, through the resistor 475, and the control grid 477 of the tube 478, through resistor 479, in such manner as to render the tube 476 conducting when voltage 154 is positive, and non-conducting when voltage 154 is zero. In a similar manner, tube 478 is conducting when voltage 153 is positive, and non-conducting when voltage 153 is zero.

The tube 476 is rendered non-conducting when the voltage 154 is zero, by biasing the cathode 480 positive, relative to the grid 474 by potential source 481. The tube 478 is rendered conducting when voltage 153 is zero, by biasing the cathode 482 positive, relative to the grid 477 by potential source 483.

Plate 484 of tube 476 is connected through resistor 485 to terminal 486. The plate 487 of tube 478 is connected through resistor 488 to the same terminal 486. Positive voltage is supplied to the plate circuits of both tubes 476, 478 through the resistor 489, which is connected to the same terminal 486.

A combined signal appears at terminal 486 which is inverted by the tube 490, and provides a signal at terminals 491 which is proportional to $e_z$.

Recapitulating:

Input signal $e_{zp}$ at terminals 470, is applied through capacitor 472a and resistor 473a to the grid 474 of the tube 476. Simultaneously, enabling voltage 154 is maintained positive as long as the pulse slope sorter circuit 93 receives no sloping wave forms, and the signal which appears at 491, $e_z$, is substantially identical with the signal appearing at 470, $e_{zp}$. However, when the pulse slope sorter circuit 93 receives a sloping wave form, voltage 154 immediately drops to zero, and voltage 153 immediately becomes positive; at the same time the voltage $e_{zs}$ produced by the sloping voltage wave appears at terminals 471, and is fed through capacitor 472b, resistor 473b to grid 477, and appears at terminals 491, as the voltage $v_z$, which now becomes identical with $e_{zs}$.

The width and height coordinates (X) and (Y), which may be obtained by the conventional two-dimensional scanning means or the frequency scanning means hereinafter described, are added to the depth coordinates (Z) and the intensity signals (i) produced by the above described circuits, to define image regions scanned. The four voltages corresponding to X, Y, Z, i, are utilized in the manner hereinafter described for recreating a three-dimensional image in space corresponding to the original objects scanned.

For the sake of clarity of explanation, the description of the various screen forms 201, 291, 340, etc., within the purview of this invention, accompanies the disclosure covering the specific projecting apparatus used in connection therewith.

The receding screen

One embodiment of the screen, 201, is shown in plan in Figure 21, and in greater detail in the fragmentary plan view of Figure 23. A plurality of spaced transparent composite plates 202 are disposed one behind the other in a parallel orientation, much as a series of drawn stage curtains. The spaced relationship of the plates 202 divides the entire screen area into a series of cells 204 therebetween. These cells 204 are sealed laterally to form liquid-tight compartments.

In order to further facilitate the uniform distribution of the charge, the grid of network 213 may also be covered with a transparent conducting film 207, and the whole overlaid with a thin transparent layer 208, such as glass sheet, for protective purposes. The film 207 may be an ionizable sol containing salt, an acid or an alkaline constituent, such as, for example, sodium chloride, potassium sulfate, dilute sulphuric or acetic acid, sodium carbonate, or potassium hydroxide. The film 207 may be a liquid or a gel such as gelatin, polyvinyl alcohol, or silicate gel, and the whole covered with a thin transparent layer 208 such as a glass sheet, so as to prevent any deleterious action between the conducting layer 207 and the liquids 209 contained within the cells 204.

A network or grid of conducting lines 213 may be employed in lieu of the transparent conducting layer 207 on the faces 205, 206 of the plates 202. These lines 213 are shown, greatly enlarged for the sake of clarity in Figure 23. It is to be understood that the width of these lines must be comparatively negligible compared to the distance between them, so that light passing through the plates 202 is not appreciably scattered or impeded by the said lines 213.

The lines 213 might comprise thin rulings on the plate surface 205 into which there is worked or deposited a metallic material such as silver. The diameter of said lines must be of such order that the resistance to the flow of electrical energy is comparatively low to avoid the effect of attenuation. The result of this construction will be that a potential applied to the network at the edge of a plate 202 is substantially instantaneously transmitted over the entire surface.

Each of the cells 204 is filled with a suitable liquid 209 in which is contained a colloidal suspension of elongated particles 210, greatly enlarged in Figures 21, 23 and 27 for the sake of clarity. These particles 210 have special light reflecting properties hereinafter described. The said particles 210 must also be capable of being oriented by an electrical field. The length of the particles 210 may be of the order of from 2000 to 3500 Angstroms or any even integral multiple thereof and their cross-sectional width about 200 to 700 Angstroms. These dimensions are necessary in order that the particles 210 effectively reflect or scatter visible light incident upon them at an angle of approximately plus or minus 40° to the normal of their longitudinal axis, and have substantially no reflectivity at other angles.

Mixtures of particles having a substantially constant reflectance throughout the visible spectrum are recommended for this purpose. Such mixtures may comprise, for example, particles such as vanadium pentoxide, tungstic acid, gold, silver, or hereapathite sols in liquid or gaseous suspension.

Referring to Figures 21, 22 and 23 the facing transparent conducting films 207 are electrically connected at terminals 212a, 212b of a delay line 211 shown in detail in Figure 22. Connected between successive films 207 are components of the delay transmission line 211 comprising the lumped inductors 214. The far end of the delay transmission line 211 is provided with a resistor 216 having the characteristic impedance of the line 211. The electrical pulses which travel down the line 211 are therefore completely absorbed and not reflected back to the start of the said line. A conventional gating circuit 211a periodically shorts the delay line 211, and thereby starts a pulse of low voltage traveling from the cells at the front of the screen to the rear, in response to the synchronization trigger pips 265 applied at terminals 211b.

When the screen 201 is in operation, the transmission line 211 is connected to a suitable voltage which sends a steady current flowing through the said line 211 and the matching resistor 216. This results in a potential difference between all the facing conducting films 207 in all the cells 204 comprising the screen 201. This voltage difference is sufficient to rapidly orient the elongated colloidal particles 210 within the cells 204 normal to the planes of the conducting films 207. The extremely small width of the particles 210 (of the order of $\frac{1}{10}$ the wavelength of blue light) enables a light beam 203 projected approximately normal to the plane of the screen 201 to traverse a plurality of sol layers without substantial scattering or reflection from the aligned sol particles 210.

The gating circuit 211a periodically shorts the delay line 211, as shown by wave form 217 in Figures 22, 23 for a given length of time (for example, 100–1000 microseconds). As the pulse 217a travels down the line 211 it successively short-circuits each of the facing conducting films 207. The particles 210 within each of the cells 204 are thereupon successively disoriented by the operation of the Brownian motion of the molecules of the liquid or gas 209 comprising the suspending medium.

The disoriented particles 210 are capable of reflecting or scattering light from their elongated sides. Thus the result of the low potential pulse 217a is to make the screen 201 behave as though a reflecting surface were receding rapidly from the eye 219 of the observer, since the steady current impressed upon the line 211 restores the particles 210 to their non-reflective position soon after the pulse 217a has passed. There is projected, from a high intensity, cathode ray tube, as hereinafter described, upon each of the series of cells, that light which comprises the portions of the image which should emanate from that particular depth within the screen. Light from those portions of the image, not corresponding to the said particular depth is eliminated, by means of the depth selector circuit, hereinafter described. In this manner, the scene is periodically scanned in depth as well as in height and width. Owing to the rapidity of this operation, there is formed a three-dimensional image, which is perceived by the observer as a whole solid image.

Increasing the Brownian motion of the particles 210 will facilitate the speed of disorientation. This may be accomplished by radiating the entire screen with infra-red radiation and providing a liquid 209 which is capable of absorbing the said radiations. Water or ethyl alcohol may be employed for this purpose. The entire screen assembly may also be maintained at a moderately increased temperature of from 60° C. to 70° C.

Alternatively, the particles 210 may be positively aligned in a plane normal to the surface of the plates 202; for example, by a magnetic field. An electrical field may then be employed to positively align the particles 210 in a plane parallel to that of the plates 202. The electrical aligning field may be applied between alternate adjacent grating wires in place of the grids 213, which are connected to terminals 212 of the delay line 211.

A further example of particles having a length, within the preferred range, which may be used, are certain proteins such as the well-known tobacco mosaic virus which has a length between 2800 to 3300 Angstrom units and a diameter of about 150 Angstrom units. Other suitable materials are, for example, sodium thymonucleate, myosin, the guanidinium halides, etc. The size of the particle may be controlled by controlling the aggregation of crystallization of these substances. The rate at which the particles disorient when the electric field is removed, also known as the relaxation time, may be controlled to any desired value between one second to $10^{-5}$ seconds by adjusting the concentration of the elongated particles within the suspending liquid medium. The relaxation time also depends upon the size of the particles, in general, the smaller particles having the shorter relaxation time. As the particle size is decreased the relaxation time may decrease to $10^{-8}$ or even $10^{-11}$ seconds in the case of individual molecules.

The light rays 203, projected upon the screen 201, by a suitable projection lens system from the face of the high intensity cathode ray tube hereinafter shown in Figure 25 are substantially parallel, and impinge upon the surface of the screen in a plane approximately normal thereto. When the particles 210 are positively aligned with their longitudinal axes normal to the surface of the plates, the light rays 203 can pass through the successive cells without substantial absorption, reflection, or scattering. By positively aligning the particles 210 nearly parallel to the surface of the plates 202, a reflecting sheet may be provided across the entire area of the three-d'mensional screen 201, at varying controlled depths as required. The projection on the reflecting sheet is governed by a depth selector circuit, hereinafter described, in connection with Figures 24 and 25.

Depth selector circuit

The electrical circuits shown in Figures 24 and 25 are the means by which the image elements, projected upon the face 262 of the high intensity cathode ray tube 255 are controlled by a depth selecting enabling voltage 248. The function of this enabling voltage 247, which is produced by the depth selector circuit shown in Figure 24, is to permit light reflection from a particular depth range $Z$ to $Z+\Delta Z$ and to block those image elements which lie outside of the said particular depth range. In order to accomplish this the depth selector circuit enabling voltage 247 is synchronized with the periodic pulse 217a which has been traveling down the delay line 211.

A specific example of the operation of this screen at a given instant is shown in Figures 22, 23. The pulse in Figure 22 having reached the cell J, the connections to which are shown in detail in Figure 23, causes the aligning potential within the cell J to drop. As previously shown, this causes the cell J to act as a reflecting sheet at that particular depth $Z_j$, indicated in Figure 22. The enabling voltage 247 produced by the depth selector circuit simultaneously will drive the control grid 257 of the high intensity cathode ray tube 255 positive but only for those image portions on the object which happen to lie within the depth range $Z_j$ to $Z_j+\Delta Z_j$.

A specific means by which this operation may be achieved is shown in Figures 24 and 25.

Referring to Figure 24, there is shown the depth signal $e_{zc}$, contracted as hereinafter described by being passed through the depth contraction circuit shown in block in Figure 25. This signal $e_{zc}$ is impressed upon the terminals 220, 221 of the depth selector circuit. Terminal 221 is grounded, while terminal 220 is connected to the plates 222, 223 of the diodes 224 and 225, respectively. A conventional sweep voltage generator 226 provides a saw-tooth voltage, shown graphically at 227, impressed across the resistor 228.

The time T corresponds to one complete saw-tooth voltage wave, and it is also the time required for the reflecting screen 201 to recede from cell (A) nearest the observer 219 to the cell 204 (P) at the back of the screen furthest from the observer (Figure 21). The time T may, for example, be of the order of .02 to .03 second.

During operation the saw-tooth voltage wave 227 is applied to terminal 229, and thence through resistor 230 to the cathode 231 of diode 224. The diode 224 conducts only when the signal voltage $e_{zc}$ applied to terminal 220 is greater than the saw-tooth wave 227, of the voltage $E_z$ appearing upon the cathode 231. When the signal voltage $e_{zc}$ at 220 exceeds the saw-tooth voltage $E_z$ at 231, current flows through the diode 224. This current causes the point 232, which is connected to the grid 233 of triode 234, to become positive with respect to the cathode 235. The plate 237 is connected through the resistor 238 to a positive source of potential 239. A potential source 249 is provided to maintain the grid 233 negative with respect to the cathode 235 except when resistor 230 is passing current.

Consequently, since the plate 237 of triode 234 is connected through resistor 238 to a source of positive potential 239, triode 234 will momentarily conduct.

However, as an enabling voltage is to be produced only when the Z signal voltage $e_{zc}$ lies within a certain voltage range, means have been provided to cut off the conduction of triode 234 as the Z signal voltage $e_z$ exceeds the sweep voltage 227 by a given amount $\Delta e_z$. This is accomplished by connecting the resistor 236 through a source of potential difference equal to $\Delta e_z$, such as battery 240 to the cathode 241 of diode 225.

If the depth signal voltage $e_{zc}$ exceeds the sweep voltage $e_z$ by an amount greater than $\Delta e_z$, diode 225 will conduct, and in conducting will pass a current through resistor 236. The resistor 236 is of such value that this additional current will cause the cathode 235 to become more positive than the grid 233, thereby causing the tube 234 to stop conducting. In this manner, a negative voltage gate 247 is produced at the plate 237 of tube 234. The voltage gate is inverted, as hereinafter described, and a positive voltage gate 248, produced therefrom. The positive voltage gate 248 is applied, to the projector tube control electrode 257, as shown in Figure 25.

In this manner only those image elements which correspond to the depth $Z_j$ to $Z_j + \Delta_j$ on the object will appear on the face 262, of the high intensity cathode tube 225, since the contracted depth voltage $e_{zc}$ corresponding to this depth range will cause the triode 234 to conduct. Image elements corresponding to other depth ranges will cause the voltage $e_{zc}$ to be above or below the voltage range $e_z$ to $e_z + \Delta e_z$ and accordingly the triode 234 will not conduct under these circumstances. Since $E_z$ is a saw-tooth voltage this will result in a periodic scanning in depth.

The negative voltage gate, 247 is coupled through the capacitor 244, and the resistor 245 to the triode 243. The triode 243, the plate resistor 246, and the source of positive potential 239, constitute an invertor circuit which produces a positive enabling voltage gate 248, from the negative voltage gate 247, applied at the grid of the triode 243.

The sweep voltage generator 226 of the assorter circuit is preferably initiated periodically by a periodic trigger circuit 264 shown in block diagram in Figure 25. The periodic trigger circuit 264 may be of conventional design, and gives rise to a series of voltage pips, accurately spaced in time, which serve to synchronize the entire operation.

Receding screen system assembly

The circuit diagram for the control of the high intensity cathode ray tube 255 is shown in Figure 25. The input terminal 250 of this circuit diagram receives voltages $e_z$ for transmission to a depth contraction circuit 251 hereinafter more specifically described. The voltage received at any instant at terminal 250 has an amplitude, $e_z$, proportional to the instantaneous depth of the image element being scanned. The output of the depth contraction circuit 251 is a voltage 252 proportional to the contracted depth $e_{zc}$. The necessity for and derivation of $e_{zc}$ will become more apparent from a consideration of the subsequent description of Figures 38, 39 and 40.

The signal 252 ($e_{zc}$) is fed to the depth selector circuit 253, which has been described in connection with Figure 24. The output of the depth selector circuit 253, which is the enabling voltage 248, is fed to the terminals 254 of a high intensity cathode ray tube 255. The terminals 254 lead the voltage 248 to the control grid 257 and cathode 260 of the tube 255. The intensity signal $e_1$ is also applied to the control grid 257 through the capacitor 258 by way of terminals 259. This signal, $e_1$, is proportional to the instantaneous intensity of the elements being scanned.

The electron beam 261 proceeds from the cathode 260 under the influence of the positive potential applied to the anode 256 of the tube 255. The intensity of the electron beam current is modulated by the signal $e_1$ applied at 259. In this manner a scanning spot of light is produced upon the face 262 of the cathode ray tube 255 which is proportional to the corresponding intensity of the object element being scanned at that instant.

The scanning spot, however, will not appear on the face 262 of the tube 255 unless the enabling voltage 248 is positive. This voltage 248 is positive only when the depth factor signal $e_z$, from the synthesis circuit 96, coincides with the depth range of the reflecting plane within the receding screen 201.

Synchronization between the enabling voltage 248 and the reflecting place of the screen 201 is effected by means of a periodic trigger circuit 264. This circuit produces a series of sharp pips 265 which are simultaneously fed to the depth selector circuit 253 and the trigger gating circuit 211a, shown in Figure 22. The pips 265 are applied to the sweep voltage generator 226, shown in Figure 24, and produce the saw-tooth wave 227. Simultaneously with the arrival of a pip 265 at the generator 226, a pulse 217a starts down the delay line 211 (see Figures 21, 22). The period of the saw-tooth wave, hereinafter designated by the letter "T," is equal to the time required for the pulse 217a to travel down the delay line 211. Thus, for example, when the pulse 217a has proceeded one third of the way from the start of the delay line 211, and has caused cell J in Figure 21, located at that depth within the screen 201, to become reflecting, the saw-tooth wave 227 has at that instant also attained one third of its maximum amplitude. As a consequence of this synchronization, only those image elements which are accompanied by a voltage $e_{zc}$ equalling approximately one third of the sweep voltage amplitude, will generate a positive enabling voltage 247 and thereby enable corresponding image elements to appear upon the face 262 of the tube 255. It will be seen, therefore, that as the screen 201 is being scanned in successive depth ranges by the pulse 217a, image elements which belong in each of the said depth ranges will be projected thereon. These image elements, or modulated light spots, are selected by the depth selector circuit 253, which only allows them to appear on the tube face 262 if they correspond to the reflecting depth range within the screen 201 at that instant.

If there are $n$ screen cells, arranged in depth, the screen must be scanned $N/T$ times per second. That is, the entire area of a frame is scanned in the length of time during which the pulse 217a requires to travel the depth of a single cell of the screen 201 and only those parts of the image belonging on that cell are allowed to reflect therefrom.

The high intensity cathode ray tube 255 with its luminous face 262 upon which the image elements appear is shown in Figure 26. A projecting lens 263 is employed to project the image appearing on the tube face 262 upon the screen 201. The depth of the screen 201 has been indicated by the line $D_s$ while the distance between the optical center of the lens 263 and the screen face is designated by the line $u$. The distance from the optical center of the lens 263 to the center of the screen 201 is represented by the line $v$. The depth of focus of the projecting lens 263 must be at least equal to the screen depth $D_s$. The distance $v$ must be great enough to permit the projected rays to arrive within the screen in a substantially parallel manner. For shorter distances of projection, utilizing a wide field projection lens, it may be desirable to employ cells 204 which have a plano-meniscus shape so that the rays arrive normal to all portions of the cells 204 of the screen 201.

*Ion gun controlled screen*

Another method of controlling the depth of the light reflecting plane within the screen is shown in Figure 27. An input control signal comprising a series of synchronized pips 265 from circuit 264, shown in Figure 25, is applied to the terminals 270 of the ion gun sweep circuit 271. This signal produces a saw-tooth voltage wave 272 which is applied across plates 273 and 274 (ground) of the ion gun selector tube 275.

The ion gun selector tube 275 comprises an evacuated tube 276, which contains an ion gun 277 constructed in any manner well-known in the art. The ion gun 277 is fed with a low pressure gas stream; such as, hydrogen, nitrogen, neon, etc., through an inlet 278. The tube 276 is constantly being evacuated of this gas through an outlet 279 therein, by means of suitable vacuum pumps (not shown). The positive ion beam 280 is deflected by the sweep potential difference between the plates 273 and 274. In this manner the positive ion beam 280 is caused to sweep over a plurality of contacts 281, 282, 283, etc., which are arranged at the far end of the tube 276. Each of said contacts 281, etc., corresponds to a particular depth range $Z$ to $Z+\Delta Z$, said contacts being suitably connected to a cell 204 positioned at the said depth range.

The particles 210 within the individual cells 204 are maintained in alignment normal to the surface of the plate face 205 of the said cells by the electric field between the facing conducting planes 205, 206. However, when the ion stream 280 strikes a selector contact, as, for example, contact 281, the current flows from the contact 281 through a resistor 284 to ground, thereby causing the positive potential on the capacitor 285 to rise. This rise in potential causes a simultaneous rise in the potential on the grid 286 of the tube 287. The resultant potential rise is sufficiently above the cut-off point of the vacuum tube 287 to permit a current to flow through a plate resistor 288, and through the plate 289 and the cathode 290 of the tube 287, respectively, from the source of positive potential to ground.

The resistor 288 is made relatively high with respect to the resistance of tube 287 so that when the tube 287 is conducting, the potential between the screen plate faces 205—206 is quite small.

When the ion stream 280 no longer strikes the selector contact 281 the grid resistor 291 applies a negative potential from the potentiometer 292 to the grid 286. This negative potential causes the tube 287 to become non-conducting. A high potential is thereby applied between the plates 205 and 206, causing the realignment of the particles 210.

When one of the plate circuits is energized, the aligned particles 210 within the said cell 204 quickly disorient themselves, as previously described. The disoriented particles 210, as shown in Figures 21, 23, 26 and 27, are capable of reflecting a light ray 203, which has passed through all the oriented cells without substantial reflection or scattering, and which impinges upon certain of said disoriented particles 210, such as 210a, causing a scattered reflection 203a, 203b, 203c, etc.

An electron gun, or cathode ray, selector tube may be employed, instead of the ion gun 277, and suitable modifications made in the circuit diagram shown in Figure 27; so that the electron gun selector tube and associated circuits will function, in a manner, similar to the ion gun 277 herein described.

*Solid image transmission screen*

Another form of three-dimensional screen, according to this invention, shown schematically in Figure 28, has certain image-producing properties, hereinafter described, which are not to be found in the previously described screen types.

It is an important advantage of this form of invention that no external projector is required; that is, the three-dimensional screen is self-illuminating.

A light reflecting surface 294 is positioned behind the screen proper. Immediately in front of the reflector 294 are a plurality of high intensity illuminants 295. These illuminants 295 are capable of substantially instantaneous variation in accordance with an intensity signal voltage $e_i$. High pressure mercury arcs containing small quantities of other metal vapors, which emit white light in the well-known manner, are satisfactory illuminants 295. The light from the illuminants 295 is converted into a uniform field of white light by a diffusing plate 306 which is placed between the illuminants 295 and the solid image screen 293. The diffused light emanating from the plate 306 is polarized by a suitable polarizing sheet 296 before it enters the screen 293.

The body of this form of screen is in the shape of a transparent rectangular parallelopiped, which may be divided into a plurality of cells as previously described in connection with Figure 21. Within these cells, there may be contained a liquid 302. The liquid 302, in general, contains suitable transparent birefringent elongated dipole particles 267. The length of these dipole particles 267 is critical.

A maximum dipole particle length is desired to increase the dipole moment, to enable easy alignment by means of weak electric fields. The birefringent effect, moreover, is increased in the thicker and longer particles 267. On the other hand, the particle length must not exceed a given size, since the relaxation time must be sufficiently small to provide an adequate response to the control signals. Moreover, the width of the particles must not be great enough to cause substantial light scattering when the light is passing approximately parallel to the long axis of the aligned particles 267.

Such requirements are met by colloidal suspensions of anisotropic, birefringent, elongated, dipole particles of substances which have an inherently large dipole moment. These colloidal particles may preferably be suspensions of crystallites in a suitable liquid. The crystallites may be obtained from a widely dispersed class of organic or inorganic chemical compounds: for example meconic acid, quinine sulphate, certain protein crystallites previously set forth, quartz, etc.

In addition to colloidal suspensions of transparent birefringent crystallite dipole particles, the liquid 302, may comprise a dilute solution, in any suitable solvent such as water, alcohol, etc., of a substance having an elongated molecular structure. This substance must also have a large electric dipole moment, and a birefringent effect, when a plurality of its molecules are suitably aligned in an electric or magnetic field 307. Such substances include the class known to form "liquid crystals" in molten, or concentrated solution, and which may exist in the smectic or nematic state. An example of a substance belonging to the class of liquid crystals, is p-ozoxyanisol. Many other such well-known substances may be alternatively employed.

The entire volume within the screen 293 is latticed by a plurality of wires 298, 299 which comprise two distinct series of gratings. These wires are preferably supported upon glass plates 202 forming cells as described above. One set of gratings 298 is formed of rows of spaced vertical wires. The second set of gratings 299 is formed of rows of spaced horizontal wires. The gratings 298, 299 are spaced alternately at right angles to each other within the screen 293, as shown in Figure 28. The wires which are formed into the gratings 298, 299 are small in diameter compared to the distance therebetween, and consequently will cause a minimum of interference with the passage of light therethrough. The cutaway sections, shown in Figure 28, are therefore exaggerated, as to the relative size of the wires, for the purpose of clarity of illustration. A polarizing sheet 297 is placed in front of the screen 293. The plane of polarization of the sheet 297 is at right angles to that of the opposed polarizer 296 located behind the screen 293. In this manner all the light which enters the screen 293 from the illuminants 295 is ordinarily absorbed by the second of the crossed polarizers 297, and hence the observer 219 sees only a dark screen. However light passing through region 300 is rotated or depolarized, as hereinafter described, and is thus enabled to pass through the second polarizer 297. The intensity of the light passing through the region 300 is modulated by the intensity signal voltage $e_i$, applied to the bank of illuminants 295.

The scanning signals, which determine the coordinates $(x, y, z)$ for locating the given region of light 300 are fed into the electrical circuits connected to the series of gratings 298, 299. The preferred means by which this is accomplished is described below in connection with Figures 31–35, which show a frequency scanning means. Alternatively, the wires comprising the gratings 298, 299 may be connected to an array of contactors on a cathode ray or ion gun selector tube through appropriate vacuum tube circuits, such as are shown in Figure 27. Thus, in a small region 300, between two of the gratings 298, 299, a region of zero electrical field is located within the screen 293, defined there by three scanning signals.

The above mentioned birefringent particles may be ordinarily aligned normal to the plane of the gratings 298, 299 by an electrical field 351 applied between the said gratings. Under these conditions the polarized light 417 from the polarizer 297 (the plane of polarization of which may be at −45° to the horizontal) traverses a path approximately parallel to the long (optic) axis of the particles, except in passing through region 300. Thus there will be no relative retardation between the horizontal and vertical components of the polarized light, except in passing through the region 300.

However, since the electrical field may be zero within a given region 300, which is located in the vicinity of the coordinates $(x, y, z)$, the particles 267 within the said region 300 will quickly become disoriented. Some of the disoriented birefringent particles 268 will have the effect of randomly rotating the plane of polarization, and hence of depolarizing the light. The result of a rotation or depolarization of the divergent rays of light 417, in passing through region 300 is to enable a substantial portion of the rays 417 to pass through the second polarizer 297; whereas, other light rays 416 from elsewhere within the space confines of the screen, are blocked by the polarizer 297.

Thus, a modulated spot of light at region 300 will appear to be located at the coordinate position $(x, y, z)$ within the screen 293, equivalent to the coordinate position $(x, y, z)$ and the intensity of the corresponding element of light on the object.

The four signal voltages impressed upon the control elements scan the screen 293 and also control the intensity of light emanating from each region of zero electrical potential within the confines of the screen, thereby organizing an image and causing the original scene to be reproduced in its three dimensions.

Figure 29 shows a fragmental view in the vicinity of region 300, through the three-dimensional screen 293, in a plane parallel to the axes. The vertical and horizontal wires 298, 299, respectively, are preferably provided with thin, transparent coverplates 349 which may be of glass.

In Figure 29 there is located a region 300, of zero field intensity, between the vertical wires 298a and the horizontal wires 299a. The zero field intensity permits the rapid disorientation of the birefringent dipole particles 268 therein as above described. Elsewhere an electrical field 351 acts to orient, or align, the birefringent dipole particles 267. Thus, light rays 417 which are initially polarized by polarizer 296, become depolarized upon passing through the region of disorientation 300, and then may pass, in part, through polarizer 297. However, the light rays 418 which are also polarized, are relatively unaffected in passing through the regions containing the aligned particles 267, and are then absorbed at the second polarizer 297, as shown in Figure 28.

Figure 30 is generally similar to Figure 29, except that the region of zero field 300 is replaced by a field 307, which may be either electric or magnetic. The field 307 is, for example, directed horizontally, and is parallel to the plane of the gratings 298, 299. The strength of the field 307 may be considerably less than that of the normal aligning electrical field 351. The effect of this arrangement is that the region of disorientation 300, referred to in connection with Figures 28 and 29, is replaced by a region 306, in which a secondary alignment of the particles 269 occurs, as shown in Figure 30. The secondary alignment of the dipole birefringent particles 269 is such that they are aligned with their optic axes at 45° to the planes of polarization of the polarizers 296 and 297, and parallel to the planes of the gratings 298, 299. If the concentration of dipole particles 269 is such as to cause quarter wave retardation between the vertical and horizontal components of the polarized light rays 417, the said rays will pass, in part, through the polarizer 297. However, the components of rays 418, which are not relatively retarded, are absorbed by polarizer 297, as shown in Figure 28.

Referring again to the screen 293, shown in Figure 28, it may be necessary to provide a circulating system therein for the passage of the liquid 302 in order to constantly eliminate breakdown products, resulting from the electrical field, being applied to the liquid 302, particularly, if liquids such as nitrobenzol are employed.

An outlet tube 301 is provided in the bottom of said screen 293 and a pump 303 coupled thereto. The liquid 302 coming from the screen 293 is forced by the pump 303 through a filtering medium 304, such as silica gel or carbon black to absorb said breakdown products. The said liquid 302 is then reintroduced into the screen 293 through an inlet tube 305. In this manner the liquid 302 is maintained substantially free from breakdown products, such as carbonized particles which tend to cloud the liquid 302. The liquid 302 is permitted to circulate freely between the cells by reason of a space between the bottom of the plates 202 and the bottom of the screen 293. The nature of the space is indicated by dotted lines in Figure 28.

*Frequency scanning*

An alternate preferred system for the two or three-dimensional scanning of screens, such as are herein described, is shown in Figures 31, 32, 33, 34 and 35. Figure 32 shows broadly the principle of scaning in two or three dimensions by applying two or three saw-tooth frequency variations. In three-dimensional frequency scanning the saw-tooth frequencies are denoted by $f_x$, $f_y$, $f_z$ which are applied to appropriate two or three-dimensional electrical networks. A specific embodiment of this system employs microwave technique as described below. Multiple resonator tubes 308, 309, 310 which are derived from the klystron are the basis of this system. The oscillator section 311 of the multiple resonator tube 308 may be of the conventional type illustrated in Figure 31 employing two cavities 312 and 313 and a feed back coaxial line 314.

An electron beam 315 proceeds from the cathode 316 under the influence of the electric field between the anode 317 and the cathode 316. The electron beam 315 is bunched as at 318 in the well-known manner by the high frequency field between the grids 319, 320 of the cavity 312, as it travels through the drift space 321. The electron beam 315, traveling through the drift space 321 arrives 180° out of phase at the grids 322 and 323 of the cavity 313 and thereby sustains the oscillations by supplying power to the high frequency field in the cavities 312 and 313. Thus there arrives at the entrance 324 to the multiple resonator tube 308 a bunched electron beam 318, which periodically varies in electron density as indicated by the groups of dots shown in Figure 31.

In order to modulate the frequency, certain factors may be varied such as, beam current, acceleration voltage or output load. A preferred means of modulating the frequency by varying the current of the election beam 315 is shown in Figure 31. This variation is accomplished by means of an auxiliary accelerating saw-tooth voltage 325 supplied at terminals 326 by the scan sweep generator 327. This voltage is applied through capacitor 328 to the cathode 316 and to the collector anode 330 through the capacitor 331. Isolating resistors are shown at 329 and 332. In this manner the electron density of the electron bunches may be periodically varied so that the time frequency graph possesses a saw-tooth variation.

A plurality of cavities 333a to 333n are arranged along the multiresonator tube 308. The cavity 333j shown in Figure 31 is hereinafter referred to particularly. This cavity 333j has a radius "aj" and grids 334j and 335j. It is well-known that cavities of this type possess an extremely high "Q", that is, are very sharply tuned to a precise wavelength. One dominant resonant mode may be expressed by the formula $\lambda = 2.61a$.

Since the "Q" may be of the order of 10,000 to 30,000 a very small change in radius is sufficient to detune the cavity. Accordingly, the multiple resonator tube 308 shown in Figure 31 comprises a series of cavities 333a to 333n the radius of which may increase gradually from the front to the rear of the tube 308. This construction operates to produce a series of individually tuned cavities 333a to 333n, each of which is sharply tuned to a slightly longer wavelength than the one preceding it. This wavelength variation is preferably linear. Thus, as the frequency with which the electron bunches 318 pass a given point, is linearly increased by the applied saw-tooth voltage 325, the cavities 333a–333n, are successively caused to resonate along the multiple resonator tube 308.

The cavity 333j referred to specifically above, has the output coaxial line 336j which carries the high frequency energy produced within the said cavity 333j. The high frequency energy thus produced is led from the cavity 333j to its particular cell j in the two or three-dimensional screen. The purpose of this is to employ the space displacement of the resonating element to energize a coordinate element of said screen, or deenergize it at a particular instant in the scanning operation. The energy may be fed successively from the cavities 333a–333n directly, along the coaxial lines 336a–336n, to the screen. In certain cases it may be simpler to employ space coupling between closely adjacent dipples as illustrated at 589jz and 590jz in Figure 33.

The means has now been provided for converting a sawtooth frequency variation into a device for scanning along a space coordinate. It follows, therefore, that by providing two systems, such as shown in the cell, Figure 33, a two-dimensional area may be scanned and any element of area therein instantaneously located. By providing three such systems a three-dimensional region may be scanned and any elementary region therein instantaneously located. Appropriate saw-tooth frequency variations must be applied, in synchronization, to systematically scan in two or three dimensions.

The above described frequency scanning system may be applied advantageously to the receding screen 201 previously mentioned. This screen 201 may be scanned in depth by the frequency scanning system, employing suitable circuits such as are shown in Figures 32, 33 and 34 in lieu of the delay line 211 employed in connection with the screen 201. The frequency scanning means may be specifically employed in connection with the three-dimensional opaque solid image screen 340, shown in Figure 36, as hereinafter described.

*Opaque solid image reflecting screen*

A three-dimensional opaque image may be created within the confines of the screen 340, shown in Figure 36 by locally controlling the particles 341 therein, so that only those which lie within the outline of the object or scene become disoriented while all others remain unaffected. In order to do this the particles 341 comprising the image must be capable of reflecting incident radiation and absorbing transmitted radiation from behind. Moreover, it is necessary to positively control the many minute regions which comprise the entire screen 340, so as to govern the alignment or disorientation of particles 341 therein.

Elongated dipole particles 341, such as are required to perform the above mentioned functions of this type of solid image projection may be formed from anisotropic crystal needles upon which is deposited a metal reflecting film of silver, platinum, or some other metallic reflecting material. This can be accomplished by adding to the suspended crystals 341 a suitable deposition liquid similar to that which is used for the deposition of silver on glass. In addition to having the characteristics of a dipole, i.e., being capable of orientation by an electric or magnetic field, the particles 341 should have a width of the order of 200 Angstroms. Such particles 341 will not scatter or reflect visible light when aligned normal to the plates 342, 343, 344, etc., of the screen 340 and the light 345 is traveling parallel to the long axis of the said particles 341. The particles 341 are preferably between 2000 and 3500 Angstroms long, that is, of the order of ½ of the wavelength of visible light. It is then apparent that light traveling within a range of plus or minus 25° to the normal of the said long axis of the particles 341 will be appreciably reflected or scattered.

Another characteristic which the particles 341 must possess, is that of absorbing light transmitted through several disoriented layers of such particles. Suitable crystals having the above mentioned properties may be chosen from the herapathites, or similar crystals well-known in the art, which have a high surface luster or reflectivity and which are highly colored by light transmission. Such crystals are often, though not necessarily, of the dichroic or pleochroic class. Certain other types of crystalline materials, capable of forming needle-like crystals, which are transparent and perhaps birefringent, but which are capable of orientation, may be used. For use with the opaque solid screen 340 these latter crystals must first be plated with a thin, reflecting, conducting, resistive coating, as previously described. Suitable crystalline materials have previously been listed.

Referring to Figure 36, 342, 343, 344 indicate a series of spaced glass plates arranged so as to form cells 346 between succeeding plates, the whole being laterally sealed. Each plate 342, 343, 344, is provided with gratings 347, 348 on the external plane surfaces thereof. The gratings 347, 348 are formed as by rubbing conducting metallic material into lines ruled upon the said plane surfaces. One side of each plate 342, 343, 344 is covered with a horizontal grating 347 and the opposite side is provided with a vertical grating 348. A covering glass plate 349 is positioned and laminated upon each face of the glass plates 342, 343, 344 to prevent the liquid 350 within the cells 346 from coming into contact with the gratings 347, 348.

The dipole particles 341 are suspended within the liquid 350 in the previously described manner, and are maintained in alignment normal to the face of the plates 342, 343, 344 by means of the electric field 351. When the opaque image screen 340 is in operation, the electric field 351 is maintained, as for example, between all the lines comprising the gratings 347, 348 formed upon the surface of the glass plates 342, 343, 344. The horizontal gratings 347 are maintained positive to the median potential, and the vertical gratings 348 equally negative with respect to the said median potential. The median potential may be, for example, ground potential.

As previously pointed out, in order to produce the three-dimensional opaque image, it is necessary to produce a disorientation of particles 300 throughout a plurality of regions such as 352 and 353, suitably located within the confines of the screen 340. Assuming that the image is to appear at a distance from the eye 354 of the observer within the region designated by the number 352, it becomes apparent that the particles 241 within that area must be disoriented while all others between it and the eye 354 remain aligned. Referring to Figure 36, the region 352 is defined at a point where a given lateral measurement (X), a given height measurement (Y) (not shown), and a given depth (Z) intersect. The region 352 is locally shielded from the action of the aligning field 351 between the plates 342, 343, by connecting to the said median potential the specific horizontal and vertical elements of the gratings 347, 348, there located. When the said vertical and horizontal elements are connected to the same median potential, there will be a region of zero field in the region 352. Disorientation of the particles 341 only within said region 352 is then brought about by the Brownian motion of the molecules, as herein previously described. Elsewhere, however, there will be an aligning field at least equal to the difference between the median potential and the positive, or negative potential, to which the remaining grating elements are connected.

A preferred means by which this shielding is accomplished in the opaque reflecting screen 340 is by grounding a specific vertical wire or series of wires in the vicinity of the region 352, as for example, wires 355, which form a part of the vertical grating 348, and wires 356 which form a part of the horizontal grating 347. It is clear that within the region 352 at which the vertical wires 355 cross the horizontal wires 356 there is produced a zero potential difference.

It is to be noted, however, that the other particles 341 within the cell 346 between plates 342 and 343 remain subjected to an aligning field except in the region 352.

Thus the region 352 is left field-free, and the particles 341 within the region 352 quickly disorient themselves and become capable of reflecting the light beam 345 impinging thereon. The eye 354 of the observer thereupon sees the image as emanating from that region 352 within the screen 340 because of the divergent reflected beams 345a–345d.

The novel operation of this type of opaque reflecting screen 340 will become apparent by considering the effect, as viewed by an audience, of a reflecting region 353 located behind another reflecting region 352. The light from the projected beam 357 traverses the plates 342, 343 and 344 and the aligned particles 341 therebetween until it reaches the disoriented region 353. The reflected rays 357a–357d travel back toward the audience. Certain of these reflected rays 357a, 357b reach the eyes of the audience located at 354, but others, such as the rays 357c–357d are intercepted by the disoriented particles within the foreground region 352 and are absorbed therein. In this manner the eye of an observer seated at 354 will not be able to see that portion of the light emanating from the background region 353.

A specific example of the action of this type of screen will make its advantages clear. Assume that Figure 37 illustrates an opaque reflecting screen 340 upon which is projected a scene comprising a road 358, a line of telegraph poles, 359, and a lake 360 in the background. The foreground hole 359a is dark in color, whereas the lake 360 is very bright in the sunlight. If the dark portions of the pole 359a did not also have the property of opacity from the rear, i.e., the ability to absorb light impinging thereon from behind, the audience would be disconcerted to see the bright sunlight reflected by the lake 360, shining through the telegraph pole 359a. This would make the pole 359a appear transparent and unlike the image that a person would get from actually viewing the scene.

It will be apparent, therefore, that this type of three-dimensional screen and its co-operating optical and electrical system recreates a solid image in space, i.e., within the confines of the screen, having the requisite properties of opacity which actually exist in nature. Moreover various portions of the lake 360 will be obscured by the pole 359a, depending upon the position of the observer in accordance with the laws of natural vision. Thus, for example, the pole 359b may hide the sailboat 361 from an observer sufficiently to the right of the screen, as at 354 in Figure 36.

It will be apparent from the examination of Figure 37 that the principle of depth contraction, as hereinafter disclosed, is employed to fit the "infinite" distances actually encountered in natural scenes within the limited confines of the screen 340. Thus, for example, the foreground pole 359 appears projected within the cell 350a, the region of the lake 360, appears within the region of the cells 350c, and the "infinitely" distant background of mountains 362, appears on the rearmost cells 350e, of the said screen 340.

In order to reduce spurious reflections from the outer surface of the screen 340, and from layers within the screen, a quarter wave non-reflection film may be coated upon the outer surface of the screen, in the manner well-known in the art. As to the layers within the screen, reflections may be prevented by employing a continuity of refractive index for the different layers comprising the screen. For example, the glass sheets, the laminating media for the glass sheets, and the liquid suspending media may all have the same index of refraction, for example, 1.51.

*Frequency scanning circuit*

Referring now to Figure 32, there is shown a schematic perspective of a preferred three-dimensional electrical network. This drawing discloses the principle of frequency scanning in three dimensions and the specific interconnections required to operate the cells comprising the three-dimensional screen.

Two such cells, $j$ and $k$, indicated as parallel planes in the perspective, are shown in Figure 32. In this manner the electrical interconnections belonging to the cell $j$ are shown in their spaced relationship with those of cell $k$. The circuit elements which run along the (Z) axis are indicated as normal to the planes $j$ and $k$ by isometric projection. The connecting terminals within the circuit are indicated by dots to avoid confusion which might otherwise result from the showing of a three-dimensional network.

The frequency scanning sources comprise the variable frequency devices 500, 501 and 502 which are indicated generally in Figure 32 by the symbol for a variable frequency source. These devices 500, 501 and 502 may comprise any suitable variable frequency source such as, for example, an oscillator and a reactance tube modulated by a saw-tooth generator, or preferably may comprise the oscillator section 311 of a multiple resonator tube device 308 hereinabove described in connection with Figure 31.

The variable oscillator 500 produces a saw-tooth frequency output $f_x$ which is represented by the graph 503. This graph 503 shows the highest scanning frequency of the oscillators 500, 501, 502. The oscillator 501 produces a saw-tooth frequency variation indicated by the graph 504 which constitutes an intermediate scanning frequency $f_y$. The third variable frequency oscillator 502, produces a saw-tooth frequency variation represented by the graph 505. This frequency $f_x$ represents the lowest scanning frequency of the oscillators 500, 501 and 502.

The lines 506 lead from the variable frequency generator 500 and extend behind the rearmost plane of cell $k$ in a direction parallel with the $x$ axis of the screen.

The lines 507 lead from the variable frequency generator 501 and run behind the rearmost plane of cell $k$ in a direction parallel with the $y$ axis of the screen.

The lines 508 which are connected to the variable frequency generator 502 run normal to the cells $j$ and $k$ (along the $z$ axis) and to one side of the screen.

Referring now to the circuit network on plane $j$, a main bus 509$j$ is energized with a positive pulsating D.C. voltage indicated by the graph 510. This pulsating D.C. potential is supplied to the bus 509$j$ by a bus 511 which runs parallel to the $z$ axis of the screen. The bus 511 supplies a positive pulsating D.C. voltage to all the busbars 509$a$–509$n$ within the screen. The pulsating D.C. voltage may emanate from any suitable device such as the transformer 512 the primary of which is energized by an A.C. voltage and the positive potential source 513 connected to the secondary, as shown.

The vertical wires 514$j$ on plane $j$ are connected to the bus 509$j$ by means of resistors 515$j$. The lower end of one of the wires 514$j$ is connected to the plate 516$j$ of a diode 517$j$. The cathode 518$j$ of the diode 517$j$ may comprise a pointed electrode. The plate 520$j$ of a second diode 519$j$ is connected to the cathode 518$j$ of the first diode 517$j$. The cathode 521$j$ of the diode 519$j$ is connected to ground. Since the bus 509$j$ the resistor 515$j$, the wire 514$j$ and the diodes 517$j$ and 519$j$ are all connected in series, the wire 514$j$ will take on the potential 510 so long as either or both of the diodes 517$j$ and 519$j$ are nonconducting. The wire 514$j$, however, will drop in potential to very near that of ground, only when both diodes 517$j$ become conducting, since the combined resistance of the diodes 517$j$ and 519$j$ is small compared to the resistor 515$j$. The diodes 517 and 519 herein referred to, are of the type known as gas tubes, the conduction current through which may be started or increased by external ionizing means such as an applied high frequency electric field.

A resistor 522$j$ is connected at its midpoint to the cathode 518$j$ of the tube 517$j$ and the anode 520$j$ of the tube 519$j$ in order that the plate voltage on the two tubes shall be equally proportioned, particularly when they are non-conducting. The value of the resistor 522$j$ is made relatively large with respect to the resistor 515$j$ so that when either or both diodes 517$j$, 519$j$, are non-conducting the potential of the wire 514$j$ will differ but little from the applied voltage 510.

Diode 517$j$ is located between a pair of plates 523$j$ and diode 519$j$ is positioned between a pair of plates 524$j$.

Branch lines 525, 526, etc., are tapped off along the line 506. These lines 525, 526, etc., contain series resonant elements, such as the inductor 527, and a capacitor 528, as well as all the capacitors comprising the plates 523$a$ through 523$n$, inclusive. When the variable frequency generator 500 produces a frequency which is identical with the resonant frequency of the inductor 527 and its capacitors 528, 523$a$–523$n$, then only the branch line 525 is substantially energized. The other branch lines such as 526 will remain substantially unaffected, since the resonant elements of said other branch lines are out of tune with the frequency being produced at that instant by the generator 500. In this manner, all the diodes 517$a$–$n$ (including $j$ and $k$) are simultaneously ionized by virtue of having impressed there-across a high frequency electric field, thus rendering the said diodes instantaneously conducting.

It is important that the voltage 510 be pulsating D.C. to facilitate the rapid extinguishment of the conducting path through the diode 517$j$ when the high frequency field between the plates 523$j$ is removed.

The lines 525, 526, etc., are successively energized as the saw-tooth frequency 503 is applied to the main line 506 in the above described manner. Thus in turn, all the plates 523$a$–$n$ and all the diodes 517$a$–$n$ along each branch line 525, 526, etc., are also simultaneously energized in succession.

It will be seen from Figure 32 that a second set of diodes 519$j$, 544$j$, 541$j$, are energized in the following manner: branch lines 529 and 530 lead from the main line 508 through resonating elements such as the inductor 531$k$, capacitor plates 532$k$, 524$k$, 533$k$ and 534$k$. Branch line 530 similarly has inductor 531$j$, capacitor 532$j$, and capacitor plates 524$j$, 533$j$, and 534$j$. Considering that instant at which the saw-tooth frequency 505 happened to correspond to the resonant frequency of the resonant elements 531$j$, 532$j$, 534$j$, etc., it is seen that only the succession of plates lying in the "$j$" cell 524$j$, 533$j$, 534$j$, will be energized, whereas similar plates as on the "$k$" cell will be relatively unaffected.

The bus 535 is energized by a negative pulsating D.C. voltage indicated by the graph 536. The voltage 536 is distributed to the various planes $a$–$n$ by means of the bus 535. Headers 537$a$ through 537$n$ from the main bus 535 supply wires 538$a$ through 538$n$ with a voltage 536. One of these headers 537$j$ on plane $j$ is shown connected to the wire 538$j$ through the resistor 539$j$. Diodes 540$j$ and 541$j$ are connected with their cathodes and their anodes, such as 542$j$ and 543$j$, of diode 541$j$, in reverse order to that described in connection with diodes 517$j$, 519$j$, due to the negative polarity of the bus 535$j$, as compared to the positive polarity on bus 511. The reversal in polarity of voltages 510 and 536 is necessitated by the requirement of providing an aligning force equal to at least one-half the maximum strength of electric field relative to all the grounded wires, except where both horizontal and vertical wires are grounded. Where such grounding of both horizontal and vertical wires occurs the voltage therebetween is zero. Thus a substantial alignment of particles may be affected everywhere within the screen except in the region where the two grounded wires, vertical and horizontal, cross. In general this is but a single elementary region or volume within the entire space of the said screen.

Referring again to the circuit comprising the wire 514$j$, the resistor 515$j$, the diodes 517$j$ and 519$j$ to ground it will be seen that conduction can be established therethrough only when the branch lines 525 and 530 are simultaneously energized. When this happens only one vertical wire throughout the entire screen is grounded, namely wire 514$j$, which falls at the intersection of the branch lines 525 and 530. In order to accomplish this grounding, both diodes 517$j$ and 519$j$ must be conducting. Elsewhere on plane $j$ the diodes 544$j$ and 540$j$ are conducting; but the other diodes such as 545 and 541$j$ are not conducting.

Because of the rapid variation of the frequency $f_x$ and the comparatively long time during which the frequency $f_z$ continues to energize the diodes 519$j$, 544$j$, etc., the wires 514$j$ are grounded in succession as the diodes 517$j$, 545$j$ are successively energized, during such time as all the diodes 519$j$, 544$j$, on cell "$j$" are energized.

A "$y$" scanning frequency is applied to the main line 507 at the intermediate saw-tooth frequency $f_y$ simultaneously with the $x$ scanning operation previously described. The main line 507 energizes a branch line 546, which is one of a plurality of branches utilized in the $y$ scanning. The branch line 546 contains reasonating elements comprising inductors 547, capacitors 548, plates 549$a$–$n$ inclusive, all of which are energized. If, then, cell $j$ has been energized by the $z$ frequency scanning operation, then the diode 540$j$ is also conducting and a conducting path through the diodes 540$j$ and 541$j$ is established with a consequent grounding of the horizontal wire 538*j*. Since the plane *k* is not energized at this instant by the *z* scanning frequency, none of the horizontal wires nor the vertical wires on plane *k* are grounded. Consequently, in only one region do two grounded wires cross; namely, wires 514*j* and 538*j* which cross in region 550*j*. Hence only the region in the vicinity of 550*j* is field free. The vicinity of 550*j* may therefore contain disoriented particles capable of reflecting light impinging thereon from the front of the screen and absorbing any light which may be thrown thereon from the rear, as previously described herein.

There is thus provided a means for causing a field free region such as 550 to scan horizontally and vertically on a given plane *j*. There has also been provided a means for successively selecting a plane *j* so that planes *a* through *n*, including *j*, are scanned successively. Thus there is provided a three-dimensional frequency scanning system.

On Figure 32, in reference to cell *j*, it will be understood that the vertical wires 514*j* and associated electrical circuits may be formed upon the surface 568*j* of a suitable support. In like manner, the horizontal wires 538*j* and associated electrical circuits may be formed upon the surface 607*j* of a suitable support. It will also be understood that the wires 514*j* and 538*j* may constitute groups of parallel wires which are interconnected at their ends, or along their length to form a grid. The surfaces 607*j* and 568*j* are suitably protected by a transparent insulating layer (not shown) and are separated by a narrow enclosure within which the suspension of particles may be contained. The planes 607*j* and 568*j* belonging to cell *j*, are shown as closely adjacent planes in Figure 32 and are widely separated from the corresponding planes 607*k* and 568*k* of the cell *k* in order to facilitate the visualization of the three-dimensional system of Figure 32. A consideration of the hereinafter described Figures 33 and 34 will aid in the understanding of Figure 32.

Depth contraction means

It is a matter of common observation that the human perception of depth is most acute when the objects viewed are in the near foreground, or within twenty-five feet of the observer. In the range of from 25 to 75 feet, differences in depth are distinguished less readily, and at distances of several hundred feet or more it is difficult to perceive such differences.

This physiological effect is important in solving the problem of projecting distance upon a screen having a limited depth when the actual depth to be shown, within such confines, varies from the immediate foreground to a distance greater than the actual screen depth. Three-dimensional perception is not effectively lost by producing a contraction in the actual depth for distant objects and causing said actual depth to be compressed within the scope of the limits of depth of the screen, because the eyes of human observers are most sensitive to depth when viewing foreground objects. It is thus possible to employ, for example, a linear variation in distance within the first 1/3 to 1/2 of the screen depth, and then to compress with increasing rapidity the actual depth into the remaining screen depth. This compression will effectively cause distances in excess of 100 or 200 ft. to be represented entirely upon the few remaining cells located within the rearmost limits of the screen.

This method of distance contraction is illustrated diagrammatically in Figure 38 which shows a solid image screen 340 comprising a plurality of elements 346*a*, 346*n*, as previously described in connection with Figure 36. As shown in Figure 40, the distance $Z_c$ varies linearly with the distance Z up to the point marked 365 on the curve 366. Beyond the point 365, however, up to the point 367, the distance $Z_c$ increases somewhat more slowly than Z. Beyond the point 367 Z may increase rapidly, while $Z_c$ produces an almost constant value, as indicated at 368. These positions are indicated in Figure 38 on a screen 340 by numbers corresponding to those shown on the graph in Figure 40. Various means may be employed by which the depth factor (Z) may be contracted. A preferred means by which this may be accomplished, however, is shown in Figure 39.

Referring to Figure 39, the voltage $e_z$, which is the output of the synthesis circuit shown in Figure 20 is applied to a D.C. linear amplifier 369, the output of which is fed into a potentiometer 370. The potentiometer voltage output may vary, for example, between 10 and 250 volts. This variation in voltage may correspond proportionally to a distance of between 10 and 250 feet. This voltage is then impressed across any suitable non-linear element such as, for example, a pentode amplifier tube 371 well-known to the art as a 6AC7 tube.

The characteristics of a 6AC7 tube, taken from page 91 of the Receiving Tube Manual, Technical Series RC-14, R.C.A., is shown in Figure 40 for control grid voltage equal to minus 0.5 volt and a screen grid voltage equal to 150 volts. It will be observed that the relation between the plate current and the plate voltage of tube 371 is substantially linear in the range 0 to 80 v., whereas in range 80 to 120 v. the plate current increases less rapidly than the increase in plate voltage. From 160 to 250 v. only a very slight increase in plate current results from the very considerable increase in plate voltage. It will be apparent that the voltage across the resistor 372 in Figure 39 will be proportional to the plate current through the tube 371, and thus the output voltage at terminals 373 will closely follow the plate current curve shown in Figure 40.

Since the resistor 372 is small relative to the resistance of tube 371, a second D.C. amplifier 374 is employed to provide a sufficiently large output voltage $e_{zc}$ at terminal 375. The output voltage $e_{zc}$ at terminal 375 is proportional to the contracted depth, corresponding to the actual depth, Z of the object from the camera.

Other types of non-linear elements may be employed in lieu of the 6AC7 tube, and types of curves may be employed other than that shown in Figure 40 without departing from the spirit of this disclosure.

Microwave energizing system for opaque and solid image screens

Figures 33, 34 and 35 show a preferred embodiment of the three-dimensional network described in connection with Figure 32 as applied to the opaque and solid image screen 340. It is preferred to employ resonant cavities 333 as resonant elements in this system because of their extremely sharp resonant wavelength. This permits of a great many such cavities 333, for example, 100 or 1000, to be employed along a coordinate. Such cavities 333 are each tuned to a particular dominant wavelength by slightly varying its diameter. By the application of a saw-tooth exciting frequency they may be excited successively so that a linear space scanning effect may be obtained along a given coordinate.

The multiple resonator tubes 308, 309, 310, previously described in connection with Figure 31, are shown arranged along the (X), (Y) and (Z) axes in Figure 32. A plurality of coaxial lines 551*ay*, 551*by*, 551*jy*, 551*my*, may also be seen in this figure leading from the cavities 333*ay*–333*my*. These cavities are excited by the Y frequency scanner 309. The energy from the coaxial lines 551 may be successively led off into the rear of the screen 607*n* by direct connection to the said coaxial lines 551. Because of the great number of such connections, which are required for any practical embodiment of this invention, however, it is preferred to employ space coupling between adjacent dipole antennae 553. The said adjacent dipole antennae 553 are in such proximity as to be effectively in the near zone with respect to each other and are connected with appropriately tuned circuits so as to result in effective power transfer. In Figure 34 there is shown a side view of the Y frequency scanner 309 and the dipole antennae 553*ay*–553*my*.

The great number of circuits which must be employed in a three-dimensional network, such as is shown in Figure 32, makes it necessary to provide a means for conveniently constructing such circuits in three dimensions. This is done by inscribing them upon transparent plates such as the glass plates which have been previously illustrated in connection with Figures 23, 27, 28 and 36. These inscribed circuits are shown, for example, in Figure 33 along the lower and left hand rim of the screen plate element, 568j. Since the circuits are generally identical on each of the plates 568a–n, it will be apparent that such circuits could be formed, for example, by spraying metal through a suitable template in a rapid and convenient manner. The fine screen lines 555, however, are preferably produced by a suitable ruling machine and filled with conducting material by vacuum or other deposition, or by rubbing, or scraping away the undesired portions.

Returning now to Figure 35, there is shown a fragmentary section of a glass supporting plate 561 located at the rear of the screen 340 shown in Figure 34 and a novel dipole antenna 553 inscribed on the surface of the said plate. A three wire high frequency transmission line 556 comprising two outer wires 557 and an inner wire 558 is also shown. One of the antenna elements 559 is connected to the outer two wires 557 of the three wire line 556. The other antenna element 560 is connected to the central wire 558 of the three wire line 556. The three wire line functions in the same manner as a coaxial cable, the outer wires 557 acting as a shield for the inner wire; high frequency current being carried mostly on the inner faces thereof. These wires may be grounded as shown in Figure 33 without affecting the transmission of the high frequency currents. The application of the three wire inscribed circuit upon the surface of the supporting insulating plates 554 makes possible the practical application of microwave resonating circuits to the problem of frequency scanning in either two or three dimensions. These circuits may be readily interconnected along the (Z) axis by gang drilling a plurality of groups of three holes through the supporting plates 554 as shown in Figure 34 in connection with plates 561, 562, 563. Each of these holes 578 may have a wire or other conducting insert therein to connect the two faces of the plates and also to join adjacent cells.

The manner in which adjacent cells may be interconnected is shown in detail in Figure 34. This figure also shows the X frequency scanner 308. A section through the resonator tube 308 at the cavity 333jx and the coaxial line 551jx which joins the cavity 333jx, and a dipole antenna 553jx, is also shown in this view. The three wire line 556 leading from the dipole antenna 553jx carries the microwave energy to the surface 568n of the plate 563n upon which a circuit, such as is shown in Figure 33, has been inscribed. A spacer plate 564m is placed between the cell member 554n and the preceding cell member 554m. The spacer plate 564 has inscribed on the surfaces thereof the dipole antennae 565m and 566m. Wires 567m (in side view only 1 wire of 3 wire line shown) connect the two antennae 565m and 566m, so that energy may be transferred from cell to cell by space coupling. Thus the difficulty of the great number of contacts which would otherwise be needed is avoided, although direct contact, as by spring fingers, may be employed in lieu of the space coupling with dipole antennae.

Referring again to Figure 33, a description of the operation of the microwave circuit shown may be understood best by considering it in the light of the disclosure hereinabove made in connection with Figure 32. The front surface of the plate 554j, shown in a fragmented and cut away view in Figure 33, is the area generally indicated by 568j. The plate 563j, which forms the foremost layer of the cell member 554j, is cut away so that the rear surface 610j of the said plate 563j, is exposed showing the vertical lines 555j, inscribed on the said rear surface. The lines 555j are shown as a plurality of parallel lines forming groups 569j, 570j, 571j, etc. All the lines in the group 569j are interconnected by the inscribed bus 572j at their uppermost limit and are joined by the bus 573j at their lowermost limit. A main bus 574j leads from a source of positive pulsating voltage such as is shown at 512 and 513 in Figure 32, to each of the groups of lines 569j, 570j 571j through resistor strips 575j, 576j, 577j. These resistor strips may comprise any suitable resistance element well-known in the art and may be preferably sprayed or otherwise deposited upon the plate surface 610j. Leading from the lower bus 573j through a hole 578j is a conductor which connects the bus 573j to the anode 579j of the diode 580j. The diode 580j is preferably in the form of a small button (peanut tube) having a generally oval and elongated shape similar to that shown in Figure 32. This diode preferably fits into a ground out depression 581j below the surface 568j of the plate 563j. The diode 580j is connected to the line 573j and the central wire 558j of the three wire line as shown in Figure 33.

The three wire line 556 inscribed upon the front surface 568j of the plate 563j is of such length as to provide a voltage maximum within the space between the anode 579j and the point cathode 582j of the diode 580j. Thus, for example, the section of the line 556 generally indicated at 583j in Figure 33, may be three-quarters of a wavelength between its lowermost portion 584j and its uppermost end which surrounds the diode 580j.

The high frequency energy is led into the three wire line 556 at terminal 585j which is located exactly one-quarter of a wavelength above the shorted lower end 584j of the three wire line 556. The shorted lower end 584j is located at a voltage minimum or node and its impedance thus appears infinite at the point 585j. Incoming microwave energy arriving from a resonant cavity such as 333 (not shown) on the X frequency scanner 308 is space coupled through the various screen elements as shown and described above in connection with Figure 34. This microwave energy, arriving at the j cell excites the three wire three-quarter wavelength transmission line 556. The voltage amplitude along the transmission line 583j is generally indicated in Figure 33 by the dotted lines 586j.

A second transmission line system 591j is similarly connected to the (Z) frequency scanner 310. The energy is fed from the resonant cavity 333jz, along the coaxial line 588jz, space coupled through the dipole antennae 589jz, 590jz and then transmitted to the main three wire high frequency line 591j. The entire line 591j and its branches such as 592j are inscribed on the surface 568j of the plate 563j. The end of the line 591j terminates in a resistance element 593j having a value equal to the characteristic impedance of the line 591j. This resistance prevents reflections or standing waves along the main line 591j. The inner wire 594j of the three wire line 591j is shorted to the outer wires 595j, 596j of the line 591j at the extremity of the quarter wave branches such as at 597j. These shorts 597j effectively ground the central wire 594j, while having no effect upon the transmission of the high frequency energy. The entire system is thus grounded at 598j.

A second diode 599j is excited, in a manner similar to that described above in connection with diode 580, by the terminus 600j of the branch line 601j. The same excitation occurs for every one of the diodes 599j arranged all along the branches of the line 591j. Thus when the Z frequency scanner 310 has energized only the cavity 333jz, the entire cell comprising the vertical wires 569j, 570j, etc., and the horizontal wires 602j, 603j, etc., are enabled to function. An additional enabling voltage must be provided, however, to enable only one vertical and only one horizontal group of wires to function, as described above in connection with Figure 32. Thus in order for the group of wires 569j to be grounded the X frequency scanner 308 must also energize the cavity 333ax simultaneously with the energizing of the resonant cavity 333jz by the Z frequency scanner. The result of the simultaneous energizing of the cavities 333jz and 333ax is to cause both diodes 580j and 599j to become conducting. In the conducting state through the diodes 580j, 599j, which are in series, the resistance to ground is considerably less than the resistance 575j. As a consequence, the group of wires 569j acquires a low average potential to ground. All other groups of wires in which the diodes 599j are not conducting have a high average potential to ground since the path through their respective diodes is an infinite resistance relative to, for example, the resistor 577j.

The resistors 605j, 606j, which may be similar in construction to that of the resistor 575j but of a very much larger resistance than 575j, serve to provide a voltage drop across the diode 599j when it is non-conducting. This voltage drop aids in the ionization and produces a conducting path through the said diode 599j when the high frequency field is applied at 600j.

The horizontal groups of wires 602j, 603j, 604j are inscribed upon the surface 607j of the plate 561j. The inscribed circuit illustrated in connection with surface 607j on plate 561j in Figure 33 is generally activated by the Y frequency scanner 309 and the Z frequency scanner 310 in a manner similar to that described in connection with the vertical wires 569j, etc.

The inscribed three wire line 591j passes through three holes in the plate 563j at 609j. The line 591j upon the surface 568j of the plate 563j is connected to the rear surface 607j of the plate 561j by means of a suitable conducting insert within the holes 609j. Thus the inscribed circuit shown on plane 607j is connected to the horizontal wire elements 602j, 603j, etc., by the holes 552j. The horizontal wire elements 602j, 603j, etc. are inscribed upon the surface 608j of the plate 561j.

The spacer plate 562j shown in Figure 34, encloses a rectangular area 611j which comprises the image area of the screen and which contains suitable particles in suspension therebetween, indicated at 612j. The anisotropic elongated particle suspension in liquid, as previously described herein, generally occupies a narrow cell 611j formed between the faces 610j and 608j which contain the horizontal and vertical wires respectively. Thin transparent cover plates 613j and 614j (not shown) are placed over the plate faces 610j and 608j which support the horizontal and vertical wires. These transparent cover plates or coatings 613j and 614j serve to insulate the liquids from the electric field between the horizontal and vertical wires.

The means by which the rectangular region 611j is scanned along the (X) and (Y) coordinates, within the cell j, by an element of area formed by a field free region 615j between the grounded groups of vertical and horizontal wires, such as may be formed by the crossing of vertical group 571j and horizontal group 603j, may be understood by reference to the description previously given in connection with Figures 32 and 36. The scanning in depth results from the successive excitation of the cells a through n by the Z frequency scanner 310.

Mechanical receding screen

Another means of utilizing the broad principle of scanning in depth disclosed herein is shown in Figures 48 and 48a. Referring to Figures 48, 48a, there is shown a mechanical receding screen system. In this system the depth displacement of successive light reflecting planes is obtained by mechanical means. This displacement may be contrasted to the dipole receding screen system 201, previously described, in which elongated particles 210, in suspension and controlled by an electric field, are employed. The preceding system 201, which has no moving mechanical parts other than the dipole particles 210, is preferred for large size screens. However, the mechanical system is well adapted to smaller installations such as may be employed in connection with home television or moving pictures in three dimensions.

Referring to Figure 48, there is shown a front view of the mechanical receding screen 700, having light reflecting planes 701-708 arranged in the manner of displaced sectors about a central shaft 709. In Figure 48a there is shown a section taken along the line 48—48 in Figure 48. The sector planes 701-708 are shown arranged along the shaft 709. Counter balancing weights 711-718 are attached to the shaft 709 opposite the corresponding sector planes to keep the system in balance. Bearings 710 and 719 support the shaft 709. A universal coupling 720 joins the synchronous motor 721 and the shaft 709. Electrical leads 722 feed the motor 721 with alternating current suitable for synchronizing the rotation of the sector planes 701-708 with the time required to scan the object eight times in depth (in the present embodiment). The aperture 723 is sufficient to cover a maximum rectangular surface upon the sector planes 701-708 as shown in Figures 48 and 48a.

When the screen 700 is in operation the sector plane 701-708 is dark except when it lies fully within the aperture 723. During the short interval when the sector plane is in the aperture, the high intensity cathode ray tube 255 shown in Figure 25 is unblanked and the object scene is completely scanned. The selector circuit is suitably synchronized so that only those image elements corresponding to a given sector plane are projected upon the said sector plane. The repetition of these events on successive sector planes produces a three-dimensional image within the confines of the three-dimensional space 700. It will be understood that the depth contraction circuits referred to above in connection with Figure 39 may be advantageously utilized with this system in a manner similar to that described above in connection with Figure 25.

Referring now to Figure 48a and particularly to the dotted and solid lines therein, a direct electron beam X, Y, scanning system in conjunction with the mechanical scanner is shown. Instead of projecting from a high intensity cathode ray tube 255 on to the sector planes 701-708, the said planes may be directly illuminated by the electron beam scanning operation, preferably from behind, as shown in Figure 48a. In this system the sector planes 701-708 are transparent, and are coated with conventional fluorescent coatings such as are commonly used in the ordinary cathode ray tube. The entire mechanism, including the synchronous motor 721, shaft 709 and bearings 710 and 719 are enclosed within the evacuated tube 724 and affixed thereto in any desired manner. An electron gun 758 emits an electron beam 759 which is caused to scan by suitable electric fields impressed across the scanning plates 760 and 761, which are the vertical and horizontal scanning plates respectively. Each sector plane is completely scanned by the electron beam 759 during the interval when the particular sector plane is within the aperture 723; and, only those image portions corresponding to the depth of each sector plane are built up by the electron beam. This is done by utilizing control circuits similar to that shown in Figure 25.

Electronic solid image tube

A further means of utilizing the broad principle of producing three-dimensional images by scanning in depth is shown in Figure 49. This method employs the new principle of creating a point of light in space by the intersection of two invisible beams comprising a first beam of electrons and a second beam of positive ions. The positive ions are composed of ionized atoms or molecules such as hydrogen, neon, sodium, mercury, etc., or mixtures thereof.

It is well-known that when such ionized atoms capture one or more electrons, the electrons descend through one or more quantum energy levels surrounding the said atoms or molecules and there is then emitted light of a definite frequency or energy, corresponding to the loss of potential energy of the captured electron. The effect of the intersection of the electron and ion beams is therefore to produce a point of light the color of which is dependent upon the type of ions employed. Either ions of a single element or mixtures of elements may be employed to produce the color desired. Thus, for example, sodium ions could be used to produce a yellow light.

In addition to the production of a point source or small region of light by this means, there is hereinafter disclosed a ready means for the control of the three-dimensional position in space of the said spot of light.

Referring now to Figure 49, which is the specific embodiment of the electronic solid image tube, there is shown a tube 725 having a transparent viewing face 726, an ion gun 727 and an electron gun 728. The ion gun 727 and the electron gun 728 may be conventional in form and are indicated by boxes 727 and 728. The ion gun 727 is located within the recessed portion 729 of the tube 725. The electron gun 728 is located within the recessed portion 730 of the tube 725. Both the ion beam 731 and the electron beam 732 are accelerated by suitable voltages impressed upon anodes (not shown) within boxes 727 and 728. The ion beam 731 and the electron beam 732 ordinarily intersect at point 733 and produce a point of light in the forward portion of the tube near face 726, at a depth $Z_a$ from the arbitrary reference plane 734.

The ion beam 731 is provided with deflection plates 735, 736 for X deflection. The electron beam 732 is similarly provided with X deflection plates 727, 738. It will be understood that a greater electrical field strength and a longer path of application of the field strength must be applied in connection with the ion beam 731 than with the electron beam 732. This is roughly indicated in Figure 49 by making the plates 737 and 738 relatively short in comparison to plates 735 and 736. Suitable voltage dividers are also employed so that the potential difference applied to the ion deflection plates 735, 736 is greater than the potential applied to the electron deflection plates 737, 738.

A saw-tooth voltage $e_x$ indicated by the graph 739 is applied to terminal 740 by a suitable sweep generator (not shown). The voltage 739 is applied to the plate 735, through the resistor 741, plate 736 being grounded. A capacitor 742 is also connected to plate 735. When the depth voltage $e_z$ is applied at terminals 743, the sudden rise in voltage is transmitted to the plate 735 through capacitor 742 and causes the ion beam 731 to be deflected as indicated by the arrow 744. In a similar manner, the electron deflection plates 737, 738 are fed by two voltage divider resistors 745—746 and 747—748. The function of the resistors 745—746 is to tap off a voltage sufficient to cause a deflection of the electron beam 732 equal to the deflection of the ion beam 731 and in the same direction thereto as indicated by the arrow 749. The voltage $e_z$ is also applied through capacitor 750 to the voltage divider 747—748. A portion of this voltage is tapped off as shown in Figure 49 and applied to plate 737 with the effect that the electron beam 732 is deflected in an opposite direction to that of the ion beam 731, as shown by arrow 751. The resistors 752 and 753 are of sufficiently high resistance to discharge the capacitors 742 and 750 in the absence of applied voltage at terminals 743. In the absence of an applied voltage at 743, the point of light 733 is caused to scan over a surface at a distance $Z_a$ from reference plane 734. The Y scan voltages are applied in a similar manner to Y scan plates 754 and 755 and cause equal scanning, in a direction normal to the plane of Figure 49, of the ion beam and electron beam, which continue to intersect throughout the motions of the spot 733.

Application of a positive voltage $e_z$ will cause an increase in potential at plate 735 and an increase in potential at plate 737. The positive ion beam will be additionally repelled by plate 735 in the direction shown by arrow 744 and the electron beam will be additionally attracted by the plate 737 in the direction shown by the arrow 751. Since the electron beam 732 and the ion beam 731 are deflected through equal and opposite angular deflections because of the voltage divider system 747, 748 employed, it will be evident that the point 733 will move to a plane $Z_b$ distant from reference plane 734, said point being indicated in Figure 49 at 733b. If the voltage $e_z$ becomes still more positive, the point of intersection moves even further away from the reference plane 734 to plane $Z_c$, said point is then indicated at 733c.

To recapitulate, the point of light 733 undergoes an X and Y scanning motion over an imaginery plane, and the distance of this imaginary plane from the reference plane 734 is controlled by a voltage $e_z$ which may be instantaneously proportional to the depth of the image element.

The intensity of the point of light 733 may be varied by applying to the control grids of the ion gun 727 and the control grids of the electron gun 728 an intensity control voltage $e_i$ which controls the ion beam current and the electron beam current in known manner.

Positive and negative pick up electrodes 756 and 757 are employed to keep the tube 725 free of those positive and negative charges which are not neutralized by capture at the intersection of the ion and electron beams 731, 732. Tube 725 is also continuously evacuated by suitable pumps (not shown) through tube 758.

Thus an electronic means has been disclosed for creating an illuminated image in space in three dimensions.

*Wide angle viewing and projecting system*

In a system comprising only one camera and one projector, the angle of view is necessarily restricted. At larger viewing angles the edge portions of background images may appear dark. This effect is not serious unless the viewing angle is widely divergent from the center line of the screen. Hence, if a somewhat restricted angular range of vision is maintained, the single camera, single projector system produces a satisfactory three-dimensional image, which is adequate for home television, home moving pictures, airplane blind-landing systems involving radar, and the like. However, for theatre or outdoor displays where the angle of view is wide, the two-camera, two-projector system is to be preferred.

It is one of the primary objects of this invention to provide a three-dimensional system with substantially no limitation on the angle from which the projected image may be viewed. A wide angle viewing and projecting system of this type is illustrated in Figures 41 and 42. This system may employ the opaque solid image screen 340 hereinabove described, together with a means for illuminating the individual responsive regions comprising the said solid image. The responsive regions which have the above described properties of opacity and reflectivity are illuminated by projecting around foreground objects, or by causing the elementary responsive regions to become self luminous. With this system an observer may move about, viewing the screen from widely different angles with respect to the center line of the screen 340 and observe the background move relative to foreground objects, as described in connection with Figure 37. Moreover, the movement of the background images relative to the foreground images will not result in gaps at the edges of the background image, nor in distortion of the image when seen from the wider viewing angles.

A preferred method for achieving this result is illustrated diagrammatically in Figure 41. This figure shows the analytic geometry of a double camera or projection system, with particular reference to the rotation and displacement of the coordinate systems involved, as hereinafter explained. Figure 42 is a schematic assembly drawing of a complete wide angle viewing and projecting system.

Various scanning systems may be employed in the wide angle viewing and projecting system, as for example, the scanning system shown in Figures 32 and 34 inclusive. The system of employing X, Y, Z saw-tooth frequencies as a three-dimensional scanning means may be termed systematic Z scanning. Any of the screens including the receding screen 293 may be operated by systematic scanning. However, in order to reduce the number of frames per second which must be scanned to effectively operate, for example, the receding screen 201, there is hereinafter disclosed a means for systematically scaning along the X, Y coordinates but not along Z coordinate. In this scanning system, which may be termed asystematic, the Z coordinate for each object region located at points X, Y, Z is instantaneously computed by circuits similar to those shown in Figure 14. The signal $e_z$ produced thereby is utilized to affect a responsive region; that is, a region of disorientation, or secondary alignment, within the screen 340 such as is shown in Figures 29 and 30. As a result of the asystematic scanning system, a complete solid image is created within the confines of the three-dimensional screen for each complete scanning cycle or frame.

The distinguishing feature of the present disclosure is that each elementary responsive region within the solid screen, which functions to reflect or emit light to the observer, is instantaneously located at a depth Z along the coordinate (Z) axis of the screen. For example, in Figure 41 the point R represents a responsive image region at a depth $Z=OC$. The depth $z$ to the elementary reflecting or emitting region within the screen varies according to the depth $z$, to the corresponding element on the actual object being scanned in the X, Y, Z coordinates of the object space 622 in Figure 42.

In one embodiment of the present system a complete image appears upon the face 262 of the high intensity cathode ray projector tube 255. The intensity of the reflected light from the said responsive regions may be controlled, in this embodiment, by the control grids 257 of the high intensity cathode tubes 255 of the projectors 646 and 647. The elementary responsive regions within the screen 620, such as 667 in Figure 42, are activated so as to be properly located to receive the projected rays 665$a$ and 665 from the projectors 646, 647. Thus, as the electron beams in the cameras and projectors simultaneously go through their X and Y scanning cycle they impinge upon the responsive regions which have been correctly located in depth within the screen area 620. Each of the said responsive regions such as region 667, is instantaneously located at a depth $z$, asystematically, according to the various depths $z$ of the corresponding regions 666 on the object as the systematic X and Y scanning proceeds.

In a preferred embodiment of this invention, a single cell of the screen 340, shown and described in connection with Figure 28, may be employed in lieu of the face 262 of the high intensity cathode ray tube. If a single cell, such as is shown in Figure 28, is used, the (X), (Y) frequency scanning system may be advantageously employed in conjunction therewith; utilizing a powerful modulated source of light such as shown at 295 in Figure 28.

In the present system the projectors 646, 647, project through angles which include the widest angle of view likely to be encountered by the observer. The effect of the double projection is to project around foreground solid images and to thus effectively illuminate the entire opaque solid image so as to reproduce the original light and dark regions, as they appeared on the original solid object. Thus a solid image is recreated within the screen space 620 having all the visual properties of actual roundness and apparent opacity. This image may be viewed effectively from various points within an angle of plus or minus $\gamma$ to the line CO normal to the surface 621 of the opaque solid image screen 620 shown in Figure 41.

Referring to Figure 41, each of the cameras, and each of the projectors has its own system of coordinates, which in general, differs from the system of coordinates of the screen. Thus camera 623, or projector 646, has a coordinate system $x_1$, $y_1$, $z_1$, the positive $x_1$ axis of which lies along the line $O_1Q_1$, and the positive $z_1$ axis along the optical axis $O_1P$. Similarly, camera 624, or projector 647, has a coordinate system $x_2$, $y_2$, $z_2$, the positive $x_2$ axis of which lies along the line $O_2Q_2$, and the positive $z_2$ axis along the optical axis $O_2P$. The screen 620 has a coordinate system $x$, $y$, $z$ the positive $x$ axis of which lies along the line $OO_2$, and the positive $z$ axis along the normal OP to the screen face 621. The $z_1$ coordinate, or the optical axis, of the camera 623 or the projector 646, makes an angle of minus $\gamma$ relative to the $z$ axis of the screen, or OP. The $z_2$ coordinate, or the optical axis, of the camera 624 or the projector 647, makes an angle of plus $\gamma$ relative to the same $z$ axis of the screen.

Conversely, relative to the coordinate system $x_1$, $y_1$, $z_1$, the coordinate system, $x$, $y$, $z$, of the screen 620 is rotated through an angle of plus $\gamma$, and its origin, O, displaced, thus:

$$x_{10}=a;\ z_{10}=b$$

Similarly, relative to the coordinate system $x_2$, $y_2$, $z_2$, the coordinate system $x$, $y$, $z$ of the screen is rotated through an angle of minus $\gamma$ and its origin O, displaced, thus:

$$x_{20}=-a$$
$$y_{20}=b$$

In order to simplify the mathematical derivations, and the circuits based thereon, it is hereinafter assumed that the optical axes of the cameras 623, 624 and the projectors 646 and 647 lie in the plane normal to the screen face 621. As a result, two-dimensional rotation displacement transformations are employed in the $xz$ plane. The general case may be derived similarly involving a similar known transformation in solid analytic geometry.

However, if it be desired to locate the projectors at a considerable angle above the horizontal the plane of the screen may be tilted so as to remain normal to the plane $OPO_2$ in Figure 41. The cameras may also be located at the same angle relative to the object and the horizontal. The observer, at a lower angle will perceive the image without foreshortening.

The two cameras 623 and 624 used in the wide angle viewing and projection system are preferably of the type disclosed and shown in connection with Figure 10. The lens 625 of the camera 623 and the lens 626 of the camera 624 are each duo-lenses similar to that illustrated in Figure 11. The optical system employed may be similar to that shown in Figure 10.

The electron images produced by the comparator screens 69 (Figure 1) within the cameras 623, 624 (Figure 42) are actuated by the common (X) and (Y) saw-tooth generators 627 and 628. The generator 627 produces the saw-tooth voltage $e_{xs}$ and the saw-tooth generator 628 produces the voltage $e_{ys}$. These voltages $e_{xs}$ $e_{ys}$ cause the electron images from the comparator screens 69 of the image dissector cameras 623, 624 to undergo a scanning motion relative to the collector electrodes 70, 71. The collector electrode voltages $e_1'$, $e_2'$, from the camera 623 are led off through the lead 629 to the input of the circuit 630, termed the depth computor circuit 630. Such a depth computor circuit 630, is shown in Figure 14 and fully described in connection therewith. The output of circuit 630 is a voltage $e_{z1}$ at terminal 631. In addition to the output $e_{z1}$ the voltage $e_{11}$ appears across terminals 632 of the circuit 630. The voltage $e_{11}$ is led to a buffer amplifier 633 the output of which is also a voltage $e_{11}$ at terminals 634. In a similar manner the collector electrode voltages at terminals 635 of the samera 624 are fed to the depth computor circuit 636 and produce an output voltage $e_{z2}$ at terminals 637. The circuit 636 also produces a voltage $e_{12}$ at terminals 638. The voltage $e_{12}$ is applied to the buffer amplifier 639, voltage $e_{12}$ appearing at the output terminals 640.

The circuit 641 is a master timing circuit, the purpose of which is synchronization. The circuit 641, produces voltage pips at given intervals of time which are fed to saw-tooth generators 627, 628 and also to the gating circuit 643. The gating circuit 643 produces two enabling voltages, which are supplied at terminals 644 and 645 respectively, the function of which is to cause the cameras 623 and 624 to operate alternately. This operation may be brought about by utilizing the voltages 644 and 645 as accelerating voltages alternately applied to the accelerating electrodes 87 (Figure 10) of the cameras 623, 624. The gating voltages 644, 645 are also supplied to the projectors 646, 647; in the manner of enabling voltages similar to the voltages applied to the terminals 245 in Figure 25. Thus each camera and its projector operates in unison, while the two systems which they comprise operate alternately.

The projectors 646 and 647 are supplied with their respective intensity signals $e_{i1}$ and $e_{i2}$ at the terminals 648, 649. The X saw-tooth voltage generator 627 supplies the saw-tooth voltage $e_{xs}$ at terminal 650. This voltage $e_{xs}$ is supplied to the cameras 623, 624 and the projectors 646, 647 at terminals 651, 652, 653, and 654 respectively. Similarly, the Y saw-tooth generator 628 produces a voltage $e_{ys}$ at terminal 655, said voltage being supplied to the cameras 623, 624 and the projectors 646, 647 at terminals 656, 657, 658 and 659. Thus the projectors 646, 647 reproduce on the high intensity faces thereof the scene in the object space 622 as viewed by the cameras 623, 624.

The images thus produced are projected by suitable projection lenses 660, 661 on cameras 646, 647 respectively. An object region 662, originally located, for example, at the coordinates X, Y, Z in the object space 622, is recreated as an image region of disoriented particles (or secondary alignment) 663 at the corresponding coordinates $x$, $y$, $z$ within the screen 620. The dipole particles 341 comprising the image region 663 are capable of absorbing light from the rear of the screen and also reflecting light projected upon the front of the screen 620. The light ray 664 from the projector 646 and the light ray 665 from the projector 647 coincide upon the region 663 within the screen, in the absence of other intervening image regions, such as 667.

The importance of the wide angle projection becomes apparent if a second solid object region 666 is assumed, as shown within the object space 622. This object region 666 has a counterpart 667 within the screen area 620. It may be seen that the ray 665 in this case will illuminate the image region 667, which is intercepted thereby. Ray 665 therefore will not illuminate the image region 663 behind it. The ray 664, however, may proceed directly to the image region 663 and illuminate it. Viewed from the left both region 663 and region 667 will be seen, with region 663 illuminated only by the projector 646, and region 667 illuminated by both projectors 646, 647. Viewed from the right along the line of sight of ray 665 only region 667 will be seen, illuminated by both projectors 646 and 647.

The observer 668, upon moving, will perceive the motion of the background images relative to the foreground images, and the masking of the background images by foreground images within the screen, which is a characteristic of natural three-dimensional vision.

A solid image produced within the space confines of the screen 620, is reconstructed from the signals generated by the cameras 623 and 624 and the associated circuits. However, the cameras 623 and 624, or projectors 646 and 647, are characterized by the different points of view or the space coordinates $x_1$, $y_1$, $z_1$; $x_2$, $y_2$, $z_2$, respectively.

Referring to Figure 42, the voltages transmitted from the circuits associated with cameras 623 and 624 to the projectors 646 and 647 respectively, may generally comprise $e_{i1}$, $e_{xs}$, $e_{ys}$, $e_{z1}$, and $e_{i2}$, $e_{xs}$, $e_{ys}$, $e_{z2}$. The voltages $e_{xs}$, $e_{ys}$, are responsible for the simultaneous identical positioning of the scanning spot on all cameras and projectors. However, by reference to Figure 41, it will be seen that a point R, in the object space 622, or image space 620, has in general, different coordinate distances $x_1$, $y_1$, $z_1$; $x_2$, $y_2$, $z_2$; and $x$, $y$, $z$, respectively in cameras 623 and 624, or projectors 646 and 647, and the screen coordinates respectively. It is required to convert the voltages $e_{xs}$, $e_{ys}$, into voltages $e_{x1}$, $e_{y1}$; $e_{x2}$, $e_{y2}$; and then into $e_x$, $e_y$, corresponding to the distances $z_1$, $z_2$, $z$, to the same image region, in the coordinate systems $x_1$, $y_1$, $x_2$, $y_2$, and $x$, $y$, respectively. The voltages $e_x$, $e_y$ may be subsequently used for recreating a responsive image region located at position $x$, $y$ in the screen, at depth $z$.

The symbols $x'$, $y'$, and $x''$, $y''$, will be used to denote the same responsive image regions located in and by the same system of screen coordinates $x$, $y$. The (') and ('') are used to distinguish coordinate signals derived from left and right hand cameras respectively. Voltage signals $e_{x'}$, $e_{y'}$, and $e_{x''}$, $e_{y''}$, may be applied to alternate cells $a$, $c$, $e$, etc., and $b$, $d$, $f$, etc., respectively within the screen 620 as will be presently understood.

To convert the voltages $e_{x1}$, $e_{y1}$; and $e_{x2}$, $e_{y2}$ to the voltages $e_{x'}$, $e_{y'}$, and $e_{x''}$, $e_{y''}$, requires a rotation and displacement of coordinates as above noted.

A description of the manner in which the signals $e_{x1}$, $e_{y1}$; $e_{x2}$ and $e_{y2}$, are derived electrically from the same signals $e_{xs}$, $e_{ys}$, with the aid signals $e_{z1}$, $e_{z2}$, respectively, follows:

Referring now to Figure 43, the line LM corresponds to the $Z_1$ axis shown in Figure 41 which is the optical axis $O_1P$ in camera 623. The optical center of the camera lens 625 is shown as the point N on the line LM. The distance LM is the distance $Z_1$ along the $Z_1$ axis to an object region R, or 662, which also has the space coordinates $X_1$, $Y_1$ as shown. The image of the object R when projected on the comparator screen 69 of the camera dissector tube 623 has two coordinates on the flat surface 69 as follows: $X_{s1}$, $Y_{s1}$. It may be seen from the geometry of Figure 43 that, keeping $X_1$ and $Y_1$ constant, the coordinates $X_{s1}$, $Y_{s1}$, will vary inversely as the distance $Z_1$. Putting the geometric relationship into algebra, there may be obtained the equations shown below. The corresponding voltages proportional to the space coordinates are placed alongside the equations with appropriate constants of proportionality. The term $d_s$ is the constant distance LN in Figure 43:

For camera 623:

$$X_1 = X_{s1} Z_1 / d_s; \quad e_{x1} = k_4 e_{xs} e_{z1} \tag{16}$$
$$Y_1 = Y_{s1} Z_1 / d_s; \quad e_{y1} = k_4 e_{ys} e_{z1} \tag{17}$$

Similarly for camera 624:

$$X_2 = X_{s1} Z_2 / d_s; \quad e_{x2} = k_4 e_{xs} e_{z2} \tag{18}$$
$$Y_2 = Y_{s1} Z_2 / d_s; \quad e_{y2} = k_4 e_{ys} e_{z2} \tag{19}$$

In Figure 42 the (X) saw-tooth generator 627 and the (Y) saw-tooth generator 628 put out the signals $e_{xs}$, $e_{ys}$, which govern the corresponding scanning along the axes $(X_1)$ $(Y_1)$ and $(X_2)$ $(Y_2)$ of the cameras 623 and 624 and the projectors 646 and 647 respectively.

Product circuits are employed to use the Equations 16–19 inclusive derived above. A suitable product circuit may be similar to that shown in box 187 in Figure 19; in which, in the case of (16), the amplification factor $A_1$, of the stage 189 and the amplification factor $A_2$ of the stage 190 are proportional to the voltages $e_{xs}$ and $e_{z1}$ respectively. The output of the product circuit 187 thereupon becomes voltage $e_{x1}$, in accordance with Equation 16. On Figure 42 the product circuits are indicated as 670, 671, 672, and 673, corresponding to Equations 16, 17, 18, 19, respectively. The product circuit 670 has the voltage $e_{xs}$ fed in at terminals 674 and the voltage $e_{z1}$ fed in at terminals 675. The output voltage, according to Equation 16 is proportional to the product of $e_{xs1}$ and $e_{z1}$; that is, $e_{x1}$ at terminal 676.

Similarly, the other product circuits have the following input and output voltages:

Circuit 671: $e_{ys}$ and $e_{z1}$ at terminals 677, 678 with an output voltage $e_{y1}$ at terminal 679.

Circuit 672: Input $e_{xs}$ and $e_{z2}$ at terminals 680, 681, and output $e_{x2}$ at terminal 682.

Circuit 673: $e_{ys}$ and $e_{z2}$ at terminals 683 and 684 and output voltage $e_{y2}$ at terminals 685, respectively.

It is now required to derive a set of voltages, $e_{x'}$, $e_{y'}$, $e_{z'}$ and $e_{x''}$, $e_{y''}$, $e_{z''}$, characteristic of the space coordinates $x$, $y$, $z$ of the screen 620. These voltages are derived from the voltages $e_{x1}$, $e_{y1}$, $e_{z1}$ and $e_{x2}$, $e_{y2}$, $e_{z2}$, which are characteristic of coordinate systems $x_1$, $y_1$, $z_1$, and $x_2$, $y_2$, $z_2$, respectively. This derivation requires the following mathematical transformations and their electrical analogues to transform from a rectangular coordinate system, $O_1$ to a rectangular coordinate system $O$, the origin of $O$ being located at $x_{10}$, $z_{10}$ in the coordinate system $O_1$, and the axes of the coordinate system $O$ being rotated through an angle of plus $\gamma$ with respect to the axes of the coordinate system $O_1$. The following general equations are applied:

$$x' = (x_1 - x_{10}) \cos (+\gamma) + (z_1 - z_{10}) \sin (+\gamma) \quad (20)$$

$$z' = (x_1 - x_{10}) \sin (-\gamma) - (z_1 - z_{10}) \cos (+\gamma) \quad (21)$$

in which referring to Figure 41, $$x_{10} = a = +\tfrac{1}{2} d_c \cos \gamma \quad (22)$$

$$x_{20} = -\alpha = -\tfrac{1}{2} d_c \cos \gamma \quad (23)$$

$$x_{10} = z_{20} = b = \tfrac{1}{2} d_c \sin \gamma \quad (24)$$

making the substitutions (22), (24) into (20) and (21) there is obtained the following equations for the rotation and displacement transformation of axes $(x_1, z_1)$ to $(x', z')$:

TRANSFORMATION I $$x' = x_1 \cos \gamma + z_1 \sin \gamma - d_c/2 \quad (25)$$

$$z' = -x_1 \sin \gamma + z_1 \cos \gamma \quad (26)$$

Similarly the equations for the rotation and displacement transformation of axes $(x_2, z_2)$ to axes $(x'', z'')$ are derived:

$$x'' = (x_2 - x_{20}) \cos(-\gamma) + (z_2 - z_{20}) \sin(-\gamma) \quad (27)$$

$$z'' = (x_2 - x_{20}) \sin(-\gamma) + (z_2 - z_{20}) \cos(-\gamma) \quad (28)$$

making the indicated substitution (23) and (24) into the Equations 27 and 28, there is obtained:

TRANSFORMATION II $$x'' = x_2 \cos \gamma - z_2 \sin \gamma + d_c/2 \quad (29)$$

$$z'' = x_2 \sin \gamma + z_2 \cos \quad (30)$$

The rectangular coordinate axes of $(x, y)$, $(x', y')$ and $(x'', y'')$ are identical, the primes (') and double primes ('') merely indicating that they correspond to the transformations $(O, O_1)$; $(O, O_2)$ respectively. A description of the manner in which the signals $e_{x1}$, $e_{y1}$, $e_{z1}$, and $e_{x2}$, $e_{y2}$, $e_{z2}$, are converted to $e_{x'}$, $e_{y'}$, $e_{z'}$, and $e_{x''}$, $e_{y''}$, $e_{z''}$ respectively, through the electrical analogue of the rotation and displacement transformation of coordinates, follows:

The Transformations I and II are multiplied through by the same proportionality factor $k_4$, from which there is obtained:

$$\left. \begin{array}{l} e_x = k_4 x; \ e_{x1} = k_4 x_1; \ e_{x2} = k_4 x_2; \\ \quad\quad\quad\quad e_{x'} = k_4 x'; \ e_{z'} = k_4 z' \\ e_z = k_4 z; \ e_{z1} = k_4 z_1; \ e_{z2} = k_4 z_2; \\ \quad\quad\quad\quad e_{x''} = k_4 x''; \ e_{z''} = k_4 z'' \end{array} \right\} \quad (31)$$

Let the fractional constants $f_1$, $f_2$, and the voltage $e_0$ be defined as follows:

$$\left. \begin{array}{l} \sin \gamma = f_1 \quad 0 < f_1 < 1 \\ \cos \gamma = f_2 \quad 0 < f_2 < 1 \\ k_4 d_c/2 = e_0 \end{array} \right\} \quad (32)$$

There is thus obtained the electrical voltage equivalents of the Transformation I:

$$e_{x'} = f_2 e_{x1} + f_1 e_{z1} - e_0 \quad (33)$$

$$e_{z'} = -f_1 e_{x1} + f_2 e_{z1} \quad (34)$$

and similarly, the electrical voltage equivalents of Transformation II are:

$$e_{x''} = f_2 e_{x2} - f_1 e_{z2} + e_0 \quad (35)$$

$$e_{z''} = f_1 e_{x2} + f_2 e_{z2} \quad (36)$$

Equations 33–36 inclusive are the basis for the circuits shown in Figures 44–47 inclusive, which automatically perform the indicated operations. Thus Figure 44 corresponds to Equation 33, the input voltage $e_{x1}$ and $e_{z1}$ being transformed to the output voltage $e_{x'}$. The other Figures 45, 46, 47 correspond respectively to Equations 34, 35, 36 and are self-explanatory. The tapped resistors 616, 616a, 619, 619a shown in Figures 44–47 inclusive, act as proportionating resistors to obtain the stated fraction of the input voltages applied thereacross.

Referring to Figures 42, 44–47 inclusive, the rotation transformation circuits, 686, 687, 688, 689, are indicated by the appropriate boxes and will be understood in connection therewith. The outputs of the circuits 686, 687 are $e_{z'}$ and $e_{x'}$ and the outputs of the circuits 689 and 688 are $e_{z''}$ and $e_{x''}$ respectively. The Y distance along the three coordinate axes $y$, $y_1$, and $y_2$ are equal, since said coordinate axes are assumed parallel. This may be seen from Figure 41 in which the Y axes are respectively normal to the plane of the drawing, and the axes $y_1$, $y$ and $y_2$ pass through the points $O_1$, $O$, $O_2$ respectively. As a consequence, in Figure 42, there is no transformation circuit required to convert $e_{y1}$ to $e_{y'}$, or $e_{y2}$ to $e_{y''}$, said quantities being identical under the assumed conditions.

The screen 620 in Figure 42, is composed of a plurality of parallel cells $a$–$n$ inclusive, as indicated. The alternate cells, $a$, $c$, $e$, $g$, etc., belong to one system, operated by the voltages $e_{x'}$, $e_{y'}$, $e_{z'}$, and the other cells, $b$, $d$, $f$, etc., are operated by the voltages $e_{x''}$, $e_{y''}$, $e_{z''}$. Thus a solid image is formed within the confines of the screen 620 within alternate cells, $a$, $c$, $e$, $g$, etc. This image corresponds to the image projected by the projector 646. The cells $b$, $d$, $f$, etc., are used to form a solid image within the screen 620 corresponding to that projected by the projector 647. The result of the double projection is a solid image which is illuminated from two directions and thus possesses the optical properties of an illuminated natural solid in three dimensions.

Since any given image region is located by the transformation of coordinates at an identical position in space in all three coordinate systems; it follows, that the projected ray 664, for example, projected from the projector 646 will impinge upon the region 663 within the screen 620. This region 663 is capable of reflecting the ray 664 as previously described. Similarly ray 665 from the projector 647 will impinge upon the same region 663, in the absence of an intervening reflecting region 667. The image region 663 was generated by the corresponding object region 662 within the object space 622, and the rays 664 and 665 were located by the scanning of the object region 662 by the cameras 623 and 624.

The frequency scanners used to operate the cells $a$, $c$, $e$, etc., are indicated at 690, 691, 692, respectively, in Figure 42, and comprise $x'$, $y'$, $z'$ frequency scanners. These frequency scanners are operated by the impressed voltages $e_{x'}$, $e_{y'}$ and $e_{z'}$, respectively. The cells $b$, $d$, $f$, etc., are similarly operated by the frequency scanners 693, 694, 695, which comprise the $x''$, $y''$, $z''$ scanners. These frequency scanners are operated by the voltages $e_{x''}$, $e_{y''}$, $e_{z''}$ respectively. The frequency scanners are indicated and correctly aligned with respect to the screen 620 but they have been displaced from one another in Figure 42 in order to simplify the electrical diagram.

No depth contraction circuits have been shown in connection with the Figures 41, 42, although it may be advisable to employ depth contraction circuits as shown in Figure 39, particularly for the deeper layers of the screen 620.

Another method which may be employed in conjunction with this system is to use a two-dimensional projection system (not shown) upon a rearmost flat translucent surface, n, of the screen 620. This two-dimensional projector may project a background image upon a transluscent rearmost surface of the screen corresponding to only those image regions at a depth greater than that of the confines of the screen, at which the human eye has difficulty in discerning differences in depth.

Selector circuits to operate the two-dimensional projection on the rear surface n, such as those shown in connection with Figure 24, may be used in conjunction with the wide angle viewing and projecting system. These are not shown in Figure 42 to avoid over complication of the drawing.

The broken lines 696 indicate a communication channel or channels between the camera and projection circuits which may be of any known type.

Three-dimensional color projection

It is one of the objects of this invention to produce three-dimensional images in full color. Similar principles apply in the projection of three-dimensional color as are used with the well-known techniques presently employed for two-dimensional color projection. The present invention, therefore, contemplates the application of such principles to the hereindescribed three-dimensional screens and projectors.

A specific example of a three-dimensional color projection system may comprise color wheels, having the three primary colors which may be rapidly revolved in front of the projection lenses 660, 661 in Figure 42. Each color wheel is synchronized with the incoming signals so that each primary color is kept in front of the projection lenses 660, 661, sufficiently long enough to include one complete frame. In this manner a three-dimensional full color image may be reproduced.

A color projection system specifically adapted to the hereinabove described electronic solid image tube may employ three ion guns within the tube 725 in Figure 49. Thus the blue color elements might be achieved by scanning each frame with a mercury ion beam. The yellow color elements could be supplied by a sodium ion beam and the red by a neon ion beam. Successive scanning by means of appropriate and well-known control means would produce a three-dimensional dull color image within the tube 725.

Radar three-dimensional display

Radar systems are presently known whereby three-dimensional scanning signals are obtained. An example of the present art is the use of a microwave radar signal beam, projected from a parabolic reflector, having a dipole antenna at the focal point thereof, in which the radar beam is caused to scan through a vertical angle, O, and through a horizontal angle, $\theta$. Objects intercepting the radar beam pulses cause reflection back to the same or another dipole pick up antenna. By measuring the time required for the radar pulse to travel out to the reflecting object, and back, a depth or distance signal, proportional to the distance to the said object is derived in the known manner. Such a distance signal may be denoted by a voltage $e_r$. Other voltages $e_e$ and $e_\phi$ are characteristic of the angular coordinates, which may be generated by selsyns attached to the mechanism of the scanning parabola in the known manner. Effectively then, the object space is scanned in polar coordinates $r$, $e$, $\phi$ and voltages proportional to these coordinates $e_r$, $e_e$, $e_\phi$ are generated therefrom. By employing the well-known transformation of coordinates, between polar and rectangular coordinates, a number of circuits may be constructed in a manner similar to that described in connection with the wide angle projection system. Three voltage factors $e_x$, $e_y$, $e_z$, may be thereby derived which may be utilized to control responsive image areas in any one of the three-dimensional screens described above.

Since radar images usually contain little detail they are generally produced as black and white, or silhouette, pictures. Hence to display the three-dimensional signals $e_x$, $e_y$, $e_z$, the screen may, for example, be irradiated with a constant source of white light, the entire screen remaining dark except where the responsive image regions have been activated by the three coordinate signals. There will thus appear a three-dimensional display with the outlines of ships, towers, overhead planes silhouetted in white against a dark background. Moving objects, such as airplanes, will appear in their correct three-dimensional relationship to surface objects below. A depth contraction circuit similar to that shown in Figure 39, may be employed in connection with the 3–D radar display screen in order to include the entire depth range within the confines of the screen.

The radar equipment and associated circuits hereindescribed, may be located at an airport and the signals $e_x$, $e_y$, $e_z$, may be retransmitted to incoming aircraft and displayed upon a small three-dimensional screen within the said aircraft. The pilot will thus instantaneously have a three-dimensional view of all air traffic approaching the airport, including his own plane, even in dense weather. This view will appear above a background of the outlines of the airport buildings and surrounding territory.

Three-dimensional moving pictures

It is within the purview of this invention to use standard moving picture equipment in conjunction with the above mentioned screens and their associated electrical circuits for the production of three-dimensional moving pictures. In order to do this, it is necessary to take simultaneous motion pictures from properly spaced vantage points using two standard motion picture cameras. The exposed films may then be processed in the customary manner and delivered to the place at which they are to be projected.

The two films are projected simultaneously, using standard projection apparatus, with the exception that they are focussed upon the comparator screen of an image dissector tube which is part of a camera such as is hereinabove described. The three-dimensional projection camera translates two images so received into television transmission signals containing height, width, depth and intensity factors, as previously described. These factors are then employed to control the projection upon a screen constructed according to one of the above disclosures.

It is possible to modify this technique in various ways without departing from the spirit of this invention. Thus, for example the stereoscopic images may be put on alternate frames of the moving picture film or side by side on the same film.

Summary

To recapitulate, the means by which three-dimensional images are produced according to this invention, comprise the following:

The object space, or scene, is scanned by a suitable camera from two vantage points. The light emanating from the various portions of the object space is gathered thereby and projected within the camera. It is essential for the proper functioning of this invention that the object space be viewed from two vantage points by the camera. This double viewing may be accomplished by using two cameras or by using the preferred duo-lens system. Where a duo-lens system is employed, one of two mutually extinguishing light filters is placed within each of the lens systems. The light passing through the duo-lens system is then thrown upon an image blocking screen, so constructed that each of the adjacent strips of the said blocking screen receives light from only one of the lens systems.

The light thus gathered, emanating from the same portion of the object and passing through the spaced lens systems becomes displaced vertically upon the adjacent strips of the blocking screen by reason of the two viewing vantage points. The extent of this displacement is inversely proportional to the distance of the object from the camera. This optical principle is used, in this invention, to derive a depth factor for each object within the scene which is used in the subsequent three-dimensional projection.

An image dissector tube or similar apparatus is employed within the three-dimensional camera to translate the images received therein into electrical voltages. These voltages may be either in the nature of abrupt voltages or gradually changing voltages. If the voltages are abrupt, they are treated as pulses. If the voltages are gradual, they are handled by the circuits as slopes.

Thus, the two possible types of voltages which may emanate from the image dissector tube are fed into a pulse slope sorter circuit. This circuit directs the pulses into a pulse depth derivation factor circuit. The slopes are passed along to a slope depth factor derivation circuit. The function of the two depth factor derivation circuits is apparent from their names, i.e., to derive depth factors from the voltages supplied thereto. The output of the two depth factor derivation circuits is fed into a synthesis circuit. The synthesis circuit combines the two voltages into a succession of depth defining voltages which is subsequently used in the projection of three-dimensional images.

A three-dimensional image screen is essential to the operation of the three-dimensional system according to this invention. The several types of screen described within this application all contain a structure which provides an image space within their confines for the generation of three-dimensional images. These images may be created by reflecting at each desired depth only those portions of the image which appeared at that depth within the object scene. By rapidly scanning the object space in depth as well as in height and width, a three-dimensional image may be produced. It is possible to generate a three-dimensional picture by means of a self-illuminating screen member which does not depend upon reflected light for image formation. Self-illuminating screens have previously been referred to under the titles of solid image screen and electronic solid image tube.

Broadly speaking, the invention herein disclosed operates upon the technique of scanning an image space from two vantage points to derive height and width components, comparing the light thus gathered to derive an additional depth component, and then projecting and thereby generating a three-dimensional image within a three-dimensional screen by scanning the said screen along its three spatial coordinates, and transferring thereto the light components derived from each portion of the object space.

Having thus fully described the invention, what is claimed as new and desired to be secured by Letters Patent of the United States, is:

1. The method of producing three-dimensional pictures, which consists of scanning an object space from two vantage points, deriving electrical signals therefrom, and generating a three-dimensional picture within a three-dimensional image space by utilizing the said electrical signals.

2. The method of producing three dimensional pictures, which consists of scanning an object space from two vantage points, receiving the two images within a camera alternately blocking one image from the other incorporated within each lens system, deriving electrical signals therefrom, and generating a three-dimensional picture within a three-dimensional image space by utilizing the said electrical signals.

3. The method of producing three-dimensional pictures, which consists of scanning an object space from two vantage points, receiving the two images within a camera, polarizing each image at 90° to each other, deriving electrical signals therefrom, and generating a three-dimensional picture within a three-dimensional image space by utilizing the said electrical signals.

4. The method of producing three-dimensional pictures, which consists of scanning an object space from two vantage points, receiving the two images within a camera alternately blocking selected portions of the visible spectrum of said images, deriving electrical signals therefrom, and generating a three-dimensional picture within a three-dimensional image space by utilizing the said electrical signals.

5. The method of producing three-dimensional pictures, which consists of scanning an object space from two widely separated vantage points, receiving a pair of images at each vantage point, deriving electrical signals therefrom, and generating a three-dimensional picture within a three-dimensional image space by utilizing the said electrical signals.

6. The method of producing three-dimensional pictures, which consists of scanning an object space from spaced vantage points converting the images produced by said scanning from visual components to electrical signals, and thereafter generating a three-dimensional picture within a three-dimensional image space by using the said electrical signals.

7. The method of producing three-dimensional pictures, which consists of scanning an object space from spaced vantage points, arranging the said images in alternate strips, simultaneously scanning pairs of said strips, comparing the electrical signals generated therefrom, deriving a distance signal to each point scanned, and generating a three-dimensional picture within a three-dimensional image space by using the said electrical signals.

8. The method of producing three-dimensional pictures which consists of scanning an object space from spaced vantage points, receiving the two images within a camera separating and projecting said images as alternate strips, scanning electrically the said strips with an electron beam having a cross sectional shape, the height of which is greater than the width, converting the said images from visual components to electrical signals, and generating a three-dimensional picture within a three-dimensional image space by using the said electrical signals.

9. The method of producing three-dimensional pictures, which consists of scanning from spaced vantage points an object space converting the images received from visual components to electrical signals, and generating a three-dimensional picture within a three-dimensional screen image space by using the said electrical signals and successively reflecting portions of the images from various depths within the screen space.

10. The method of producing three-dimensional pictures, which consists of scanning from spaced vantage points an object space converting the images received from visual components to electrical signals, applying the electrical signals to three dimensional coordinates within a three dimensional space to generate a three-dimensional picture within said space by using the said electrical signals.

11. The method of producing three-dimensional pictures, which consists of scanning from spaced vantage points an object space, receiving the two images within a camera containing means for converting the said images from visual components to electrical signals, and generating a three-dimensional opaque solid image within a three-dimensional screen image space by using the said electrical signals.

12. The method of producing three-dimensional pictures, which consists of scanning from spaced vantage points an object space, receiving the two images within a camera converting the received images from visual components to electrical spaced positive and negative ion beams, intersecting and modulating the beams at various coordinates within a three-dimensional space to create thereby points of light at said coordinates to form a three dimensional image within said space.

13. In the creation of three-dimensional images, the steps of radiating electromagnetic energy in an object space, deriving from the reflected energy three-dimensional space coordinate and intensity voltages and generating a three-dimensional image of the said object thereby within an image space.

14. In the creation of three-dimensional images within a particle filled three-dimensional space, the steps of deriving three-dimensional space coordinate and intensity voltages from an object space and thereafter generating a three-dimensional image of the said object thereby within the image space by orienting and disorienting selective portions of the particles within the space.

15. In the creation of three-dimensional images within a particle filled three-dimensional space, the steps of deriving three-dimensional space coordinate and intensity voltages from an object space orienting and disorienting particles within the image space in successive layers to create a travelling reflective surface and generating a three-dimensional image of the said object thereby within an image space.

16. In the creation of three-dimensional images within a particle filled screen disposed between crossed light polarizers, the steps of deriving three-dimensional space coordinate and intensity voltages from an object space and generating a three-dimensional image of the said object thereby within the screen while illuminating the said screen from behind the rearmost polarizer.

17. A three-dimensional display system including a signal producing object locating device which transforms the object scanned into a series of coordinate signals comprising, a first coordinate system and a second coordinate system, a mathematical relationship interrelating said coordinate systems, electrical analogue circuits corresponding to said mathematical relationships, said analogue circuits being connected to the output of said locating device.

18. In the creation of three-dimensional pictures, the steps of deriving space coordinate voltages from all portions of a scene including a depth coordinate voltage, providing a non-linear response to said depth coordinate voltage, and employing the said voltages to generate a three-dimensional picture within an image space having a limited depth.

19. In a three-dimensioned wide angle viewing and projecting system, spaced cameras to scan an object space, said cameras including cordinate signal output means, electric circuits connected to said coordinate signal output means and including rotation transformation circuits to change the coordinate signals from a first space coordinate system to a second space coordinate system, spaced projectors, said projectors being connected to said electric circuits and each projector being synchronized with one of said cameras, and a screen means containing an image space within which the three-dimensional image is generated, said screen means also being connected to certain of said circuits.

References Cited in the file of this patent

UNITED STATES PATENTS

| | | |
|---|---|---|
| 2,301,254 | Carnahan | Nov. 10, 1942 |
| 2,307,188 | Bedford | Jan. 5, 1943 |
| 2,361,390 | Ferrill | Oct. 31, 1944 |